United States Patent
Curello et al.

(10) Patent No.: US 8,951,310 B2
(45) Date of Patent: Feb. 10, 2015

(54) HYDROGEN GAS GENERATORS

(75) Inventors: Andrew J. Curello, Hamden, CT (US);
Constance R. Stepan, Oxford, CT (US);
Anthony Sgroi, Wallingford, CT (US);
Paul Spahr, New Haven, CT (US);
Michael Curello, Cheshire, CT (US);
Alain Rosenzweig, Saint Maur des Fosses (FR); Kurt Rath, Herblay (FR)

(73) Assignee: Societe BIC, Clichy Cedex (FR)

( * ) Notice: Subject to any disclaimer, the term of this patent is extended or adjusted under 35 U.S.C. 154(b) by 1123 days.

(21) Appl. No.: 12/525,213

(22) PCT Filed: Feb. 1, 2008

(86) PCT No.: PCT/US2008/052809
§ 371 (c)(1),
(2), (4) Date: Sep. 25, 2009

(87) PCT Pub. No.: WO2008/097849
PCT Pub. Date: Aug. 14, 2008

(65) Prior Publication Data
US 2010/0104481 A1    Apr. 29, 2010

Related U.S. Application Data

(60) Provisional application No. 60/887,918, filed on Feb. 2, 2007.

(51) Int. Cl.
*B01J 7/00* (2006.01)
*C01B 3/08* (2006.01)
(Continued)

(52) U.S. Cl.
CPC ............ *C01B 3/065* (2013.01); *H01M 8/04216* (2013.01); *H01M 8/065* (2013.01); *Y02E 60/362* (2013.01); *Y02E 60/364* (2013.01)

USPC ........... 48/61; 48/127.9; 423/648.1; 423/658; 423/657; 60/744

(58) Field of Classification Search
CPC ...................................... B01J 7/00; C10J 3/20
USPC ............... 48/61, 127.9, 127.1; 423/657, 658, 423/648.1; 60/744
See application file for complete search history.

(56) References Cited

U.S. PATENT DOCUMENTS

| | | | |
|---|---|---|---|
| 4,003,405 A | * | 1/1977 | Hayes et al. ................... 138/40 |
| 5,755,425 A | | 5/1998 | Marolda |

(Continued)

OTHER PUBLICATIONS

Supplementary European Search Report issued in connection with corresponding European Patent Application No. 08728835.3 on Nov. 15, 2011.

(Continued)

*Primary Examiner* — Kaity Handal
(74) *Attorney, Agent, or Firm* — The H.T. Than Law Group

(57) ABSTRACT

Disclosed herein are multiple embodiments of a hydrogen generator (10) that measures, transports or stores a single dose of a viscous fuel component from first fuel chamber (12) in storage area (38) when the internal hydrogen pressure (44, 44') of the hydrogen generator is high, and transports this single dose to a metal hydride fuel component in second fuel chamber (14) when the internal pressure is low, so that the viscous liquid and metal hydride fuel components react together to generate more hydrogen and to restart the cycle. The viscous fuel component can be water or alcohol, such as methanol, in liquid or gel form, and the metal hydride fuel component can be sodium borohydride or other metal hydride that chemically reacts with the viscous fuel to produce hydrogen. The metal hydride fuel component can be in solid or viscous form, e.g., aqueous form.

35 Claims, 34 Drawing Sheets

(51) Int. Cl.
*C01B 3/06* (2006.01)
*H01M 8/04* (2006.01)
*H01M 8/06* (2006.01)

(56) References Cited

U.S. PATENT DOCUMENTS

| | | |
|---|---|---|
| 5,964,089 A | 10/1999 | Murphy et al. |
| 6,544,400 B2 | 4/2003 | Hockaday et al. |
| 6,899,862 B2 * | 5/2005 | Baldwin et al. ............... 423/657 |
| 7,565,744 B2 | 7/2009 | Matsui et al. |
| 7,727,293 B2 | 6/2010 | Rosenzweig et al. |
| 7,794,886 B2 | 9/2010 | Adams et al. |
| 7,896,934 B2 | 3/2011 | Curello et al. |
| 8,002,853 B2 | 8/2011 | Curello et al. |
| 8,636,961 B2 | 1/2014 | Sgroi, Jr. et al. |
| 2002/0182459 A1 | 12/2002 | Hockaday et al. |
| 2005/0175868 A1 * | 8/2005 | McClaine et al. ............. 429/12 |
| 2005/0266281 A1 | 12/2005 | Adams et al. |
| 2006/0174952 A1 | 8/2006 | Curello et al. |
| 2006/0191199 A1 | 8/2006 | Rosenzweig et al. |
| 2008/0206113 A1 | 8/2008 | Stepan et al. |

OTHER PUBLICATIONS

International Search Report and Written Opinion, issued in connection with corresponding international application No. PCT/US0008/052809 on Sep. 2, 2008.

* cited by examiner

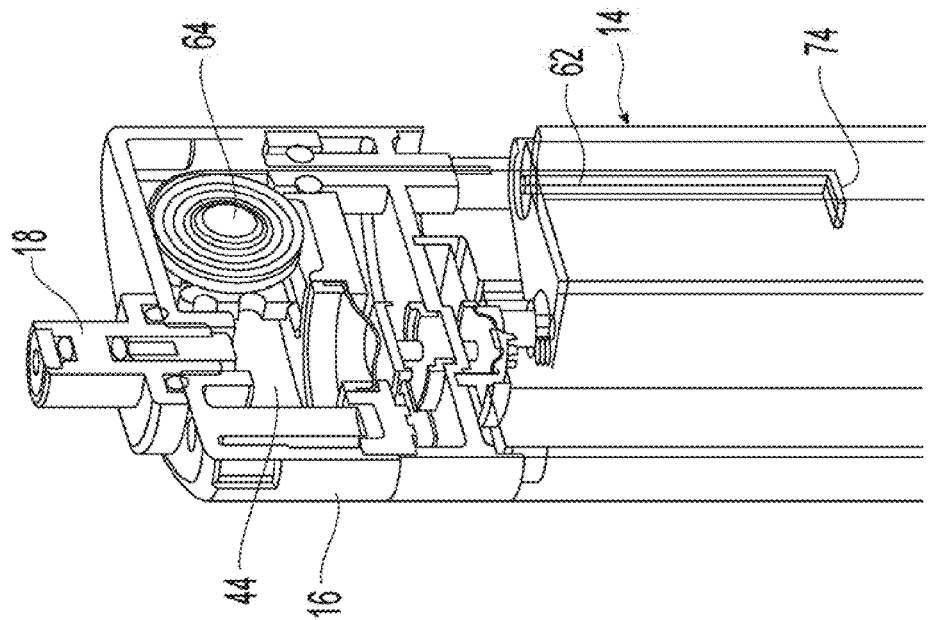
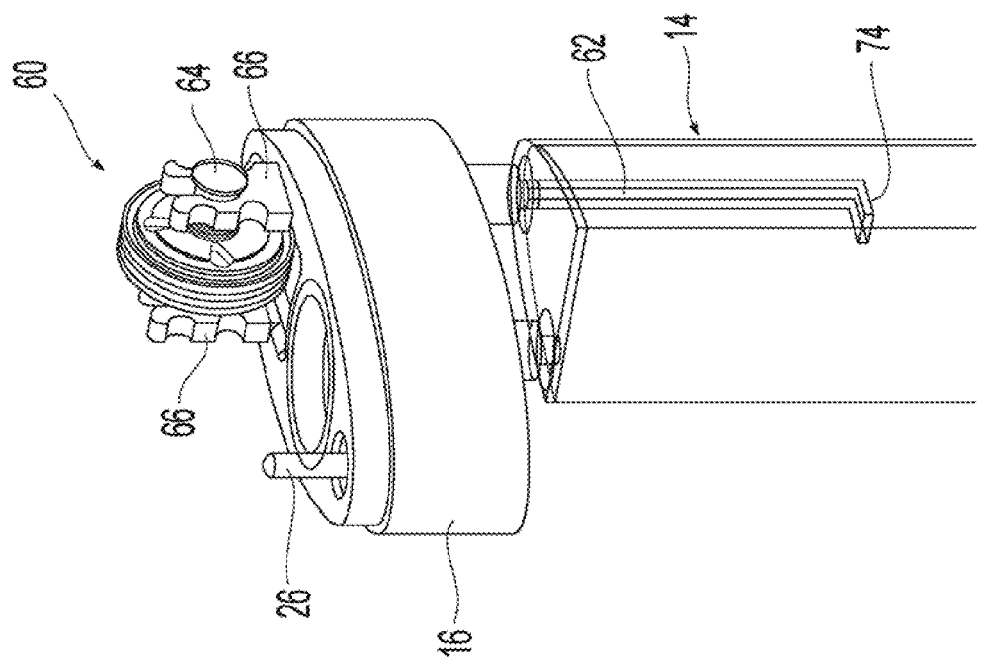

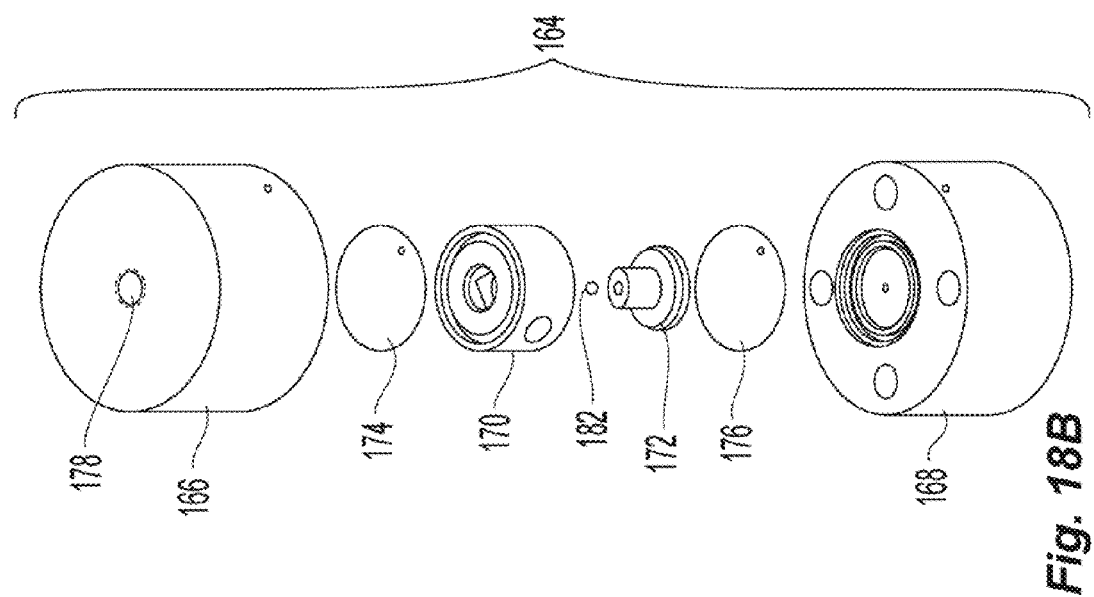
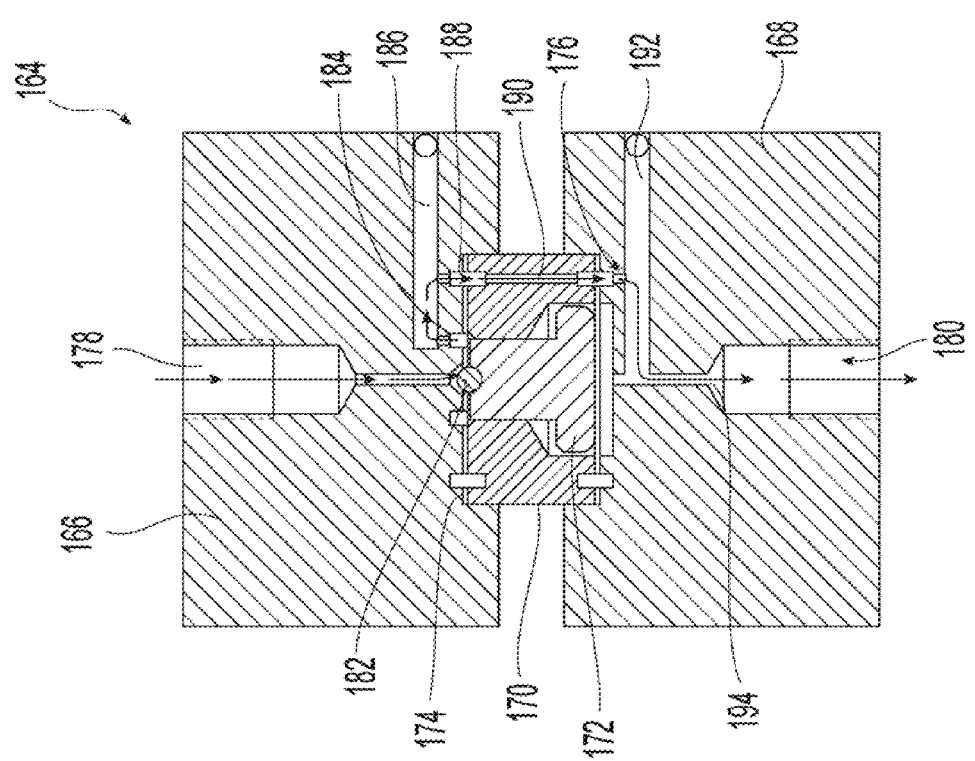
Fig. 18A
Fig. 18B

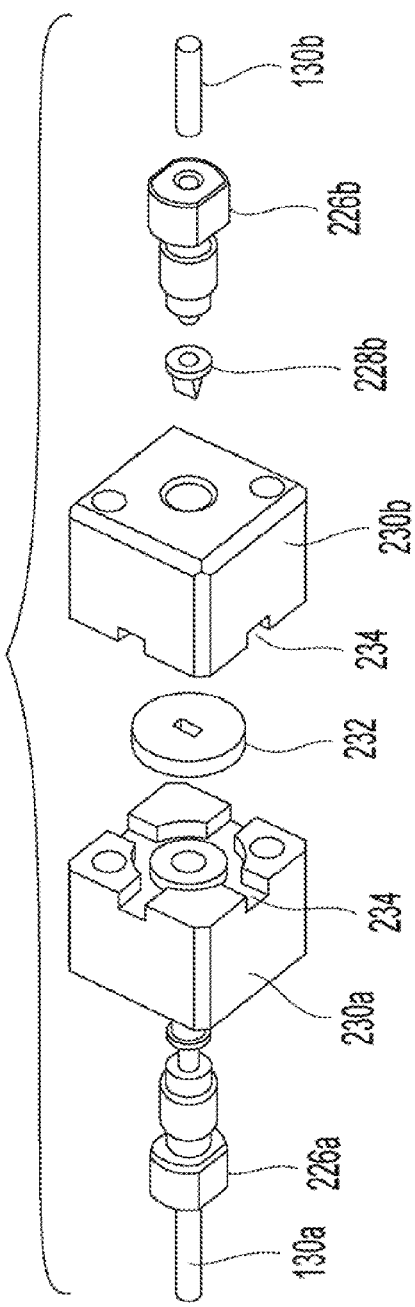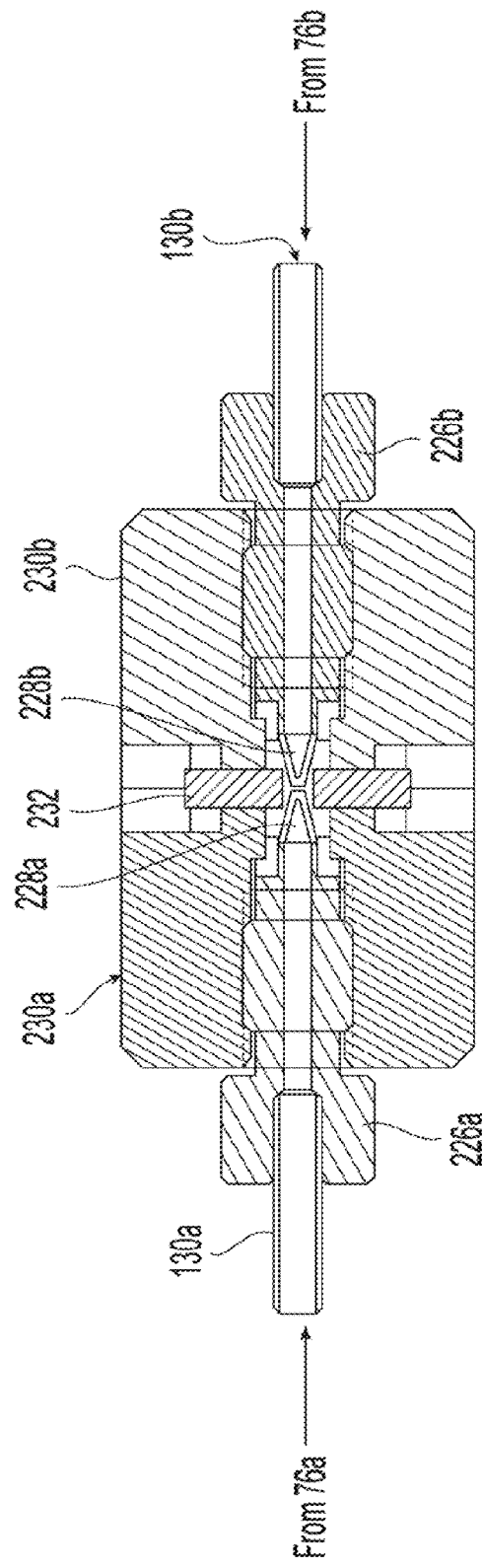

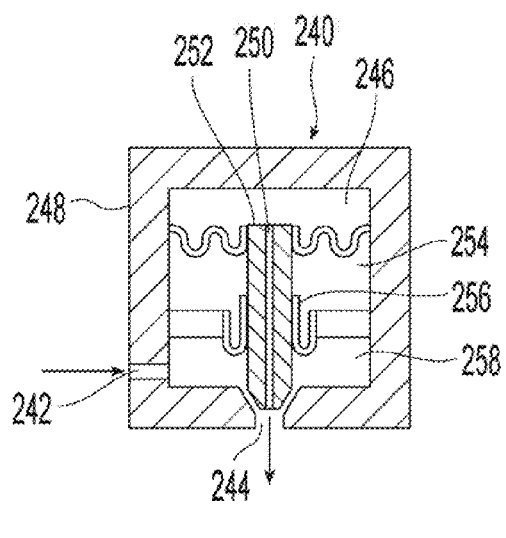
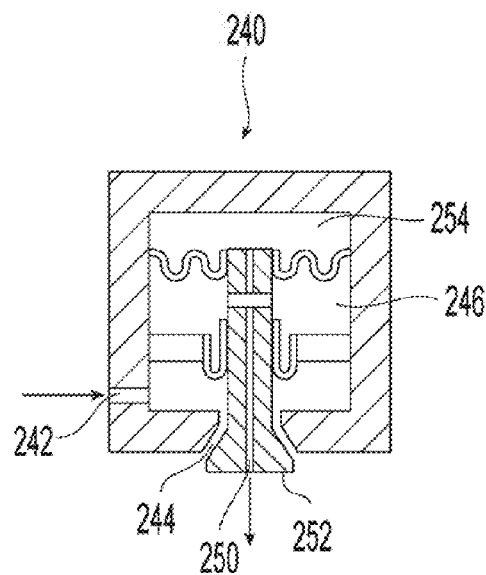
*Fig. 22A*          *Fig. 22B*
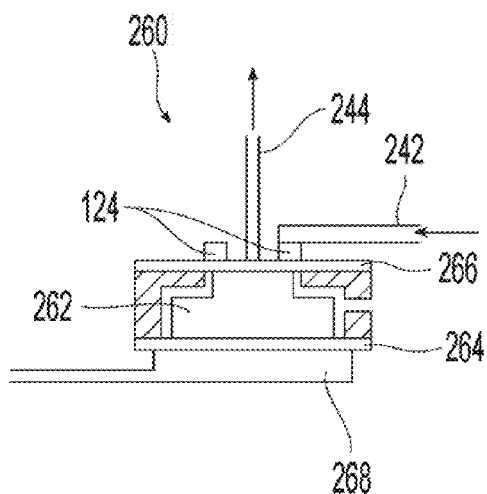
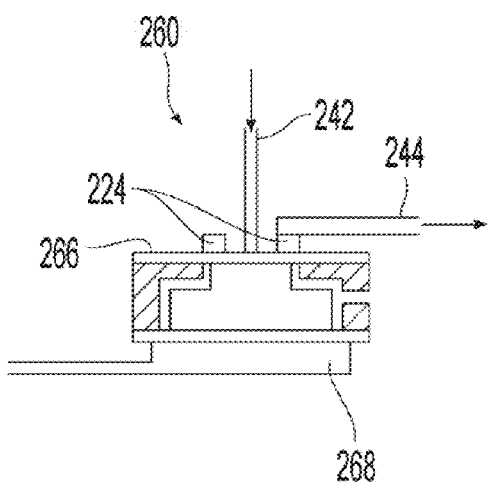
*Fig. 22C*          *Fig. 22D*

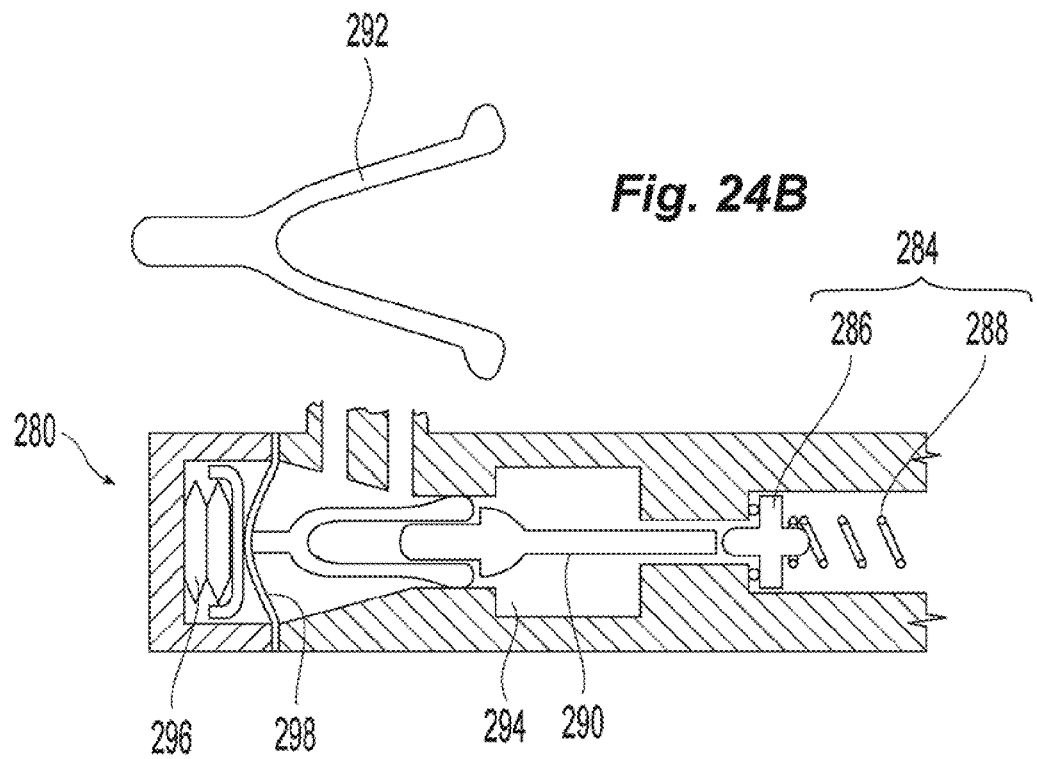
Fig. 24B
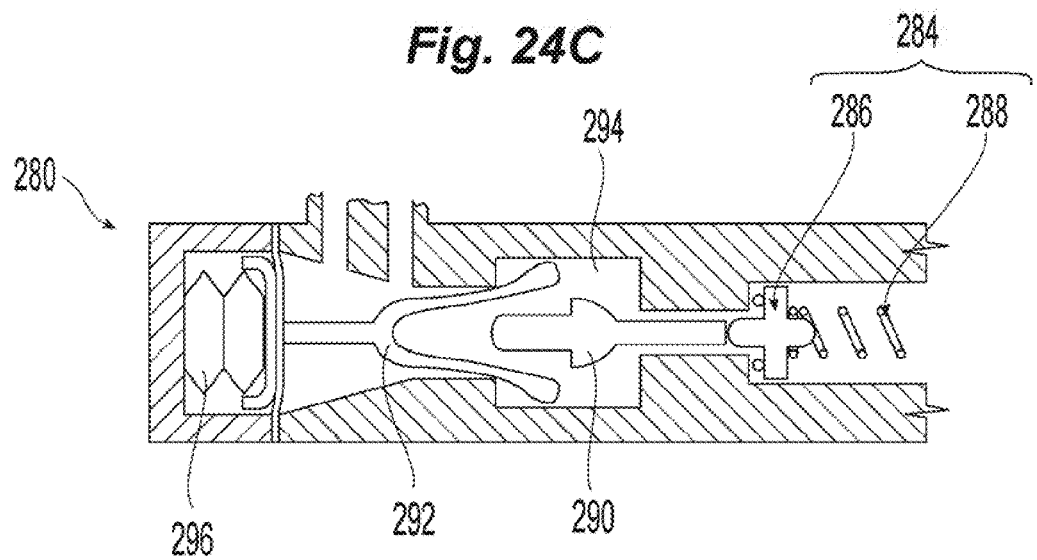
Fig. 24C
Fig. 24D

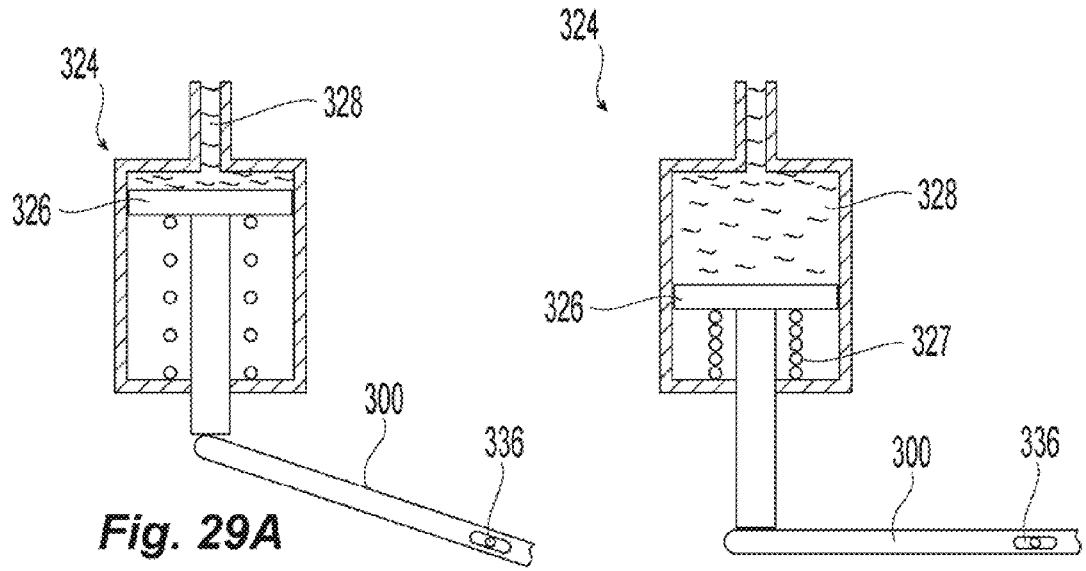
Fig. 29A
Fig. 29B
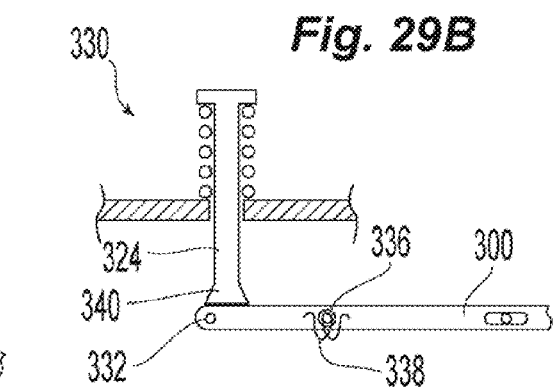
Fig. 29C
Fig. 29D
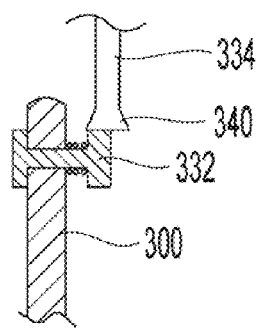
Fig. 29E

...

HYDROGEN GAS GENERATORS

FIELD OF THE INVENTION

The invention is directed to fuel supplies, fuel cartridges or hydrogen generators for fuel cells.

BACKGROUND OF THE INVENTION

A known challenge in the hydrogen generation art is to control the reaction rate between a chemical metal hydride, such as sodium borohydride, and a liquid, such as water or methanol. When the reaction is too slow, the fuel cell does not have sufficient hydrogen to generate electricity. When the reaction is too fast, the excess hydrogen gas can pressurize the fuel supply or hydrogen generator.

Heretofore, control of the reaction rate to produce hydrogen in a chemical metal hydride reaction has been accomplished by introducing the catalyst into a reaction chamber containing aqueous metal hydride and water to start the reaction and removing the catalyst from the aqueous metal hydride to stop the reaction, as disclosed in U.S. Pat. Nos. 6,939,329 and 3,459,510 and in U.S. Published Patent Application No. US 2005/0158595. This technique regulates the rate of reaction by controlling how much the catalyst interacts with the aqueous fuels or the duration of contact between the catalyst and the fuels.

Another method of controlling the reaction rate is to add metal hydride granules having uniform size into water at a steady rate to control the production of hydrogen, as discussed in U.S. Patent Publication No. US 2004/0184987. Another method is to control the injection rate of water and aqueous metal hydride solution to control their reaction rate.

However, there remains a need for methods and devices that can effectively control the reaction rate between the chemical metal hydride and the liquid reactant.

BRIEF SUMMARY OF THE INVENTION

The present invention discloses, among other things, multiple embodiments of a hydrogen generator that measures, transports or stores a single dose of a liquid fuel component when the internal hydrogen pressure of the hydrogen generator is high, and transports this single dose to a solid fuel component when the internal pressure is low, so that the liquid and solid fuel components react together to generate more hydrogen and to restart the cycle.

Pressure regulators and automatic shut-off valves are also disclosed. The liquid fuel component can be pressurized or unpressurized.

BRIEF DESCRIPTION OF DRAWINGS

The foregoing and other features and advantages of the invention will be apparent from the following description of the invention as illustrated in the accompanying drawings. The accompanying drawings form a part of the specification to explain the principles of the invention and to enable a person skilled in the pertinent art to make and use the invention.

FIG. 5A is a partial view of the top portion, a portion of the solid fuel/reaction chamber with a solid fuel distribution mechanism; FIG. 5B is a partial cross-sectional view of the hydrogen generator showing the solid fuel distribution mechanism.

FIG. 18A is a cross-sectional view and FIG. 18B is an exploded view of a pressure regulator in accordance with the present invention.

FIG. 21A is an exploded view of a liquid fuel mixer in accordance with the present invention; FIG. 21B is a cross-sectional view of the fuel mixer shown in FIG. 21A;

FIGS. 22A-22B show cross-sectional views of a shut-off valve in accordance with the present invention;

FIGS. 22C-22D show cross-sectional views of another shut-off valve;

FIGS. 24A-24D show cross-sectional views of another fuel supply/hydrogen generator with a measured dose pump/valve;

FIGS. 29A-29D are partial cross-sectional views of suitable actuators for the priming mechanisms shown in FIGS. 28A-28B; FIG. 29E is a cross-sectional view of the priming lever shown in FIGS. 29C-29D, and FIGS. 30A-30D are partial cross-sectional views of a self-activated priming mechanism.

DETAILED DESCRIPTION OF THE INVENTION

Figure 5C:
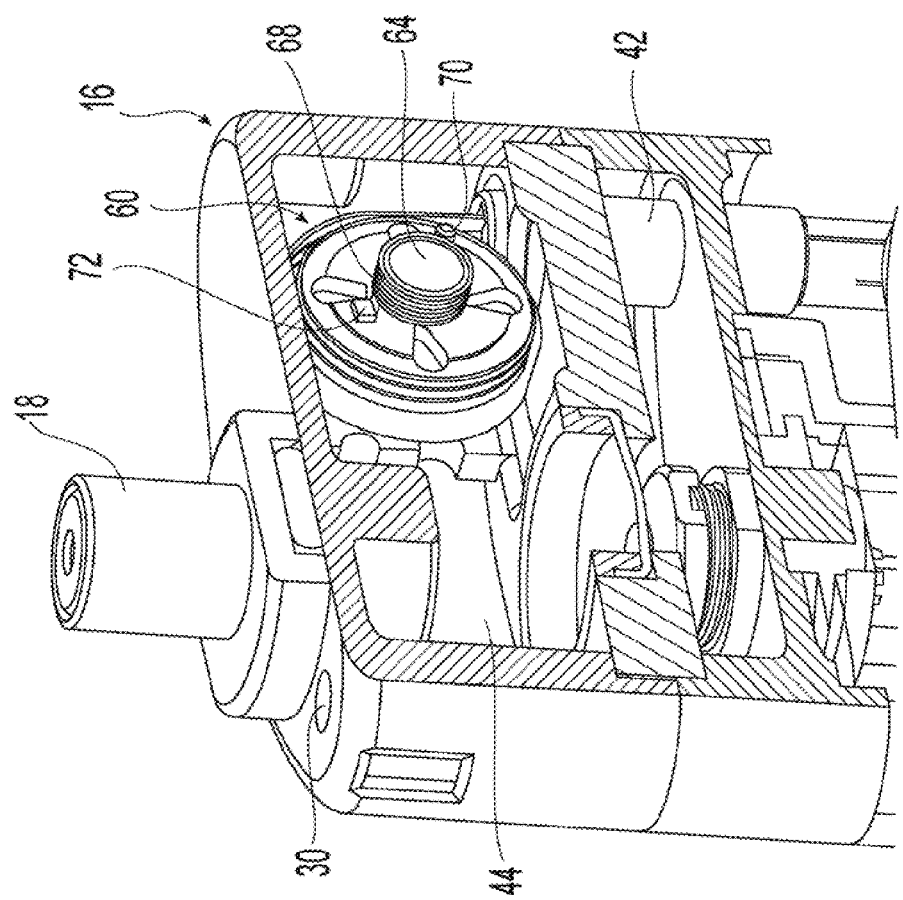
FIG. 5C is a close-up cross-sectional view of the recoiling means for the distribution mechanism.

The general reaction between a metal hydride reactant and a liquid reactant to produce hydrogen is known. In one example, the reaction between sodium borohydride and water is as follows:

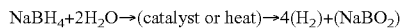

$$NaBH_4 + 2H_2O \rightarrow (\text{catalyst or heat}) \rightarrow 4(H_2) + (NaBO_2)$$

Suitable catalysts include platinum, ruthenium and ruthenium salt ($RuCl_3$), among other metals and salts thereof. Sodium borate ($NaBO_2$) byproduct is also produced by the reaction. Sodium borohydride fuel as used in fuel cells is discussed in U.S. Pat. No. 3,459,510, which is incorporated herein by reference in its entirety.

As illustrated in the accompanying drawings and discussed in detail below, the present invention is directed to methods and devices capable of controlling and maximizing the release of hydrogen from chemical metal hydride fuels, such as sodium borohydride ($NaBH_4$), and water. The present invention is also directed to self-regulating apparatuses that maximize the release of hydrogen fuels from a reaction of chemical metal hydride fuels and water.

Hydrogen generating apparatuses using chemical metal hydride fuels are disclosed in co-pending U.S. Published Patent Application No. 2005/0074643; U.S. Published Patent Application Nos. 2006/0191199, 2006/0191198; U.S. Provisional Application No. 60/689,538, filed on Jun. 13, 2005; and U.S. Provisional Application No. 60/689,539, filed on Jun. 13, 2005. Particularly, commonly owned U.S. Provisional Application No. 60/689,572, filed on Jun. 13, 2005; discloses a fuel and a hydrogen generating apparatus, wherein substantially all of the hydrogen gas contained in the metal hydride and liquid reactant is released. The disclosures of all of these references are incorporated by reference herein in their entireties.

Suitable chemical metal hydride fuels include, but are not limited to, hydrides of elements of Groups IA-IVA of the Periodic Table of the Elements and mixtures thereof, such as alkaline or alkali metal hydrides, or mixtures thereof. Other compounds, such as alkali metal-aluminum hydrides (alanates) and alkali metal borohydrides may also be employed. More specific examples of metal hydrides include, but are not limited to, lithium hydride, lithium aluminum hydride, lithium borohydride, sodium hydride, sodium borohydride, potassium hydride, potassium borohydride, magnesium hydride, magnesium borohydride, calcium hydride, and salts and/or derivatives thereof. The preferred hydrides are sodium hydride, sodium borohydride, magnesium borohydride, lithium borohydride, and potassium borohydride, more preferably $NaBH_4$ and/or $Mg(BH_4)_2$.

Liquid reactants other than water, such as methanol and other alcohols, can also be used to react with chemical metal hydrides. Liquid reactants can also be in gel forms, and both liquid and gel reactants are within the scope of the present invention.

Methanol gel is widely known and commercially available, and liquid water can be converted into a gel, as disclosed in commonly owned international application no. PCT/US2007/006384 and published as WO 2007/109036, which is incorporated herein by reference in its entirety. In one example, the liquid reactant is formed into a gel so that the liquid molecules are reversibly encapsulated in a matrix until it is needed for the reaction. In this way, the liquid component is not free-flowing to react at will. Water-insoluble, but water-swellable polymers capable of absorbing liquids can be used. When a water-insoluble, water-swellable material is added to water, the bond between the water-insoluble, water-swellable compound and water is sufficiently strong to hold the water, but sufficiently weak to surrender water molecules when another reaction, i.e., between water and $NaBH_4$, needs the water. Preferred water-insoluble, water-swellable materials include sodium polyacrylate, commonly used in infant diaper products, and polyacrylamide, among others. Suitable water-insoluble, water-swellable materials are described in U.S. Pat. No. 6,998,367 B2 and references cited therein. The water-insoluble, water-swellable polymers discussed in these references are incorporated herein by reference.

Other suitable water-insoluble, water-swellable polymers are disclosed in U.S. Pat. No. 6,998,377 B2, which is incorporated herein by reference in its entirety. The absorbent polymers of the present invention may also include at least one hydrogel-forming absorbent polymer (also referred to as hydrogel-forming polymer). Suitable hydrogel-forming polymers include a variety of water-insoluble, water-swellable polymers capable of absorbing liquids.

In solid form, $NaBH_4$, which is typically in the form of powder or granules or in the solid form of pressed particles, does not readily hydrolyze in the absence of water and therefore, using anhydrous borohydride improves the shelf life of the fuel supply or gas generator. However, the aqueous form of hydrogen-bearing fuel, such as aqueous $NaBH_4$, typically hydrolyzes readily unless a stabilizing agent is present. Exemplary stabilizing agents include, but are not limited to metals and metal hydroxides, such as alkali metal hydroxides, e.g., KOH and/or NaOH. Examples of such stabilizers are described in U.S. Pat. No. 6,683,025, which is incorporated by reference herein in its entirety.

The solid form of the hydrogen-bearing fuel is generally preferred over the aqueous form. In general, solid fuels are thought to be more advantageous than liquid fuels because the aqueous fuels contain proportionally less energy than the solid fuels and the liquid fuels are typically less stable than the solid fuels. Both the solid and aqueous forms of chemical hydride reactants are within the scope of the present invention.

Additionally, the reaction between $NaBH_4$ and water, once it begins, can be difficult to control, such that hydrogen may be produced unevenly with a spike in hydrogen production when fresh reactants are combined. After the initial spike, hydrogen production may drop to undesirable levels.

For clarity, the inventive embodiments are generally described herein with liquid reactant such as water and solid metal hydride reactant. The present invention is not so limited, and the term "viscous" is used to describe fuels in liquid, aqueous or gel form.

Figure 1:
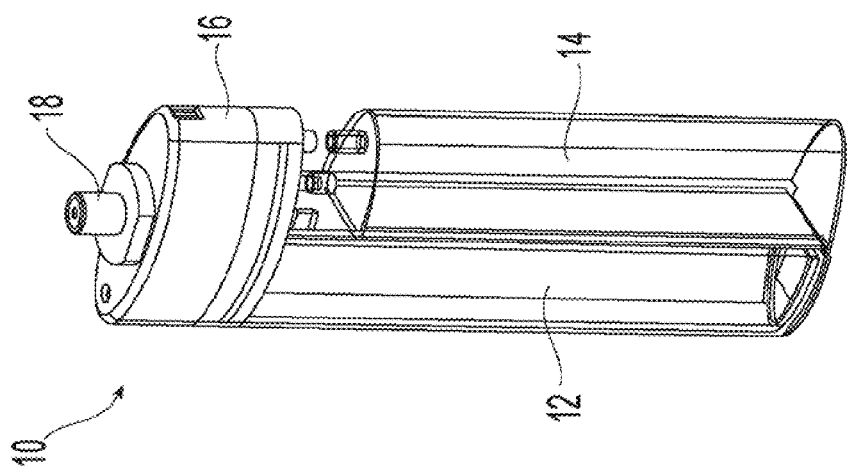
FIG. 1 is a perspective view of a fuel supply/hydrogen generator of the present invention.

In accordance with the present invention, a fuel supply or hydrogen generator capable of delivering single doses delivery of liquid fuel, such as water or methanol, to chemical metal hydride fuel, such as solid or aqueous sodium borohydride, is illustrated in FIGS. 1-5C. Referring to FIG. 1, an inventive hydrogen generator 10 is disclosed. Generator 10 comprises a liquid fuel chamber 12, which preferably contains pressurized viscous fuel in liquid or gel form, and a metal hydride fuel chamber 14, which preferably contains solid fuel. Such fuel chambers are disclosed in US 2006/0174952 previously incorporated by reference. Generator 10 further comprises a top portion 16, which houses the single dose delivery mechanism, among other mechanisms. A shut-off valve 18 is provided on top of hydrogen generator 10 and is connected directly or indirectly to a fuel cell or electronic equipment powered by a fuel cell. Shut-off valve 18 is one part of a two-component valve and is a spring biased check-valve similar to valve (62) described in US 2006/0174952. Shut-off valve 18 can be any type of valve that can be turned on or off.

Liquid fuel chamber 12 may be pressurized by methods described in US 2006/0174952, or it may be pressurized by inserting starter pill 20 into the liquid chamber. Preferably, starter pill 20 is made from the same material as the solid fuel in chamber 14, and reacts with the viscous fuel, such as water, in chamber 12 to produce hydrogen to pressurized liquid chamber 12. Starter pill is initially held by a plurality of claws 24 extending from holding arm 22. Holding arm 22 is connected to an activating rod 26 by frangible link 28. Activating rod 26 is slidably disposed in channel 30, and may protrude outside of top portion 16. Preferably, activating rod 26 is recessed within channel 30.

Figure 2:
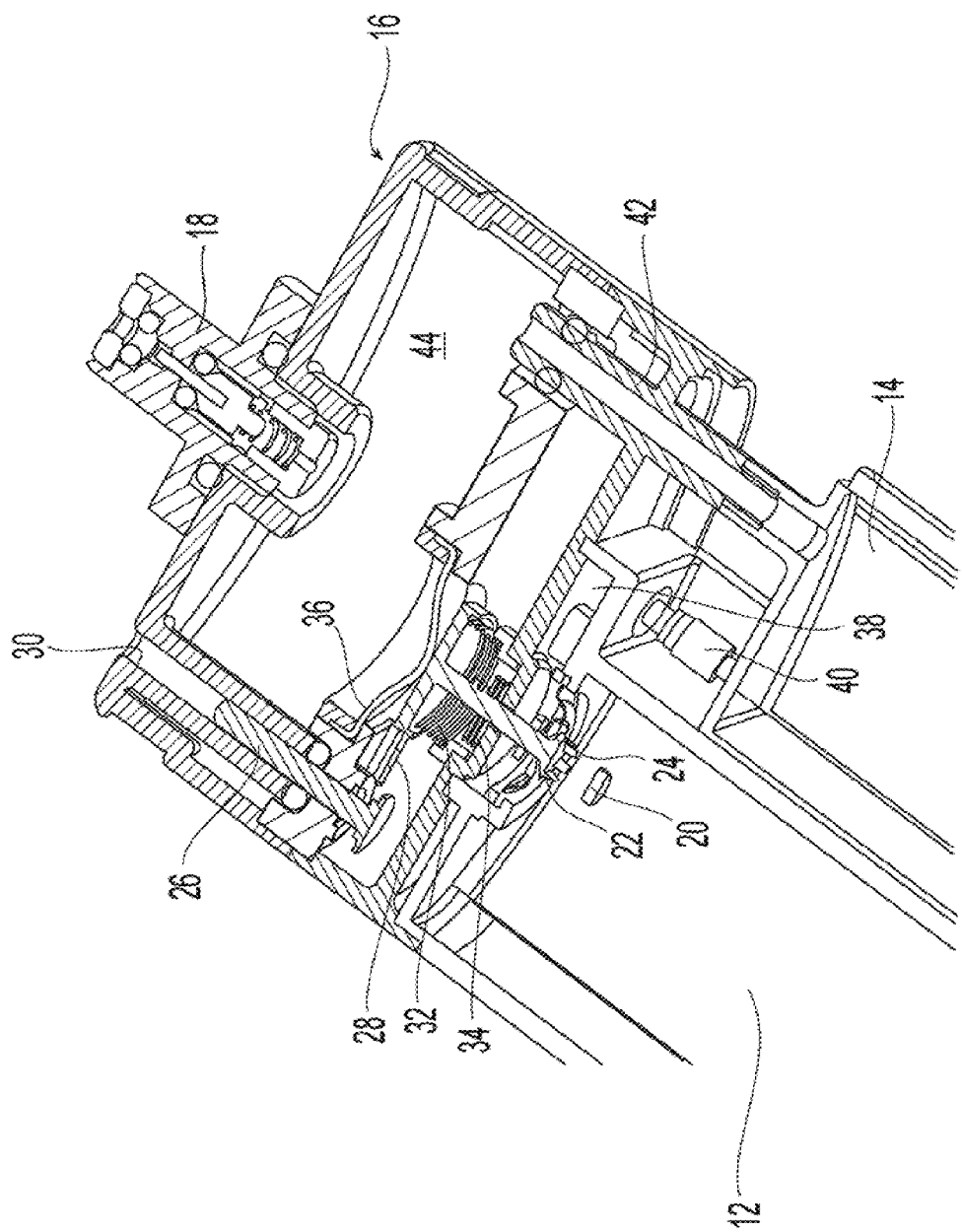
FIG. 2 is an enlarged partial cross-sectional view of the top portion of the generator of FIG. 1 with certain details omitted for clarity.

In order to initiate the reaction between starter pill 20 and the liquid fuel, the user pushes down on activating rod 26 with his/her finger or with an elongated tool if activating rod 26 is recessed. This pushing action fractures frangible link 28, as shown in FIG. 2, and this action dislodges starter pill 20 from claws 24 to release the starter pill. More specifically, as the user depresses activating rod 26, holding arm 22 is also pushed down against the biasing force of spring 32 and optionally spring 34 until frangible link 28 breaks. The energy stored in springs 32 and 34 is released, and holding arm 22 is pushed upward until it impacts diaphragm 36. This impact dislodges starter pill 20. The dislodgment of starter pill 20 can be accomplished by other methods upon the breakage of frangible link 28. Alternatively, frangible link 28 is designed to break automatically when chamber 12, which can be a modular unit, is inserted into hydrogen generator 10. Hydrogen generator 10 can be primed by other methods, such as a squeezable bellow positioned on the outer surface of the hydrogen generator for the user to squeeze to move the liquid fuel before the first use or when a gas bubble is present in the system. Other priming systems are described below.

Referring again to FIG. 2, the flow paths of the liquid fuel and the hydrogen are generally described. First, liquid fuel is transported under its own pressure or via a pump to viscous or liquid storage area 38, as further described in connection with FIGS. 3 and 4 below. From there, a single dose of liquid or viscous fuel is transported through valve 40 into chamber 14. In chamber 14, the liquid fuel reacts with the solid metal hydride fuel to produce hydrogen. The hydrogen flows through flow channel 42 into hydrogen storage area 44. If shut-off valve 18 is opened, then hydrogen gas flows out of hydrogen generator 10 to a fuel cell (not shown) to generate electricity. If shut-off valve 18 is closed, then hydrogen gas accumulates within hydrogen storage area 44 and builds up pressure therein.

Figure 4:
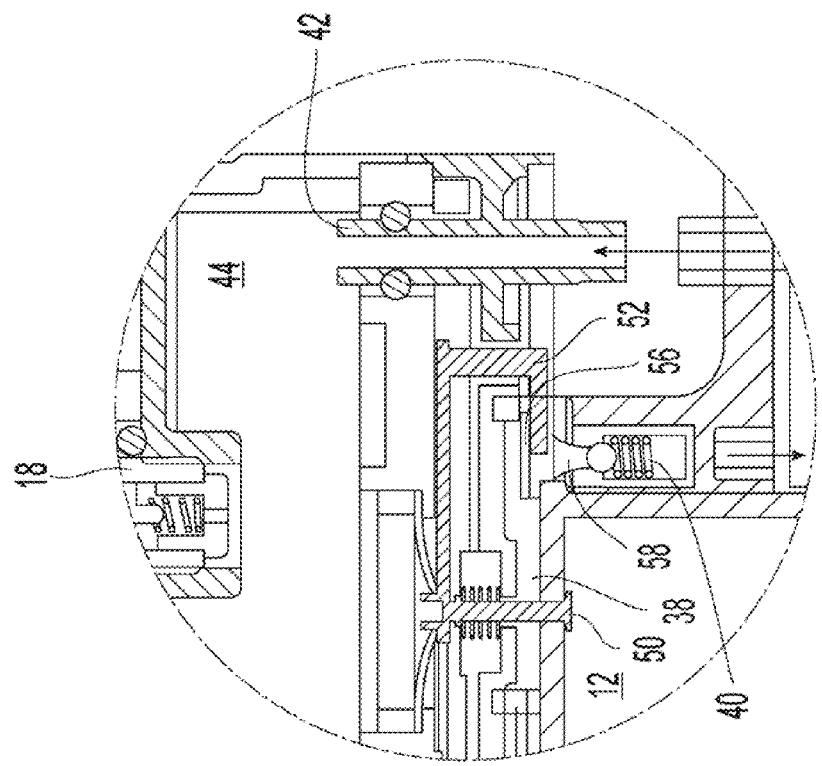
FIG. 4 is an enlarged cut-away partial cross-sectional view of FIG. 2 showing the single dose pump in an upstroke position with certain details omitted for clarity.
Figure 3:
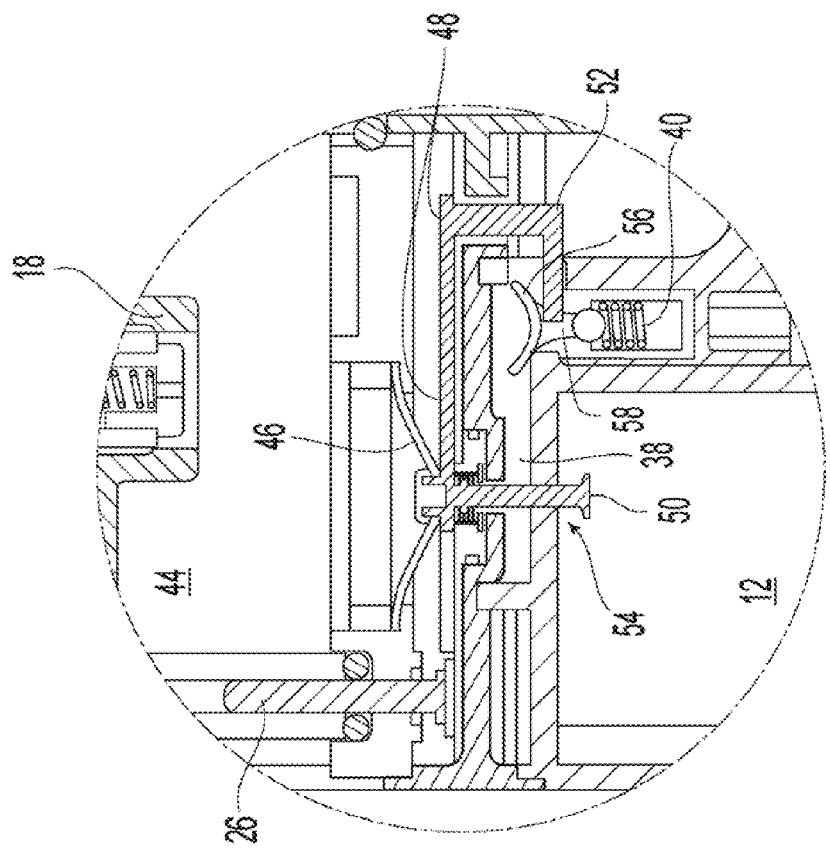
FIG. 3 is an enlarged cut-away partial cross-sectional view of FIG. 2 showing a single dose valve in a downstroke position with certain details omitted for clarity.

Referring to FIG. 3, which illustrates a downstroke configuration of hydrogen generator 10. In this configuration, the pressure of hydrogen storage area 44 is high, because shut-off valve 18 is closed or because the production of hydrogen is higher than the demand for hydrogen. High hydrogen pressure acts on diaphragm 46 pushing it downward. Fork 48, which is coupled to diaphragm 46, is also pushed downward. Fork 48 comprises straight portion 50 and yoke 52 and is movable up and down as shown in FIGS. 3 and 4. Straight portion 50 is positioned directly below diaphragm 46 and is movable into and out of liquid fuel chamber 12. When hydrogen pressure is high and diaphragm 46 is moved downward, straight portion 50 is moved into liquid fuel chamber 12, as shown in FIG. 3. Pressurized liquid fuel is moved along flow channel 54, which is defined between straight portion 50 and the side wall of liquid chamber 12, into viscous or liquid fuel storage chamber 38. In this configuration, liquid fuel stays within liquid fuel storage chamber 38, because yoke 52 of fork 48 and diaphragm 56 seals funnel 58, which leads to valve 40 and solid fuel chamber 14. Diaphragm 56 can be configured to flex under the pressure of the liquid fuel to seal funnel 58, or diaphragm 56 can be coupled to yoke 52, so that as fork 48 is pushed down by diaphragm 46 yoke 52 pulls diaphragm 56 downward over funnel 58. Diaphragm 56 can be configured to be flexible and be coupled to yoke 52.

It is noted that diaphragm 46 can be the same as diaphragm 36, shown in FIG. 2, and straight portion 50 can be the same as holding arm 22, also shown in FIG. 2.

When the pressure in hydrogen storage area 44 is low, hydrogen generator 10 is in an upstroke configuration, as shown in FIG. 4. Due to the low pressure, diaphragm 46 flexes upward pulling fork 48 upward. As fork 48 is pulled upward, straight portion 50 is pulled upward and its enlarged end closes flow channel 54 to seal viscous or liquid fuel storage area 38 from liquid fuel chamber 12 to prevent any backflow of fuel into chamber 12. Yoke 52 is also pulled upward and moves diaphragm 56 upward to open a flow path through funnel 58. The movements of yoke 52 and diaphragm 56 also pump the liquid fuel through valve 40 overcoming the spring force keeping valve 40 sealed. As shown, valve 40 is a check valve. However, valve 40 can be other types of valves that are sensitive to pressure to open, such as duckbill valves, flapper valves and other mechanical valves.

Advantageously, one upstroke of fork 48 pumps substantially one known dose of liquid fuel into solid fuel chamber 14. This known volume is substantially the same as the amount of flexure of diaphragm 56. In other words, this volume is the difference between the volume that diaphragm 56 can store between its flex state (i.e., the convex surface of diaphragm 56 in FIG. 3) and its unflex state (i.e., the substantially flat surface of diaphragm 56 in FIG. 4). Hence, whenever hydrogen is required a known dose of liquid fuel is discharged into solid fuel chamber 14 to produce a known quantity of hydrogen.

The counter-balance between the pressure of hydrogen storage area 44 and the flexing force of diaphragm 46 allows hydrogen generator 10 to be self-regulating as shown in the table below.

| Interaction b/w diaphragm 46 and pressure of $H_2$ storage 44 | Position of Fork 48 | Flow channel 54 | Diaphragm 56/ Funnel 58 | Flow of liquid fuel into solid fuel chamber 14 |
|---|---|---|---|---|
| When shut-off valve 18 is open | | | | |
| $P_{44} > F_{46}$ | downstroke | open -- liquid fuel can flow into liquid fuel storage area 38 | flex down/closed | none |
| $P_{44} < F_{46}$ | upstroke | closed | flex upward/open | single known dose |
| When shut-off valve 18 is closed | | | | |
| $P_{44} > F_{46}$ | downstroke | open | flex down/closed | none |

As shown when shut-off valve 18 is open, the production of hydrogen is automatic and only as needed. The production of hydrogen is terminated when shut-off valve 18 is closed. The pressure and flow sequences of the other embodiments of the present invention are similar to the one shown above and are discussed further below.

As discussed herein in connection with the embodiments of the present invention, diaphragm 46 may be biased or supported by a spring (such as spring 86, discussed below). This spring provides a force that opposes the hydrogen pressure. Such a spring may control the amount of flexing that diaphragm 46 and diaphragm 56 undergo, and the volume of the single dose dispensed. As used herein, the term "high pressure" is the pressure that provides a force necessary to overcome the force of diaphragm 46 and/or a supporting spring (such as spring 86) to pump, transport or store a single dose of liquid fuel. The term "low pressure" is the pressure that provides a force less than the force of diaphragm 46 and/or the supporting spring (such as spring 86) to transport the stored single dose of liquid fuel to the solid fuel chamber to react and create additional hydrogen fuel. In a non-limiting example, in a polymer electrolyte membrane or proton exchange membrane (PEM) fuel cell, the high pressure can range from about 5 psi to about 7 psi of relative pressure, and the low pressure can range from about 0.5 psi to about 2 psi, and the difference between the high and low pressure can be from about 0.5 psi to about 5 psi. In other types of fuel cells, the high and low pressure can be at any level.

To enhance the evenness of the reaction between the liquid fuel and solid fuel in solid fuel chamber 14, the present invention further provides a mixing mechanism 60, as shown in FIGS. 5A-5C. Mixing mechanism 60 comprises a flat tube 62 rolled up around a spool 64. Spool 64 straddles supports 66. Spool 64 and supports 66 are positioned in hydrogen storage area 44, but can also be positioned elsewhere. As best shown in FIG. 5C, spool 64 is biased by coil spring 68. One end of coil spring 68 is fixed to post 70, which is attached to the wall of top portion 16 of hydrogen generator 10. The other end of coil spring 68 is fixed to stop 72 on the walls of spool 64. Free end 74 of flat tube 62 is disposed in solid fuel chamber 14 and has a bent portion adapted to go across the soft borate by-product of the reaction between water and metal hydride. As coil spring 68 rolls up flat tube 62, it drags free end 74 through the by-product to expose fresh unreacted solid fuel to new liquid fuel to enhance the reaction of the fuels contained within solid fuel chamber 14. Improved mixing can be achieved when aqueous metal hydride fuel is used in chamber 14.

Advantageously, during storage or before the first use, the solid fuel prevents coil spring 68 from rolling up free end 74, because the solid fuel in powder or granular form can retain or prevent free end 74 from moving. After the first use, the reacted fuel takes on a soft consistency of the borate by-product, thereby allowing the free end 74 to be rolled up through the soft by-product.

As shown in FIGS. 3 and 4, diaphragms 46 and 56, fork 48, liquid storage area 38, and other related components together form a pump or valve that during high hydrogen pressure stores a known dosage or volume of liquid fuel and during low hydrogen pressure transports this dosage of liquid fuel to the solid fuel to react to create additional hydrogen. This cycle automatically repeats until fuel is exhausted or until the generator is shut-off. Several embodiments described below also follow this cycle.

Figure 6A:
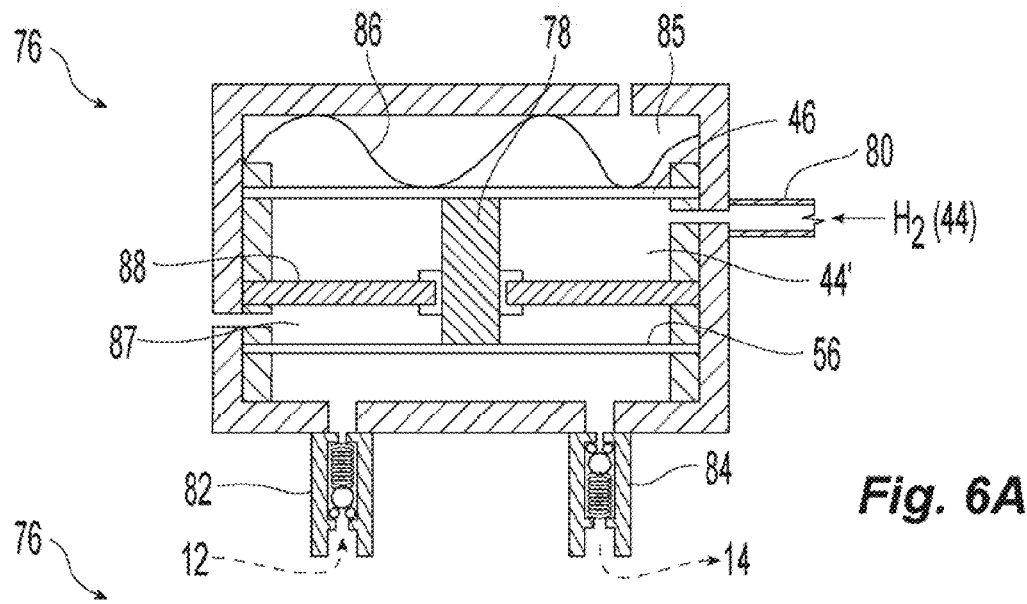
FIGS. 6A-6C are cross-sectional views of a single dose pump in accordance with the present invention in the intermediate, upstroke and downstroke configurations, respectively.
Figure 6B:
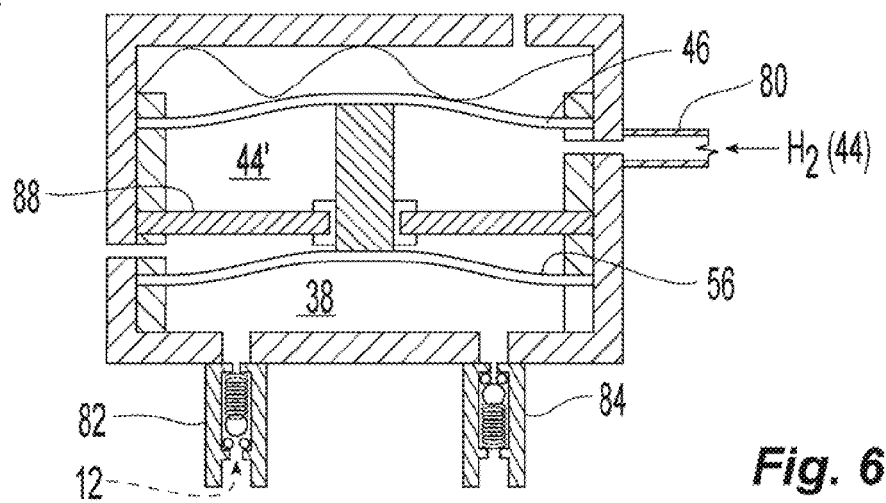
Figure 6C:
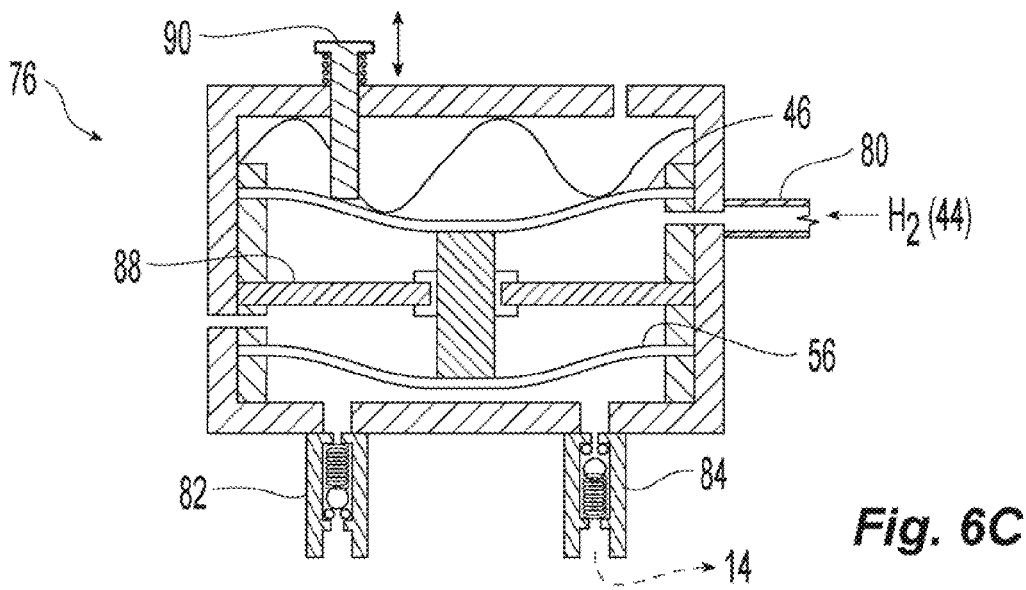

One such embodiment is shown in FIGS. 6A-6C. Components that perform similar functions are assigned similar reference numbers. This naming convention is intended to show commonality among similar embodiments and is not intended to limit the scope of the present invention. Single dose pump or valve 76 is exposed to the pressure of hydrogen storage area 44 (through conduit 80) and is fluidly connectable to liquid fuel chamber 12 (through valve 82) and solid fuel chamber 14 (through valve 84). Hydrogen storage area 44 can also be within solid fuel chamber 14. The terms "pump" and "valve" can be used interchangeably in a number of embodiments of the present invention. However, for the device shown in FIGS. 6A-6C for example, the term "pump" or "diaphragm pump" is more acceptable. Alternatively, the term "pump" is preferably used when the liquid fuel is unpressurized and the term "valve" is preferably used when the liquid fuel is pressurized. Certain embodiments of single dose pump/valve 76 can be used with both pressurized and unpressurized liquid fuel.

Single dose pump/valve 76 is adapted to be used within hydrogen generator 10, described above, or any hydrogen generators that have a liquid fuel chamber and a solid fuel chamber, such as those incorporated by referenced above. Pump 76 comprises first diaphragm 46, which is exposed to the hydrogen pressure in hydrogen storage area 44, and second diaphragm 56, which flexes to store a single known dose of liquid fuel and relaxes to transport said dose to the solid fuel. The diaphragms are connected to each other by post 78, so that they can move together.

Diaphragm 46 forms with the top wall of pump 76 spring chamber 85, which houses spring 86. Chamber 85 is open to the atmosphere, as shown, so that diaphragm 46 can move up and down without having to compress trapped air. Alternatively, chamber 85 is sealed and contains a pressurized gas, such as liquefied butane or other hydrocarbon, instead of a spring.

Hydrogen gas from hydrogen storage area 44 is communicated through conduit 80 to hydrogen compartment 44', which would have the same pressure as hydrogen storage area 44. Hydrogen compartment 44' is defined between diaphragm 46 and separator 88. Column 78 is sealingly and slidingly connected to separator 88, so that column 78, which connects the two diaphragms, can move relative to separator 88 without releasing hydrogen. Chamber 87 is defined between separator 88 and diaphragm 56, and is open to atmosphere, so that diaphragm 56 can move up and down without having to compress air trapped within chamber 87. The area below diaphragm 56 is liquid storage area 38.

The hydrogen pressure flexes diaphragm 46 up and down against the force of biasing spring 86. The force of spring 86 is selected, such that when the hydrogen pressure is above the spring force, diaphragm 46 is moved upward against spring 86 thereby pulling diaphragm 56 upward also, as illustrated in FIG. 6B. This creates a partial vacuum in liquid storage area 38 that simultaneously opens valve 82, which is shown as a check valve with the sealing surface facing toward liquid fuel chamber 12, and closes valve 84, which is shown as a check valve with the sealing surface facing away from solid fuel chamber 14. With valve 82 opened and valve 84 closed, a known dose of liquid is stored in liquid storage area 38. Valve 82 and 84 can be check or ball valves (as shown), flapper valves, duckbill valves, or any other pressure responsive valves. Duckbill valves are discussed in US 2006/0174952, previously incorporated by reference.

When the hydrogen pressure is below the spring force of spring 86, e.g., due to the usage of hydrogen by the fuel cell(s), spring 86 pushes diaphragms 46 and 56 downward, as shown in FIG. 6C. This action creates a positive pressure in liquid storage area 38, which closes valve 82 and opens valve 84 to transport the known dose of liquid stored in liquid storage area 38 into solid fuel chamber 14. As more hydrogen is produced by the fresh reaction, the hydrogen pressure increases which pushes diaphragms 46 and 56 upward to close valve 84 and open valve 82, as shown in FIG. 6B, to pump another known dose of liquid fuel into liquid storage area 38 to start another cycle.

The volume of the single dose can be determined by the movements of diaphragms 46 and 56, and the diaphragm movements can be adjusted by varying the spring constant of spring 86. Additionally, pump 76 is provided with manual primer 90. The user may prime pump 76 before the first use by moving manual primer 90 up and down to pump liquid fuel into and filling liquid storage chamber 38 and out into solid fuel chamber 14 to start the reaction. Preferably, manual primer 90 is spring loaded, as shown in FIG. 6C.

Additionally, while the liquid fuel can be pressurized to flow automatically into liquid storage area 38 when valve 82 is opened, the liquid fuel can also be substantially unpressurized. Since a partial vacuum is created in the configuration of FIG. 6B, the vacuum can be sufficient to draw liquid fuel into liquid storage area 38, e.g., when liquid fuel is wicked up adjacent to valve 82. When pressurized liquid is used, preferably the pressure is not sufficiently strong to open valve 82 or 84 by itself.

The counter-balance between the pressure of hydrogen compartment 44', the force of spring 86 and the flexing force of diaphragm 46 allows hydrogen generator 10 to be self-regulating as shown in the table below.

| Interaction b/w spring 86, diaphragm 46 and $H_2$ pressure 44' | Diaphragms 46 and 56 | Valve 82 | Valve 84 | Flow of liquid fuel into solid fuel chamber 14 |
| --- | --- | --- | --- | --- |
| When shut-off valve 18 is open | | | | |
| $P_{44'} > F_{46+86}$ | upstroke | open - liquid fuel can flow into liquid fuel storage area 38 | closed | none |
| $P_{44'} < F_{46+86}$ | downstroke | closed | flex upward/open | single known dose |
| When shut-off valve 18 is closed | | | | |
| $P_{44'} > F_{46+86}$ | upstroke | open | closed | none |
| $P_{44'} = F_{46+86}$ | flat | closed | closed | none |

The pressure and flow sequences of the other embodiments of the present invention are similar to this one and are discussed further below.

Figures 7A, 8A, 8B, 8C:
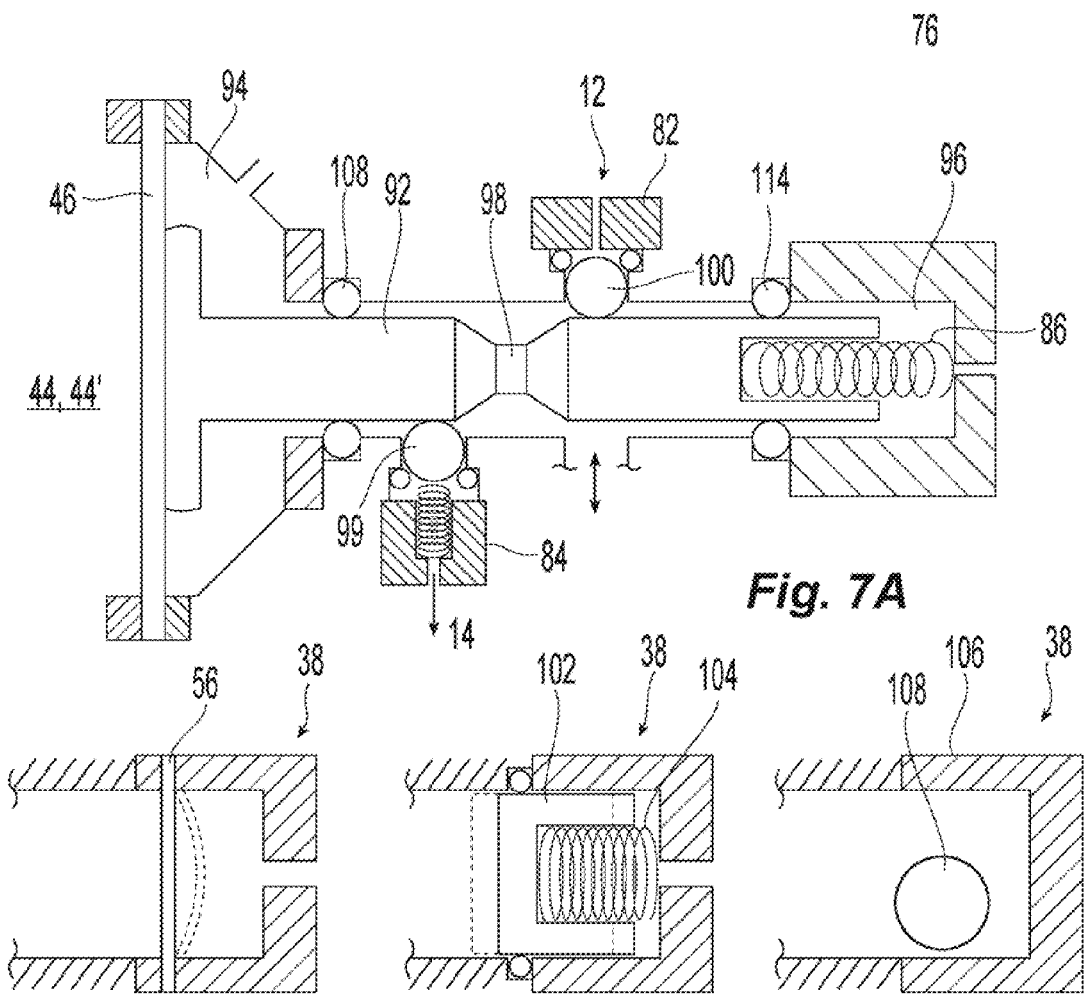
FIGS. 7A-7C are cross-sectional views of another single dose valve in accordance with the present invention in the intermediate, upstroke and downstroke configurations.
FIGS. 8A-8C are partial cross-sectional views of various embodiments of the liquid storage area usable with the present invention.
Figure 7B:
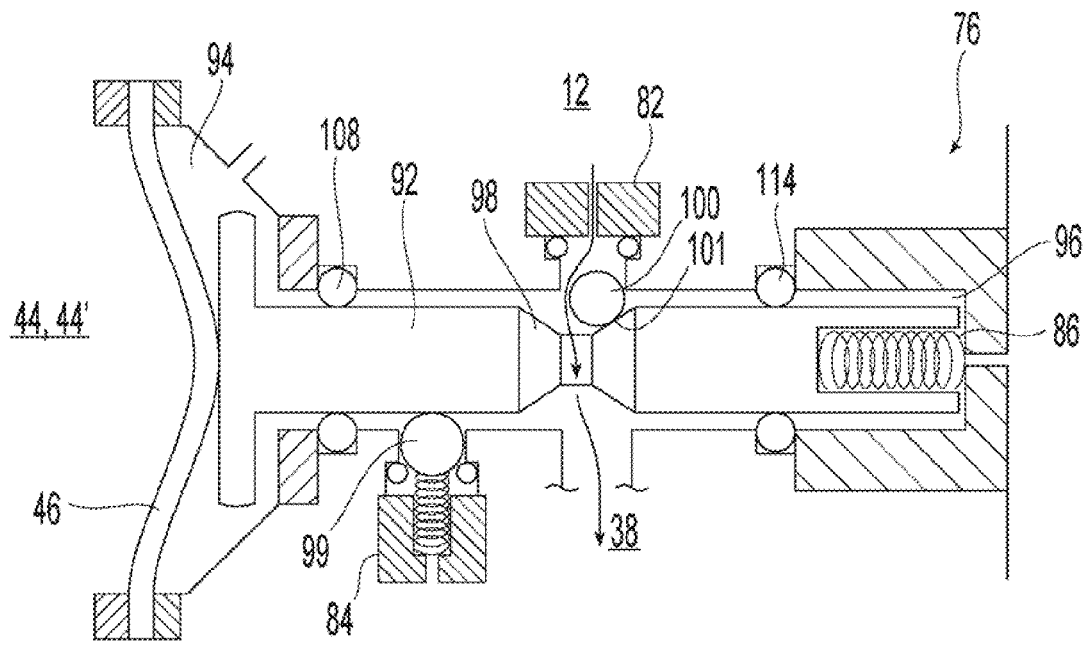
Figure 7C:
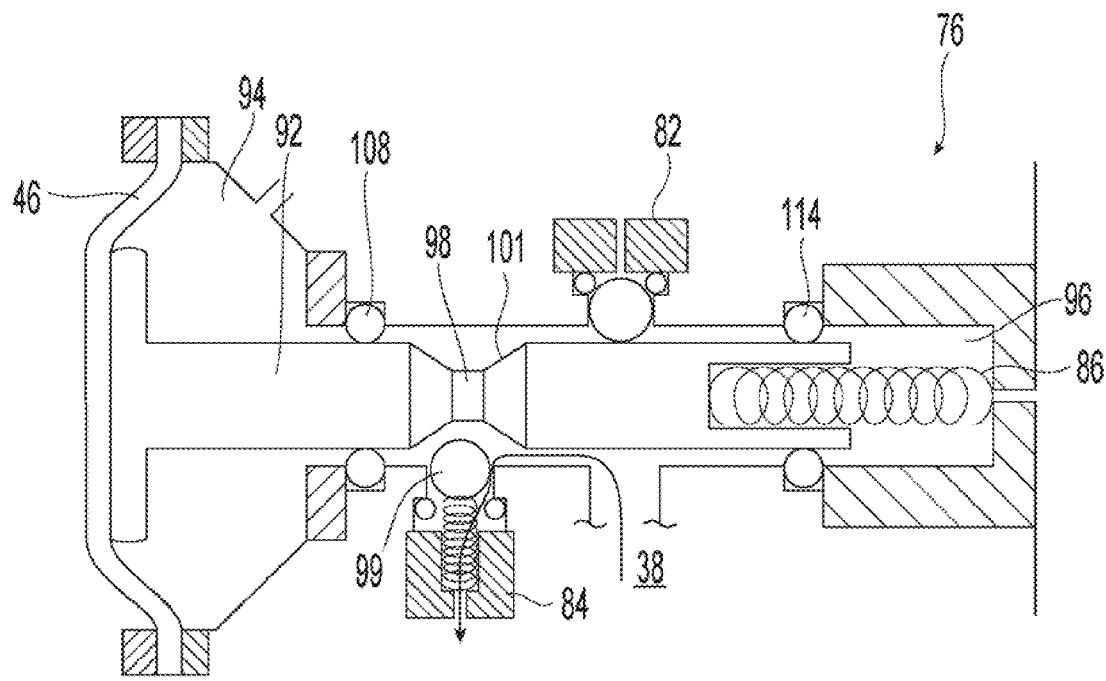

Referring to FIGS. 7A-7C, another embodiment of single dose valve 76 is illustrated. In this embodiment, single dose valve 76 is also exposed to the pressure of hydrogen storage area 44 or hydrogen compartment 44', and is fluidly connectable to liquid fuel chamber 12 (through valve 82) and solid fuel chamber 14 (through valve 84). In this embodiment, preferably the liquid fuel chamber is pressurized. As shown in FIG. 7A, single dose valve 76 has spool 92. The first end of spool 92 is connected or otherwise coupled to diaphragm 46, such that spool 92 is moving with diaphragm 46. The first end of spool 92 is housed in first vented chamber 94, so that the movement of diaphragm 46 would not compress air. The second end of spool 92 is housed in second vented chamber 96, and is biased by spring 86. The first and second ends of spool 94 are sealed from the middle section of spool 94 by two sets of O-rings 108 and 114, as shown. The middle section of spool 92 is exposed to liquid fuel and should be isolated from the vented chambers.

The spring constant of spring 86 is pre-selected to balance the hydrogen pressure of hydrogen storage area 44, similar to the embodiment shown in FIGS. 6A-6C. When the hydrogen pressure is high, diaphragm 46 and spool 92 are pushed to the right, as shown in FIG. 7B, compressing spring 86 and aligning valve 82 with waist section 98. Pressurized liquid fuel from liquid fuel chamber 12 pushes ball 100 of valve 82 into waist section 98. This clears a flow path for the liquid fuel from liquid fuel chamber 12 through opened valve 82 around waist section 98 to liquid fuel storage area 38. Liquid storage area 38 can have a number of configurations, such as those in the embodiments shown in FIGS. 1-5C and FIGS. 6A-6C or in the configurations shown in FIGS. 8A-8C, discussed in detail below, among others.

When the hydrogen pressure is low, for example due to usage of hydrogen by the fuel cell, spring 86 and/or diaphragm 46 push spool 92 to the left, as shown in FIG. 7C. This motion pushes ball 100 up ramp 101 of waist section 98 resealing valve 82, and isolates pressurized liquid fuel chamber 12 from single dose valve 76. Waist section 98 aligns with valve 84, and spring-loaded ball 99 of valve 84 is pushed into waist area 98, as shown. This opens valve 84. The pressurized liquid fuel stored in liquid storage area 38 is pushed or transported from liquid storage area 38 through open valve 84 and into solid fuel component 14.

As mentioned above, liquid storage area 38 has multiple embodiments. In FIG. 8A, liquid storage area 38 comprises diaphragm 56, whose function is to flex or bow (shown in broken line) to store a single dose of liquid fuel and returns to its relaxed state (shown in solid line) to pump the single dose of liquid fuel to solid fuel chamber 14. Diaphragm 56 is housed in a vented chamber, so that the movement of diaphragm 56 would not cause any air to be compressed, similar to the function of vented chambers 94 and 96 above. The volume of the single dose is the difference in volume between the flexed state and the relaxed state of diaphragm 56.

In FIG. 8B, liquid storage area 38 has a spring-biased piston or fork 102 movably housed in a vented chamber. Fork or piston 102 is also sealed to the walls of the vented chamber. The function of piston or fork 102 is similar to that of diaphragm 56, i.e., it moves against spring 104 to store a single dose of liquid fuel (shown in solid line) and returns to its relaxed state (shown in broken line) to pump the single dose of liquid fuel. The volume of the single dose is the difference in the positions of piston or fork 102.

In FIG. 8C, liquid storage area 38 has a sealed end 106 which contains expandable member 108, which is preferably an elastomeric balloon. Member 108 can have any shape. When pressurized liquid fuel is transported into seal end 106, its pressure compresses sphere 108 thereby storing a single dose of fuel. When member 108 relaxes, it expands to pump the single dose of liquid fuel. The volume of the single dose is the difference in the volumes of member 108 in its compressed state and in its relaxed/expanded state. Member 108 is preferably thin walled and contains a compressible gas, such as hydrogen, nitrogen or an inert gas, or combination thereof.

Figure 9A:
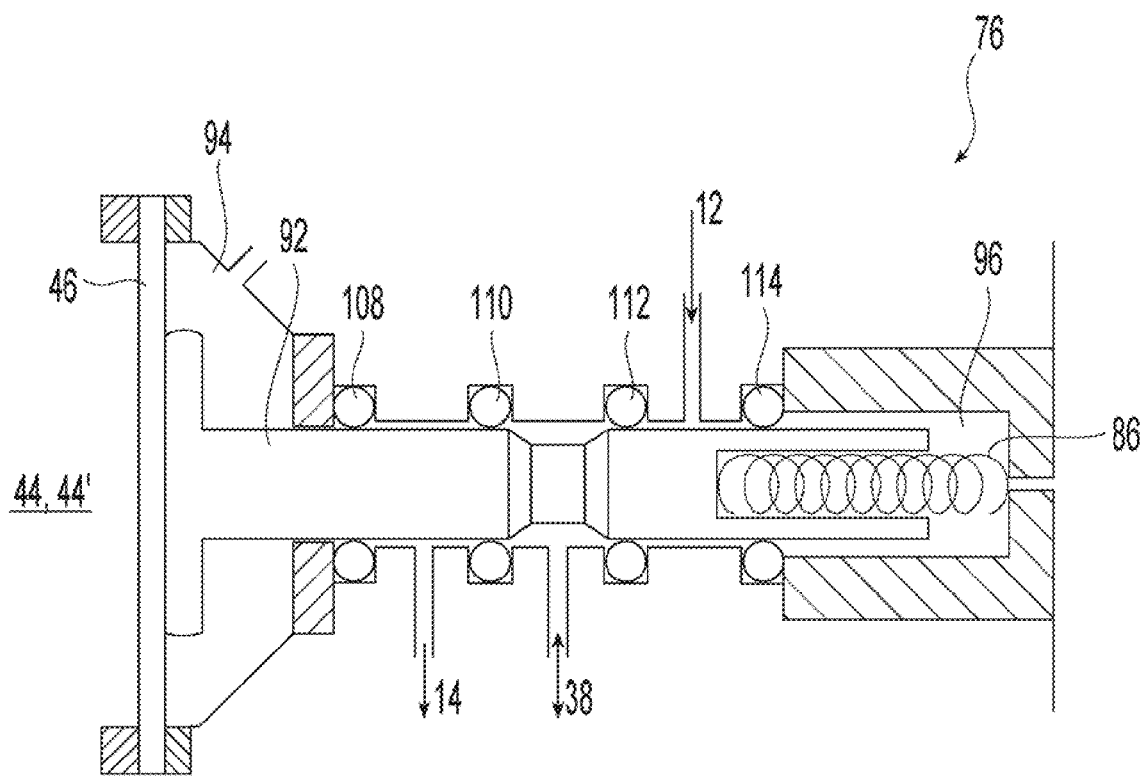
FIGS. 9A-9C are cross-sectional views of another single dose valve in accordance with the present invention in the intermediate, upstroke and downstroke configurations.
Figure 9B:
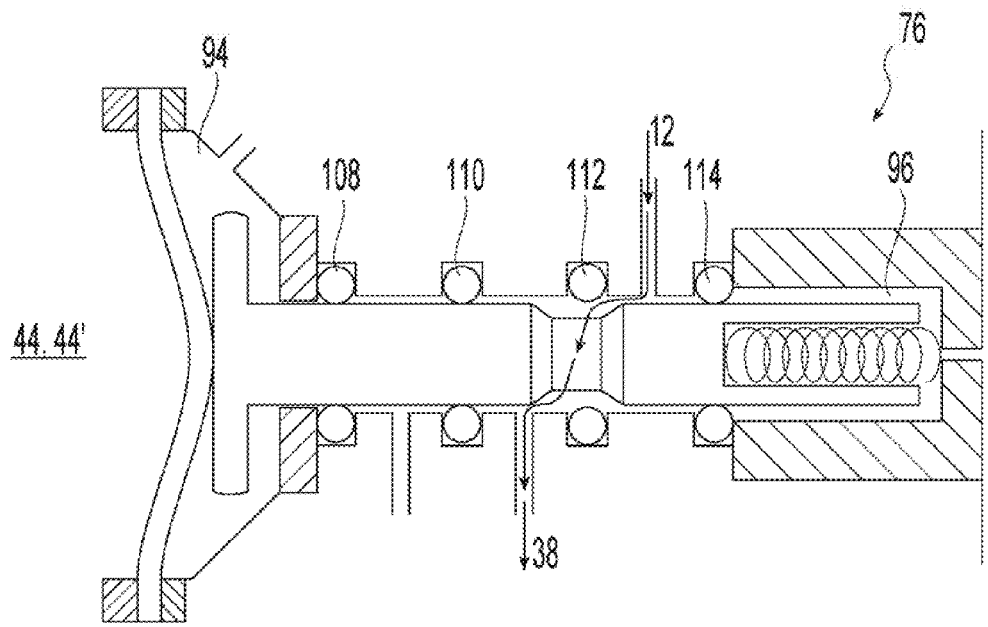
Figure 9C:
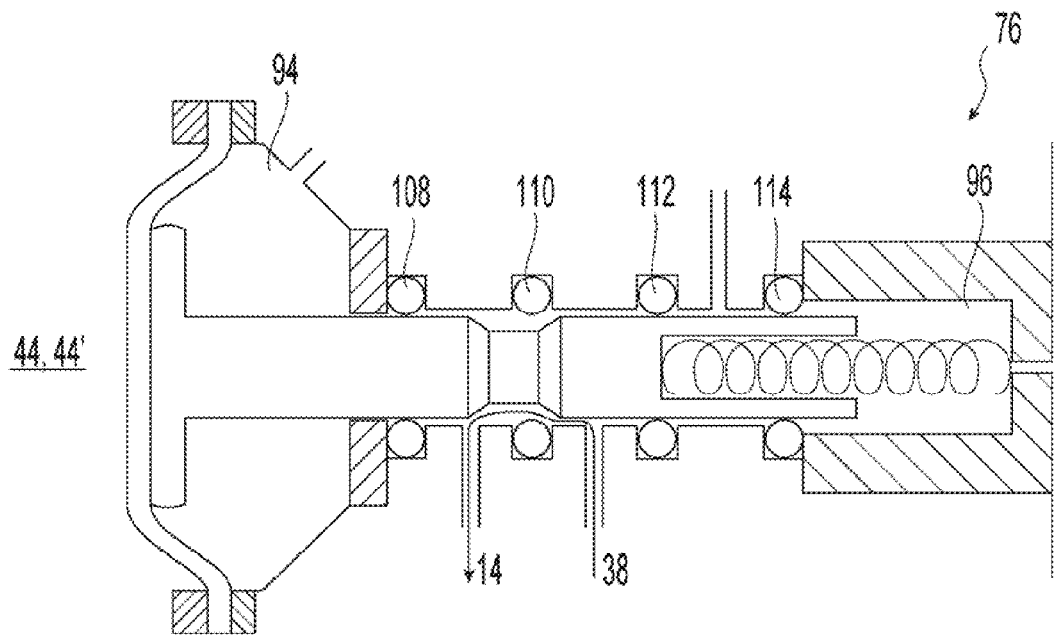

The single dose valve 76, shown in FIGS. 9A-9C, is similar to the one shown in FIGS. 7A-7C, in that spool 92 is balanced between diaphragm 46, which is coupled to spool 92 and spring 86. Instead of valves 82 and 84, this version of valve 76 has four O-rings, 108, 110, 12 end 114. O-rings 108 and 114 perform the same function as in the embodiment of FIGS. 7A-7C. Here in the intermediate configuration of FIG. 9A, liquid fuel chamber 12, which is pressurized, is isolated between O-rings 112 and 114, and solid fuel chamber 14 is isolated between O-rings 108 and 110. When the hydrogen pressure is high, as shown in FIG. 9B, O-ring 112 is positioned above waist section 98 and pressurized liquid fuel is in fluid communication with liquid storage area 38, and a single dose of liquid fuel is stored therein. When the hydrogen pressure is low, as shown in FIG. 9C, O-ring 110 is positioned above waist section 98 and the stored pressurized single dose in liquid storage area 38 is transported to solid fuel chamber 14 to start a fresh reaction to produce more hydrogen. Additionally, since there is no valve in this embodiment, ramp 101 of waist section 98 is optional.

Figure 10A:
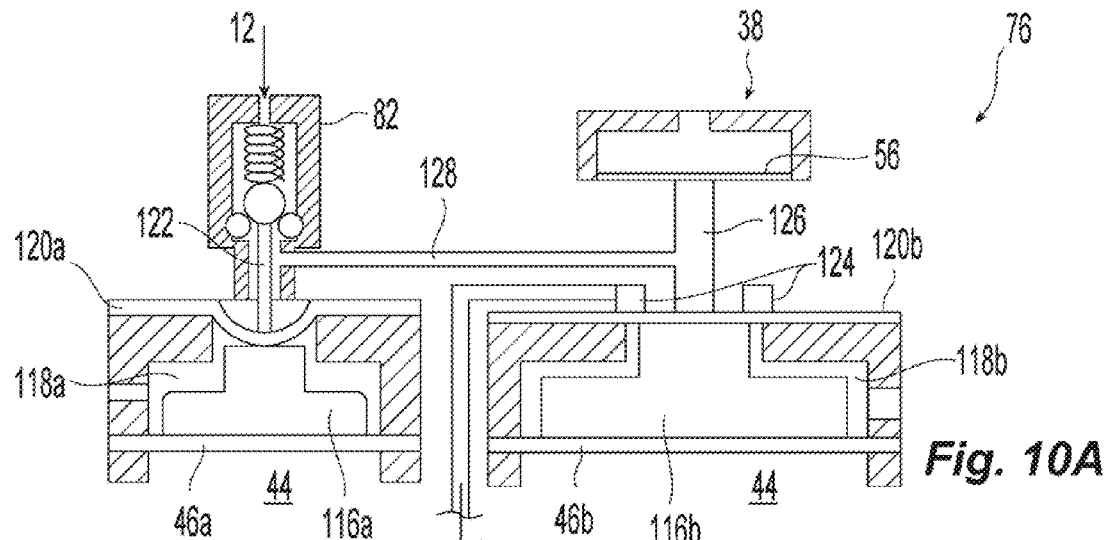
FIGS. 10A-10C are cross-sectional views of another single dose valve in accordance with the present invention in the intermediate, upstroke and downstroke configurations.
Figure 10B:
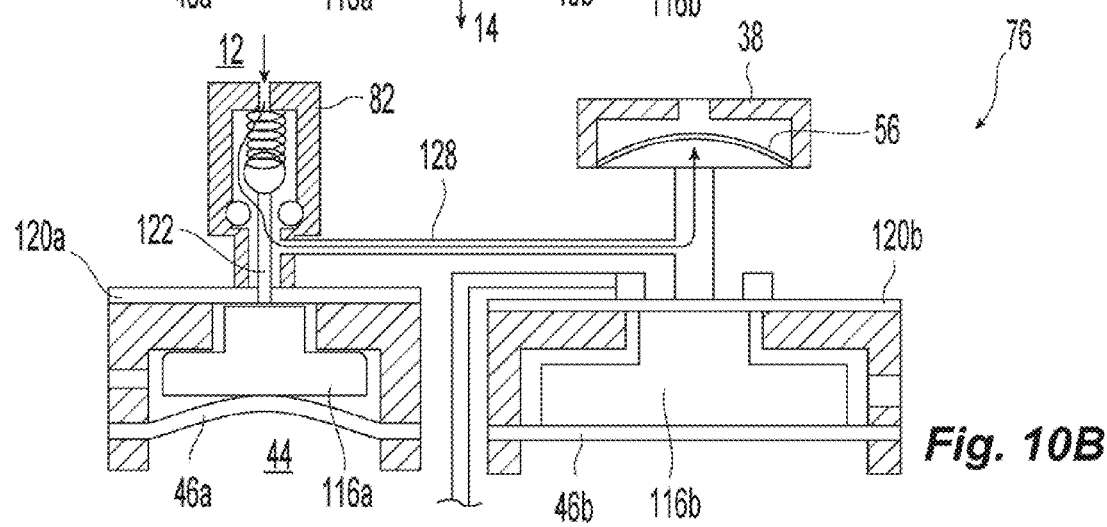
Figure 10C:
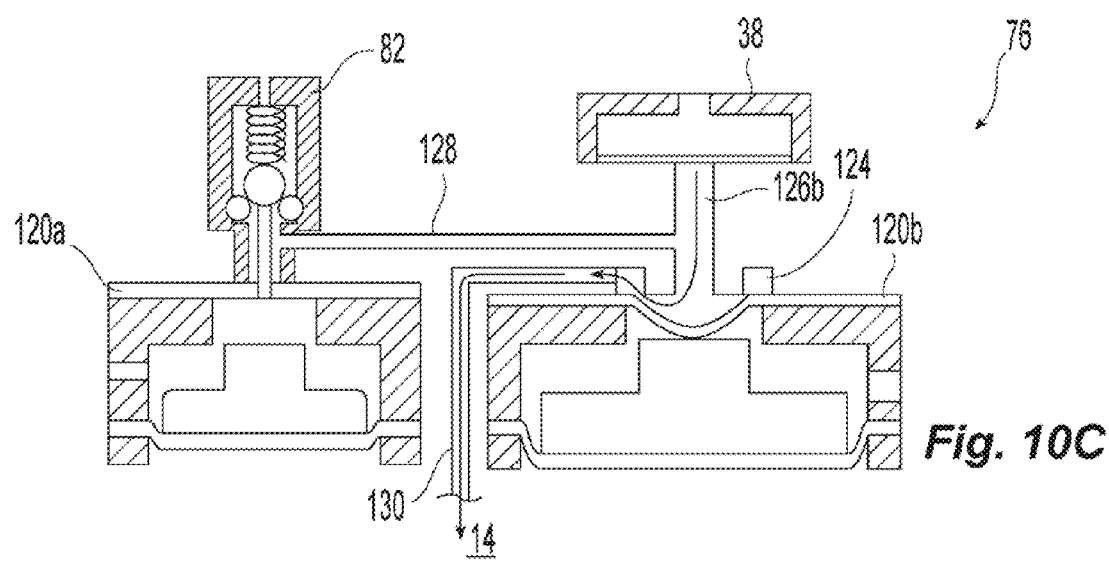

Another single dose valve 76 is shown in FIGS. 10A-10C. This embodiment is different from the embodiments of FIGS. 7A-7C and 9A-9C in that this embodiment encounters less friction, since there are no O-rings rubbing against spool 92 as it moves in response to the changing hydrogen pressure. This embodiment has a first diaphragm 46a, which is exposed to the hydrogen pressure from hydrogen storage area 44 or hydrogen compartment 44'. First diaphragm 46a is coupled to a first piston 116a, which is disposed in a first vented chamber 118a. The other end of first piston 116a is coupled to second diaphragm 120a, as shown in the intermediate configuration of FIG. 10A. A pushing rod 122 is in direct contact with second diaphragm 120a and in indirect contact with first piston 116a, so that as the hydrogen pressure moves first piston 116a, pushing rod 122 can move up to open valve 82, as shown in FIG. 10B, and can move down to close valve 82, as shown in FIG. 10C.

This embodiment also has a third diaphragm 46b, which is also exposed to the hydrogen pressure from hydrogen storage area 44 or hydrogen compartment 44'. Third diaphragm 46b is coupled to a second piston 116b, which is disposed in a second vented chamber 118b. The other end of second piston 116b is coupled to a fourth diaphragm 120b, as shown in the intermediate configuration of FIG. 10A. When second piston 116b is pushed upward due to high hydrogen pressure, it seals fourth diaphragm 120b against circular channel 124 and channel 126, which is connected to liquid storage area 38, as shown in FIG. 10B. When the hydrogen pressure is low, second piston 116b is moved down allowing third diaphragm 46b to bow downward to allow channel 126 to be in fluid communication with circular channel 124, as shown in FIG. 10C.

The operation of the single dose valve shown in FIGS. 10A-10C is as follows. When the hydrogen pressure is high, first diaphragm 46a pushes first piston 116a and rod 122 upward to open valve 82 which allows pressurized liquid fuel from liquid fuel chamber 12 to flow through valve 82 and into connecting channel 128 and into channel 126, as shown in FIG. 10B. Since high hydrogen pressure also pushes third diaphragm 46b and second piston 116b upward, channel 126 is sealed at its bottom end by fourth diaphragm 120b, as also shown in FIG. 10B. This forces the pressurized liquid fuel upward into liquid fuel storage area 38 and flexes diaphragm 56 to store a single dose of liquid fuel.

When the hydrogen pressure is low, both diaphragms 46a and 46b move downward thereby pulling pistons 116a and 116b downward. These movements seal valve 82 and isolate liquid fuel chamber 12. These movements also flexes fourth diaphragm 120b downward to fluidly connect channel 126 to circular channel 124, as shown in FIG. 10C. The pressurized single dose of liquid fuel stored in liquid storage area 38 flows back into channel 126. Since valve 82 is closed, the liquid fuel bypasses connecting channel 128 and into the flexed portion of fourth diaphragm 120b. From there, the liquid fuel flows into circular channel 124 and into exit channel 130 and into solid fuel chamber 14 to react with the solid fuel. The opening and closing of channel 124 function as a valve to transport liquid fuel to fuel chamber 14.

The sequencing of the flow pattern for single dose valve 76, shown in FIGS. 10A-10C, can be controlled by the relative movements or flexing abilities of diaphragms 46a and 46b. For example, first diaphragm 46a can be selected to flex before third diaphragm 46b, so that valve 82 is opened first. Diaphragms 46a and 46b can have different thicknesses or surface areas exposed to hydrogen to create different flexing abilities. Alternatively, biasing springs, such as coil springs or leaf springs, can be added between piston 116a or piston 116b and diaphragm 46a or 46b, respectively, or between piston 16a or piston 116b and diaphragm 120a or 120b, or between piston 116a or piston 116b and chamber walls, respectively. Pistons 116a and 116b can be connected to each other or made integral to each other.

Figure 11A:
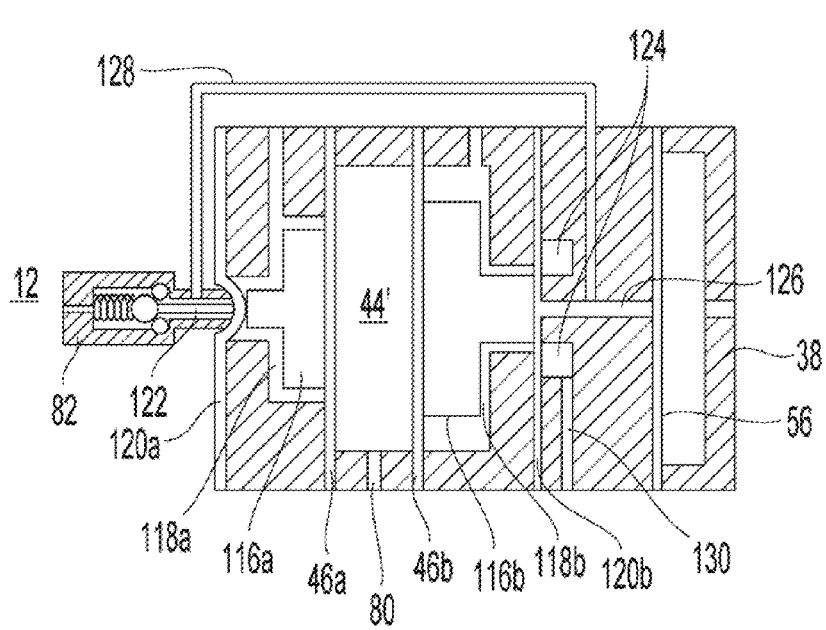
FIGS. 11A-11C are cross-sectional views of another single dose valve in accordance with the present invention in the intermediate, upstroke and downstroke configurations.
Figure 11B:
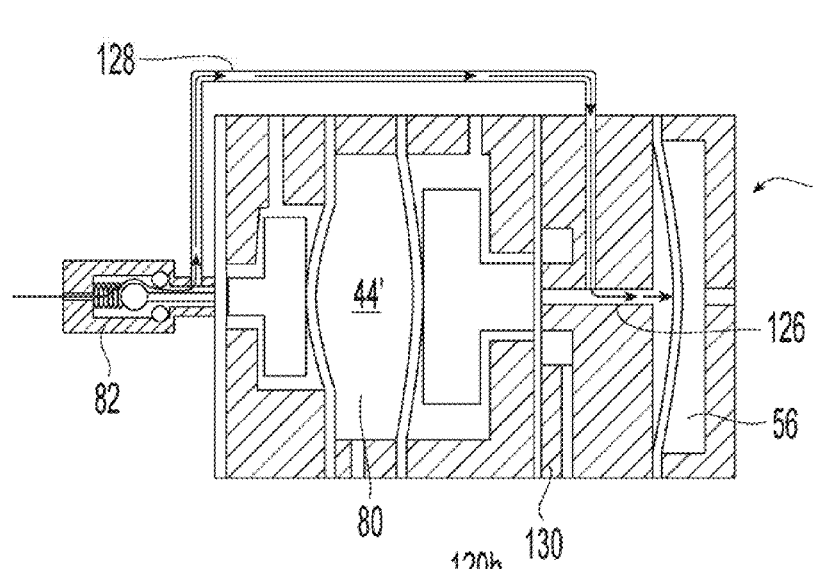
Figure 11C:
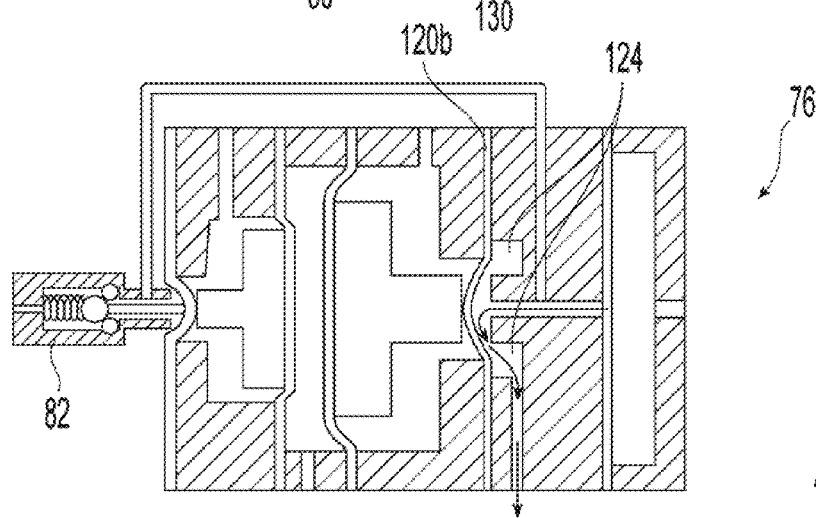

The single dose valve 76 shown in FIGS. 11A-11C is substantially similar to that of FIGS. 10A-10C, except that first and third diaphragms 46a and 46b are facing each other. These diaphragms are still exposed to the same hydrogen pressure. Hydrogen gas from hydrogen storage area 44 is communicated through conduit 80 to hydrogen compartment 44'. These two single dose valves 76 also have the same or substantially similar components.

Figure 12A:
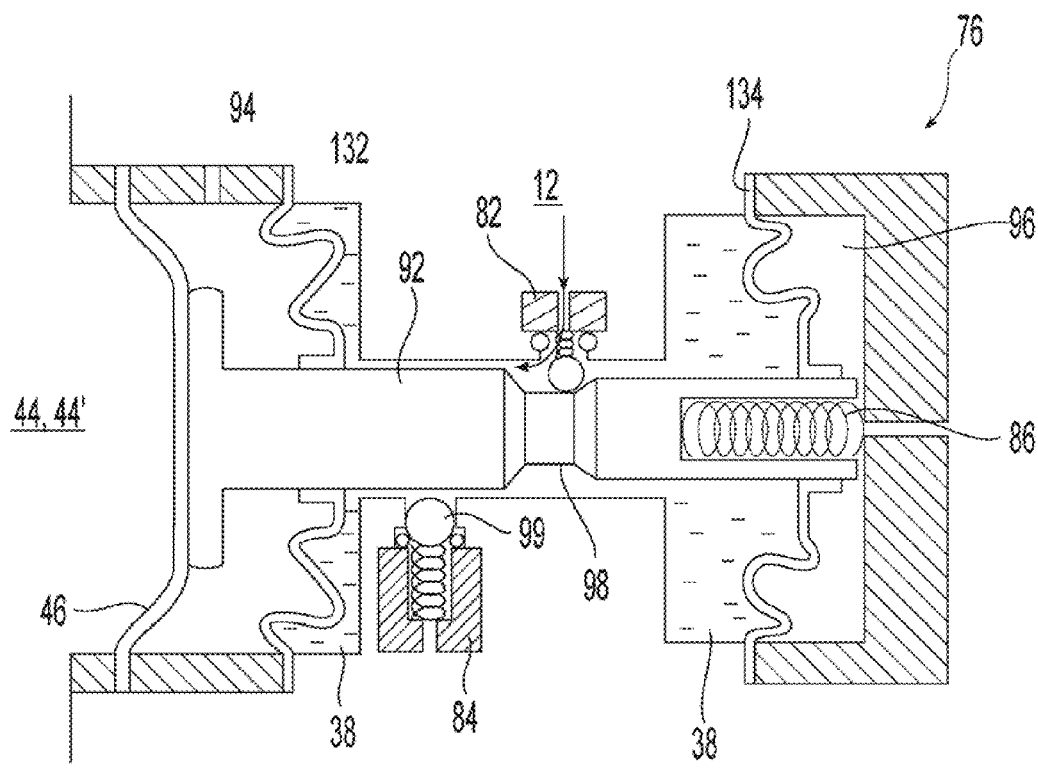
FIGS. 12A-12B are cross-sectional views of another single dose valve in accordance with the present invention in the upstroke and downstroke configurations.
Figure 12B:
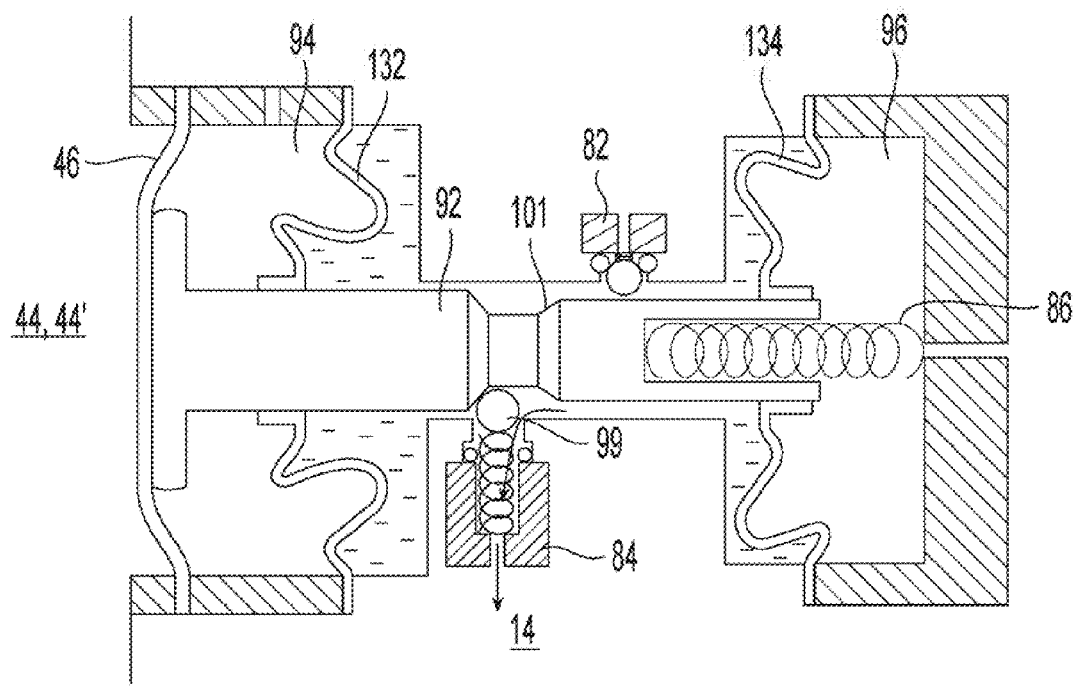

Another single dose valve 76 is shown in FIGS. 12A-12B. This valve is preferably adapted for use with pressurized liquid fuel from liquid fuel chamber 12. This embodiment is similar to the single dose valve shown in FIGS. 7A-7C, except that no O-ring is used and that single dose liquid fuel storage area 38 is integrally formed to the main body of valve 76. In this embodiment, the liquid storage area is formed by first bellow 132, second bellow 134, the outer surface of spool 92 and the surfaces of valve 76. When the hydrogen pressure is high, spool 92 is pushed to the right as shown in FIG. 12A (similar to the embodiment of FIGS. 7A-7C) until waist area 98 opposes ball 100 of valve 82. Ball 100 is pushed into the waist area 98 to open valve 82 and pressurized liquid fuel flows into liquid storage area 38 and expands one or both bellows 132 and 134, storing a known single dose of liquid fuel therewithin. When the hydrogen pressure is low, spool 92 is moved to the left, as shown in FIG. 12B, until ball 99 of valve 84 is pushed into waist area 98 to open valve 84. The single dose of pressurized liquid fuel in liquid storage area 38 is transported through open valve 84 and into solid fuel compartment 14. Bellows 132 and 134 perform substantially the same function as diaphragm 56 and can be thought of as two diaphragms 56. One of these bellows can be omitted if an O-ring or a sealing member is deployed on the outer surface of spool 92, similar to the embodiment shown in FIGS. 7A-7C.

Figure 13A:
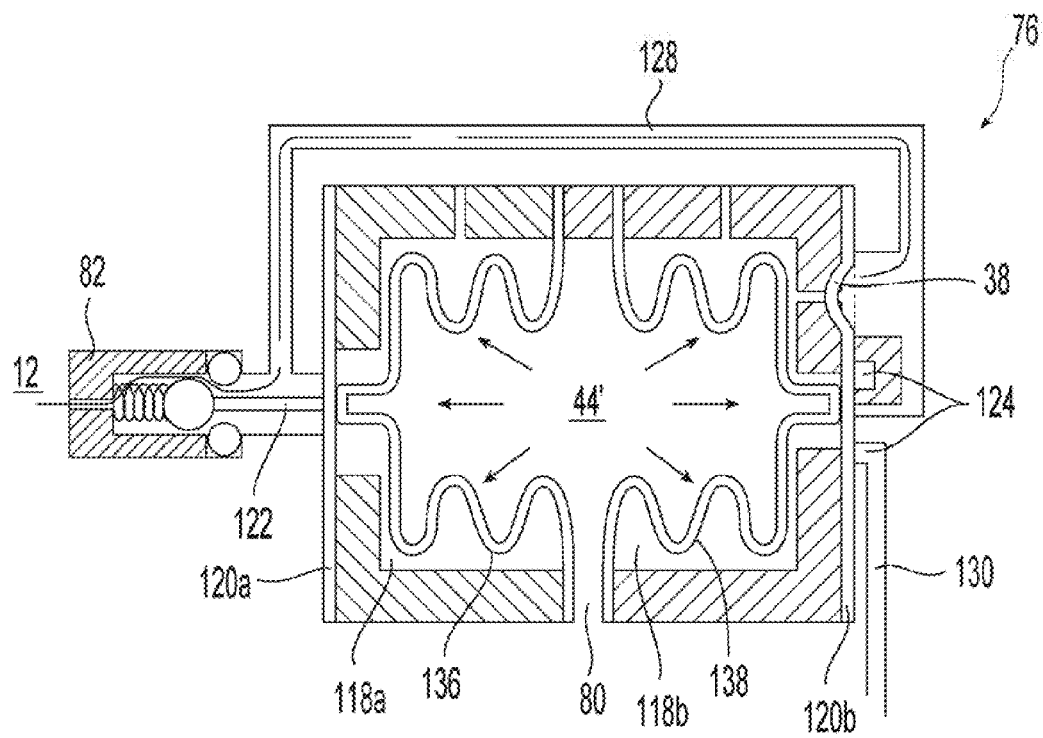
FIGS. 13A-13B are cross-sectional views of another single dose valve in accordance with the present invention in the upstroke and downstroke configurations.
Figure 13B:
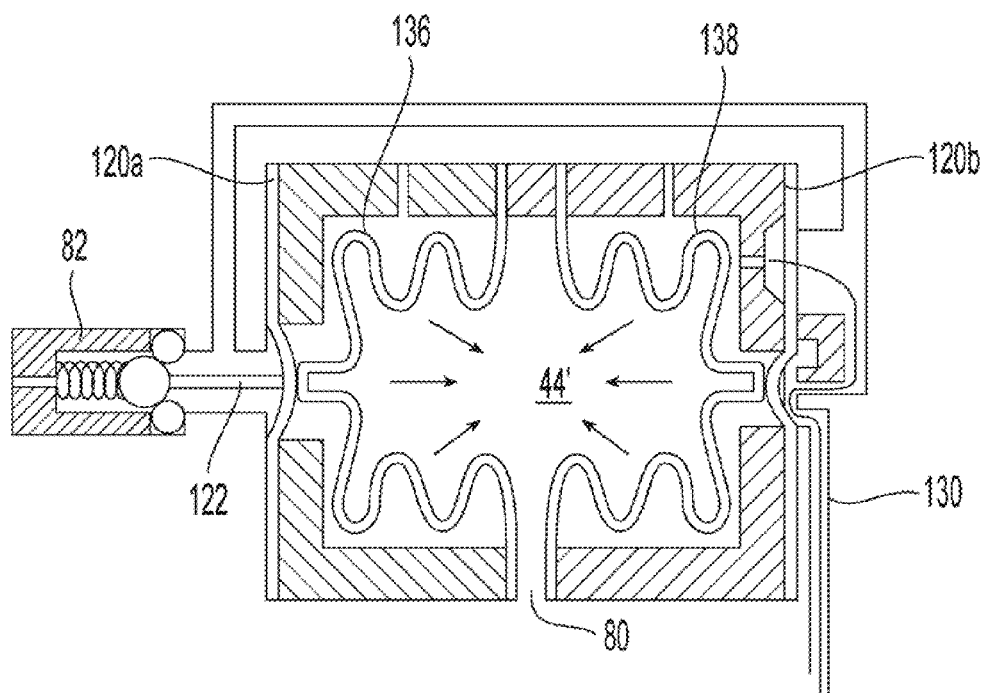

The single dose valve 76 shown in FIGS. 13A-13B is substantially the same as the one shown in FIGS. 11A-11C, with at least two notable differences. Again, similar elements are shown with the same reference numbers. First, diaphragms 46a, 46b and pistons 116a, 116b are replaced by bellows 136 and 138. Together bellows 136 and 138 form hydrogen compartment 44'. Hydrogen gas from hydrogen storage area 44 is communicated through conduit 80 to hydrogen compartment 44', which as discussed above would have the same pressure as hydrogen storage area 44. Bellows 136 and 138 are housed in vented chambers 118a and 118b, respectively. The other notable difference is that a portion of diaphragm 120b is used as the liquid storage area 38, as best shown in FIG. 13A, when the hydrogen pressure is high. When hydrogen pressure is high the bellows expand. Bellow 136 opens valve 82 via rod 122, and pressurized liquid fuel flows through channel 128 to a portion of diaphragm 120b acting as liquid storage area 38. Bellow 138 seals circular channel 124 to keep the liquid fuel within liquid storage area 38. When hydrogen pressure is low, the bellows partially collapse. Bellow 136 closes valve 82 to prevent backflow of liquid fuel. Bellow 138 opens a connection between liquid storage area 38, circular channel 124 and exit channel 130 to transport the liquid fuel to the solid fuel.

Figure 13C:
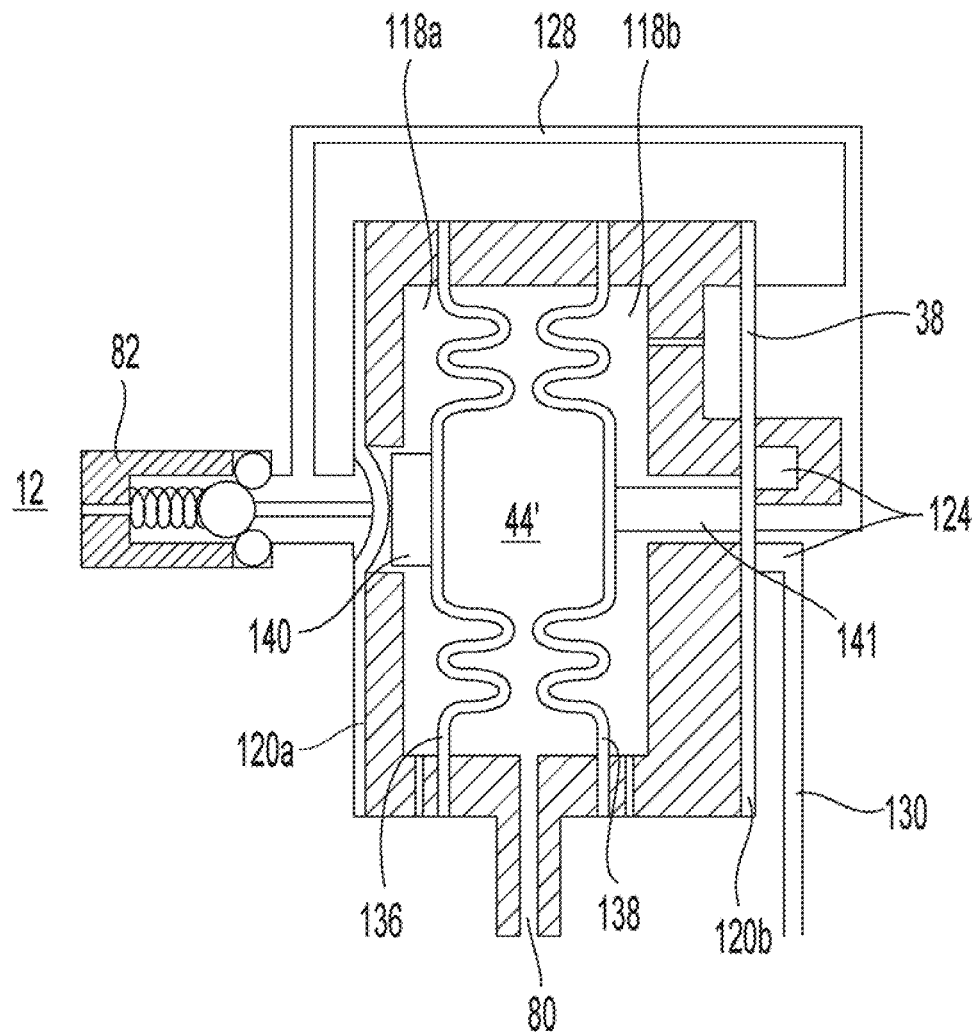
FIG. 13C is a cross-sectional view of a variation of the valve shown in FIGS. 13A-13B.

In this embodiment, bellows 136 and 138 are preferably flexible but not elastomeric and diaphragms 120a and 120b are elastomeric to counter-balance the hydrogen pressure. Alternatively, the bellows are both flexible and elastomeric, so that these bellows can also counter-balance the hydrogen pressure. Furthermore, bellows 136 and 138 can be aligned in a transverse orientation, as shown in FIG. 13C, in which the folds of the bellows are roughly orthogonal to the folds shown in FIGS. 13A and 13B. Additionally bellows 136 and 138 can have extensions 140 and 141, respectively, which can be substantially rigid to extend the reaches of the bellows to the diaphragms.

Figure 14A:
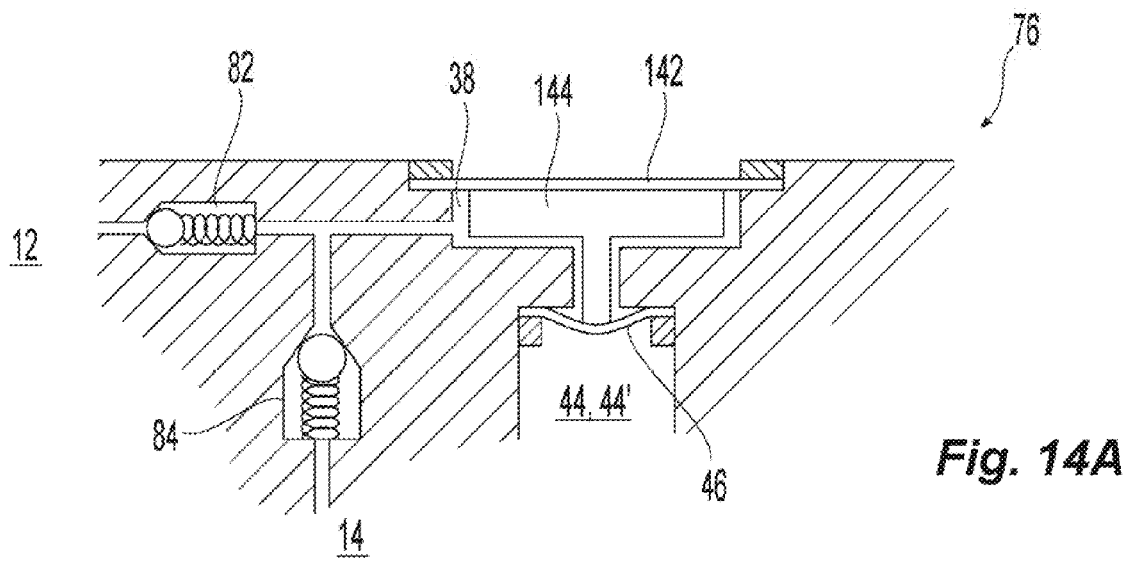
FIGS. 14A-14C are cross-sectional views of a single dose pump in accordance with the present invention in the intermediate, upstroke and downstroke configurations.
Figure 14B:
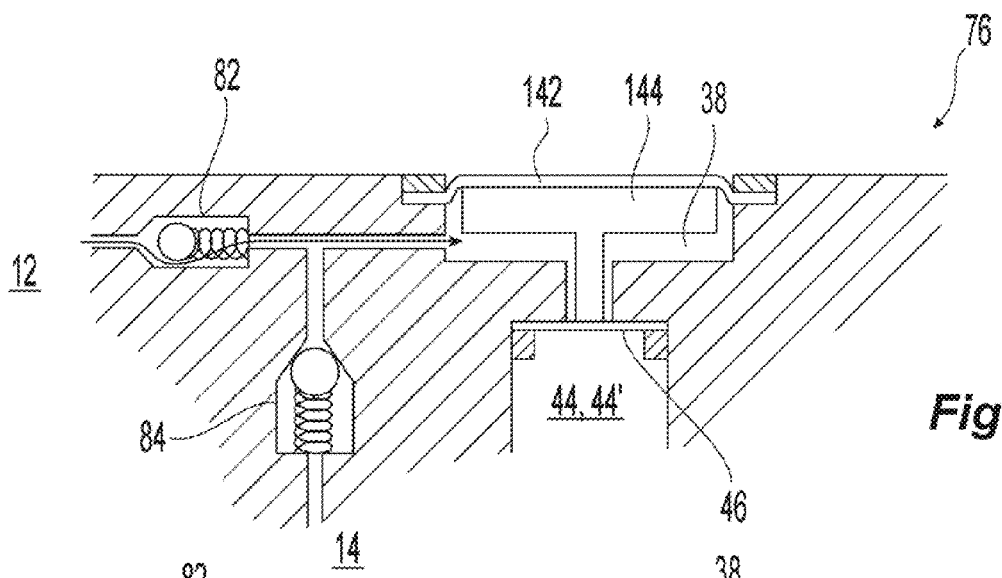
Figure 14C:
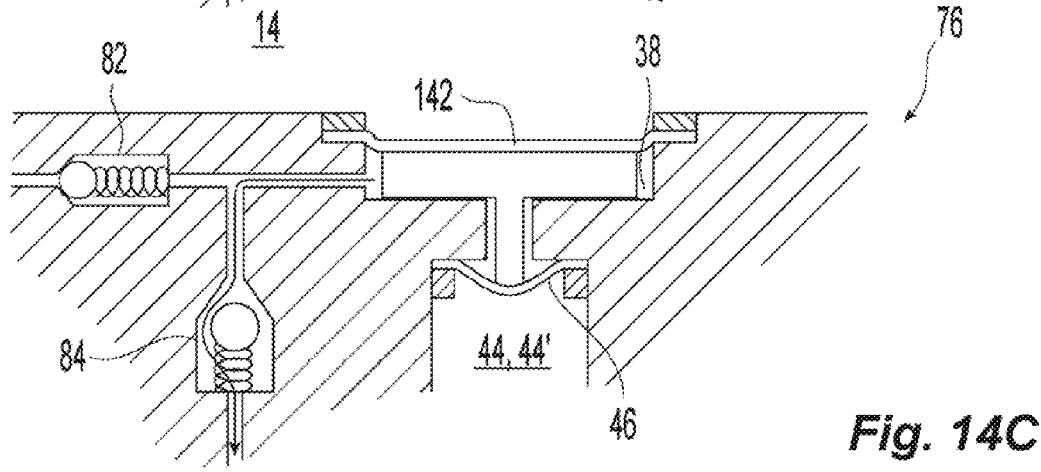

Another single dose pump 76 capable of working with pressurized and unpressurized liquid fuel is shown in FIGS. 14A-14C. If pressurized, it is preferred that the liquid fuel is not sufficiently strong to open valve 82 or 84 by itself. Preferably, this embodiment is used to pump unpressurized liquid fuel. This single dose pump or valve 76 is also exposed to the pressure of hydrogen storage area 44 (or hydrogen compartment 44' through conduit 80) and is fluidly connectable to liquid fuel chamber 12 (through valve 82) and solid fuel chamber 14 (through valve 84). Pump 76 notably has a liquid storage area 38 that directly changes it volume due to the changes in hydrogen pressure. Liquid storage area 38 is defined as the area or volume between diaphragm 46 and 142, which functions similarly to diaphragm 56 described in details above and is exposed to atmospheric pressure. When the hydrogen pressure is high, it pushes diaphragm 46 upward, thereby pushing piston 144 upward. This motion also pushes diaphragm 142 upward and increases the volume of liquid storage area 38. This creates a vacuum within liquid storage area, as shown in FIG. 14B. The vacuum opens valve 82 and closes valve 84, due to the orientation of these valves as shown, and sucks into liquid storage area 38 a known single dose of liquid fuel substantially equal to the amount of volume change. When the hydrogen pressure is low, diaphragm 46 and/or diaphragm 142 push piston 144 downward, creating a positive pressure. As shown in FIG. 14C, this positive pressure closes valve 82 to prevent backflow and opens valve 84 to pump the single dose of liquid fuel through valve 84 to solid fuel compartment 14. Valves 82 and 84 are shown as check or ball valves, but they can also be duckbill valves, flapper valves, etc.

Figure 14D:
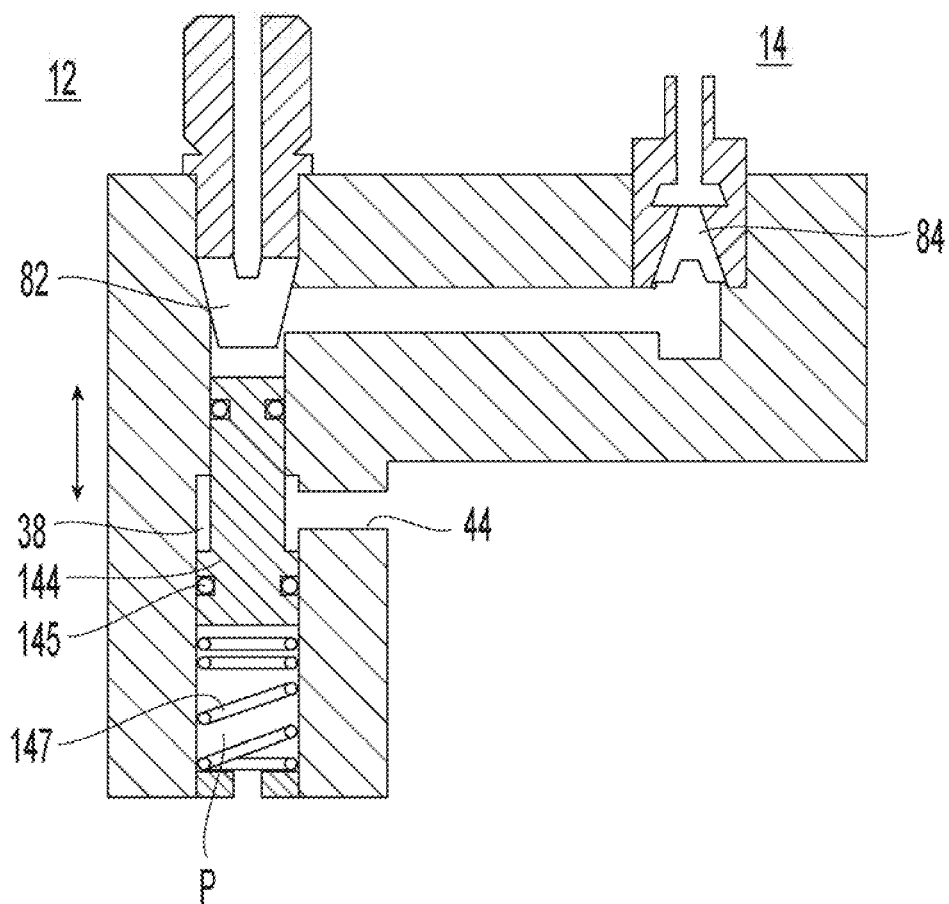
FIG. 14D is a cross-sectional view of another version of the single dose pump shown in FIGS. 14A-14C.

FIG. 14D illustrates another version of single pump 76 shown in FIGS. 14A-14C. Here, valves 82 and 84 are shown as duckbill valves, which in certain low pressure situations are more sensitive. Piston 144 has an elongated body. It is directly exposed to the pressure of hydrogen storage area 44 along its body and is exposed to a pilot pressure at the bottom. A sealing member or O-ring 145 is provided to isolate the pilot pressure from the pressure of hydrogen storage 44. Piston 144 is also biased by spring 147, as shown. When the hydrogen pressure is higher than the pilot pressure and the biasing force of spring 147, piston 144 is moved downward. This action increases the volume of liquid storage area 38, opens duckbill 82 to draw liquid fuel into liquid storage area 38, and closes duckbill 84 to hold this single dose of liquid fuel. When the hydrogen pressure is lower than the pilot pressure and the biasing force of spring 147, piston 144 is moved upward and decreases the volume of liquid storage area 38. This action closes duckbill 82, opens duckbill 84 and pushes a single dose of liquid fuel to solid fuel compartment 14.

Figure 15A:
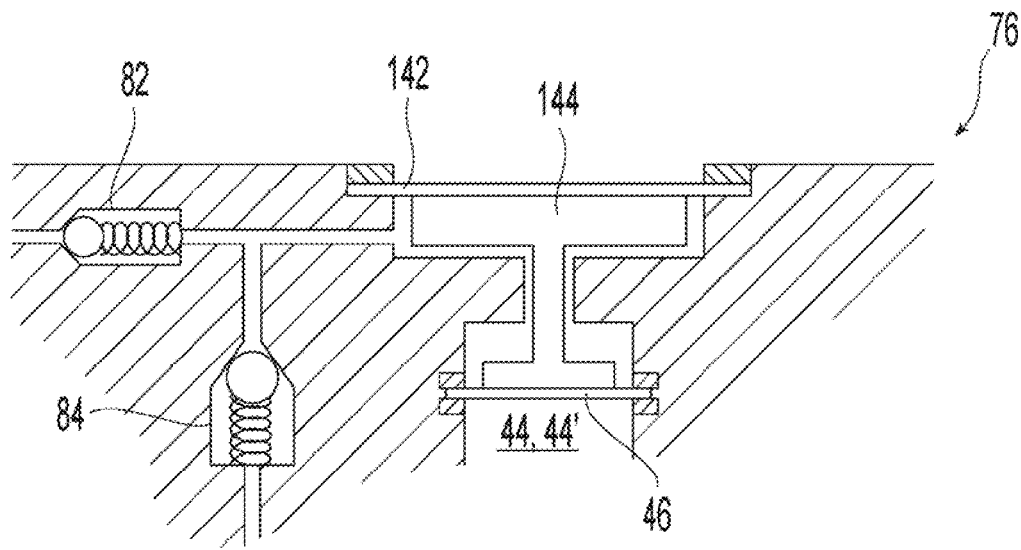
FIGS. 15A-15B are cross-sectional views of variations of the pump shown in FIGS. 14A-14C.
Figure 15B:
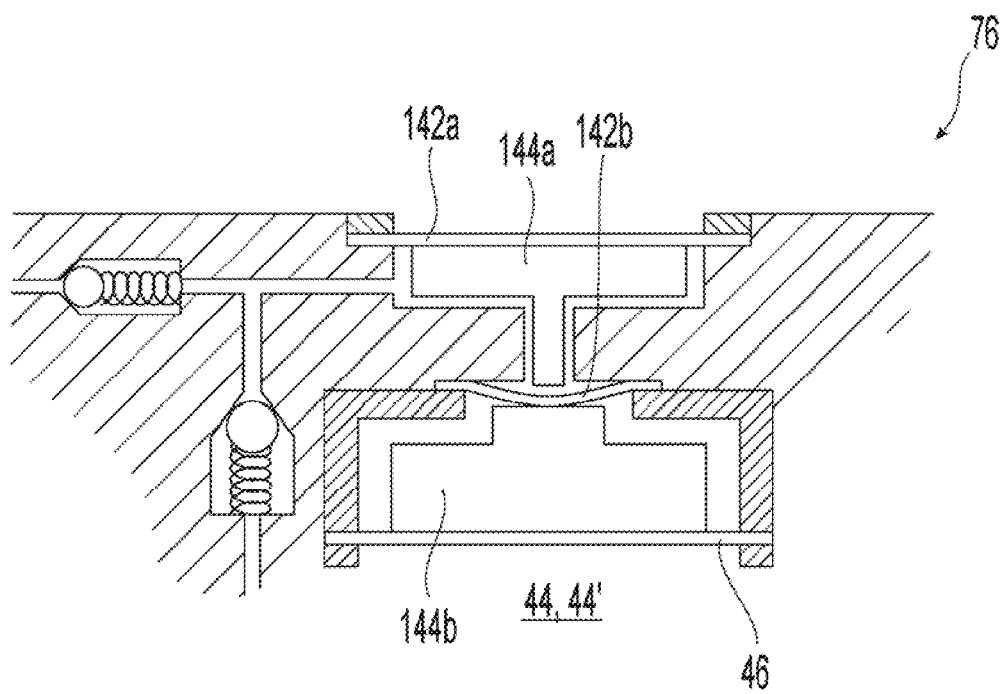

FIGS. 15A-15B show two possible variations of the single dose pump 76 shown in FIGS. 14A-14C. The single dose pump 76 of FIG. 15A is substantially the same as the pump shown in FIGS. 14A-14C, except that plunger 144 has a broader bottom and diaphragm 46 is larger, so that plunger 144 is more sensitive to lower pressure. In other words, when pressure is lower but the surface area exposed to that pressure is larger, then the total force exerted by said pressure is more significant (Force=Pressure×Area). Similarly, plunger 144 can comprise two pieces as shown in FIG. 15B. Here, top plunger 144*a* is a part of the pump as described above, and bottom plunger 144*b* is a pressure amplifier. The two plungers 144*a* and 144*b* are separated by diaphragm 142*b* to keep the volume of liquid storage area 38 contained to the top portion.

Figure 16A:
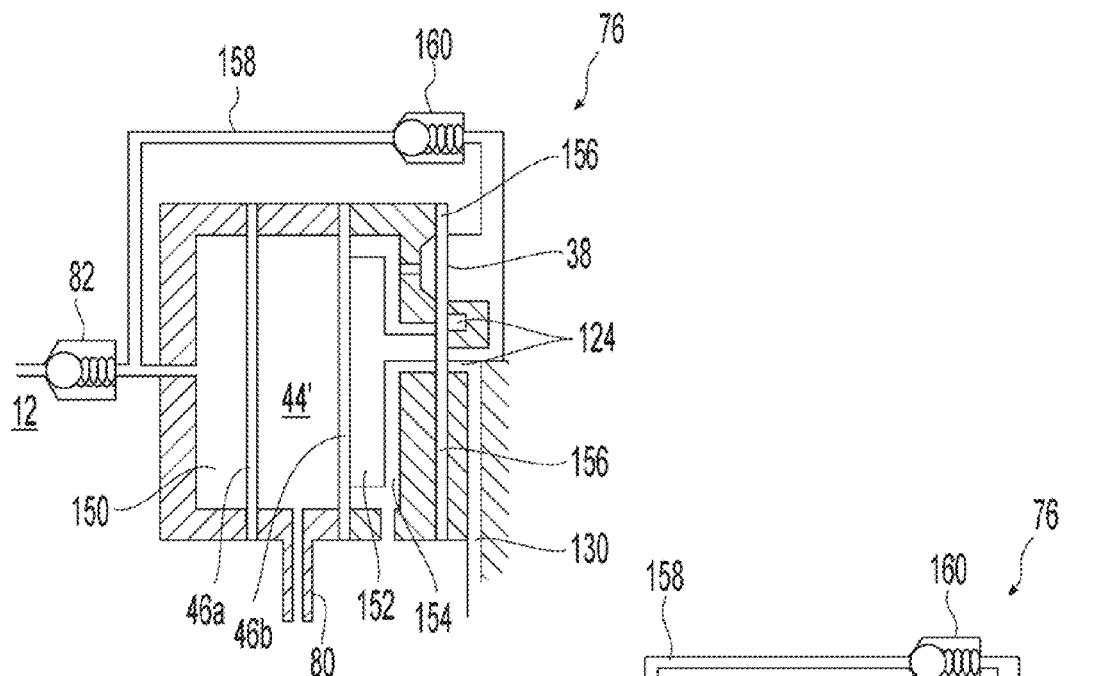
FIGS. 16A-16C are cross-sectional views of another single dose pump in accordance with the present invention in the intermediate, upstroke and downstroke configurations.
Figure 16C:
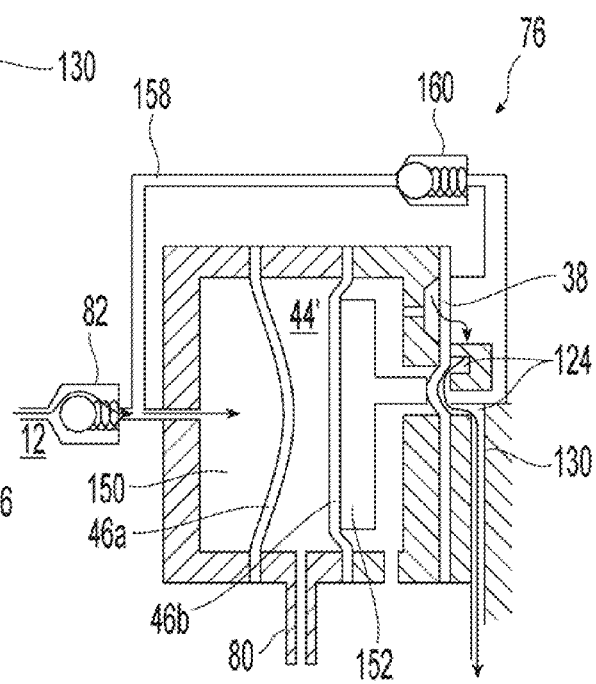
Figure 16B:
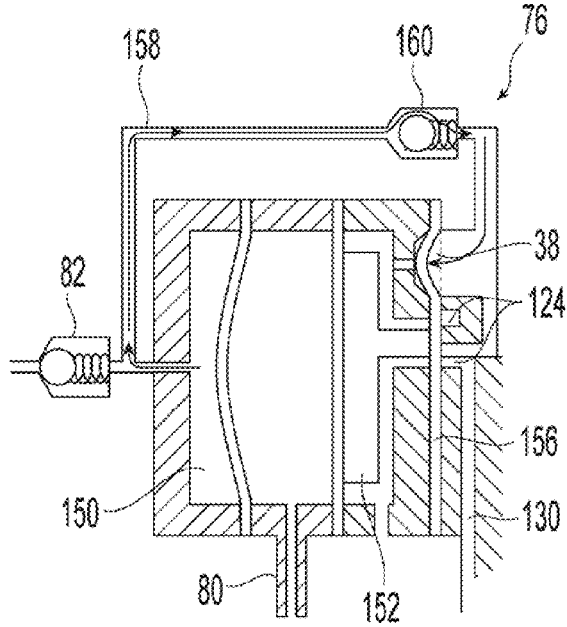

FIGS. 16A-16C illustrate another embodiment of single dose pump 76 that is suitable for unpressurized and pressurized liquid fuel. If pressurized, it is preferred that the liquid fuel is not sufficiently strong to open valve 82 or 160 by itself. A first notable difference between the single dose pump 76 in FIGS. 16A-16C and the single dose pumps illustrated in FIGS. 14A-14C and FIGS. 15A-15B, is that the pumping chamber is separate from liquid storage area 38. Referring to FIG. 16A, pump 76 has hydrogen compartment 44', which is in fluid communication with hydrogen storage area 44 through conduit 80, and is defined between first and second diaphragms 46*a* and 46*b*. Pumping chamber 150 is defined between first diaphragm 46*a* and a wall of pump 76. Second diaphragm 46*b* is coupled to piston 152, which is housed in vented chamber 154. Third diaphragm 156 also borders vented chamber 154. Piston 152 is coupled to a portion of third diaphragm 156, so that this portion of the third diaphragm moves with piston 152. Another portion of third diaphragm 156 forms a single dose liquid storage area 38, as shown in FIG. 16A and discussed above in connection with the embodiment of FIGS. 13A-13C.

When the hydrogen pressure is high, diaphragms 46*a* and 46*b* expand, as shown in FIG. 16B. This expansion compresses pumping chamber 150 and presses piston 152 to seal circular channel 124. The compression of pumping chamber 150 closes valve 82 and isolates liquid fuel chamber 12. The compression of pumping chamber 150 also pumps a predetermined amount of liquid through channel 158, opens valve 160 and compresses the portion of diaphragm 156 that makes up liquid storage area 38 to store a single dose of liquid fuel. Since circular channel 124 is sealed, the liquid is held at liquid storage area 38.

When the hydrogen pressure is low, diaphragms 46*a* and 46*b* contract toward each other, as shown in FIG. 16C. The contraction causes piston 152 to move to the left and open a fluid connection between circular connection 124, which is open to liquid storage area 38 and exit channel 130 to transport the liquid fuel to solid fuel chamber 14. This contraction also causes pumping chamber 150 to expand and creates a negative pressure or partial vacuum. This partial vacuum opens valve 82 and sucks in a single dose of liquid fuel into pumping chamber 150. This vacuum also closes valve 160, so that no new liquid is flowing into liquid storage area 38 at this time.

Figure 17:
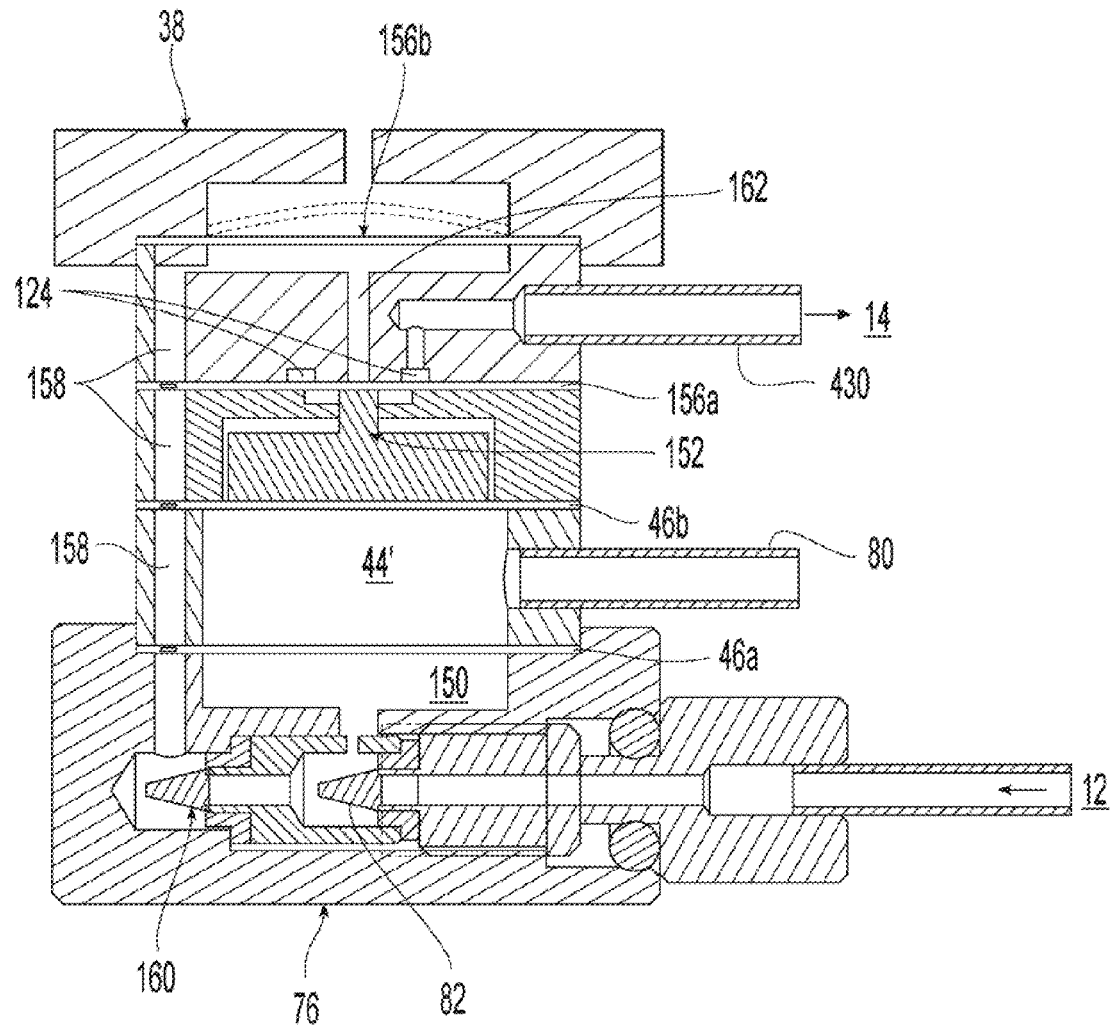
FIG. 17 is a cross-sectional view of a variation of the pump shown in FIGS. 16A-16C.

A variation of the embodiment of FIGS. 16A-16C is shown in FIG. 17, where similar components again have the same reference numbers. Notable differences include the fact valves 82 and 160 are shown as duckbill valves and are positioned closer together, however, their functions and open/close sequence remain the same. Another difference is that diaphragm 156 is divided into diaphragms 156*a* and 156*b*. Diaphragm 156*a* is still being pressed by piston 152 at high hydrogen pressure. Diaphragm 156*b* forms the liquid storage area 38. Liquid storage area 38 is fluidly connected to circular channel 124 by channel 162, and the portion of diaphragm 156*a* that is coupled to piston 152 is sized and dimensioned to seal channel 162 at high hydrogen pressure.

The pistons, flow channels and diaphragms, discussed herein, can also be utilized as a pressure regulator which takes hydrogen gas at a high pressure and reduce the pressure of said gas to a level acceptable by the fuel cell. One application for such a pressure regulator is to reduce the pressure of the hydrogen exiting hydrogen storage area 44 and generator 10 through shut-off valve 18. Such a regulator can be positioned downstream or upstream of shut-off valve 18 (see FIG. 2) and can be positioned adjacent therewith. An exemplary pressure regulator 164 is illustrated in FIG. 18A-18B. Regulator 164 comprises inlet housing 166, outlet housing 168 and retainer 170 disposed therebetween. Movably disposed within retainer 170 is piston 172. A first diaphragm 174 is clamped between inlet housing 166 and retainer 170 and a second diaphragm 176 is clamped between outlet housing 168 and retainer 170. Inlet housing 166 defines inlet channel 178 and outlet housing 168 defines outlet channel 180. The interior of retainer 170, where piston 172 is housed, can be exposed to a reference pressure, which may be atmospheric pressure. A ball 182 can be provided below first diaphragm 174 directly below inlet channel 178 to help seal the inlet channel. As shown, first diaphragm 174 is exposed to the inlet pressure and second diaphragm 176 is exposed to the outlet pressure.

Since the applied forces on piston 172 are the products of the applied pressure times the area exposed to that pressure, the forces acting on piston 172 can be summarized as follows: The inlet diaphragm forces are:

$$\text{Inlet pressure} \times \text{inlet area} = \text{reference pressure} \times \text{inlet area} + \text{piston force(upper surface)}$$

The outlet diaphragm forces are:

$$\text{Outlet pressure} \times \text{outlet area} = \text{reference pressure} \times \text{outlet area} + \text{piston force(lower surface)}$$

Since the force on the upper surface equals the force on the lower surface, the piston force is the same in both equations. Solving both equations for piston force and equating them:

$$(\text{Inlet } P - \text{reference } P) \times \text{inlet area} = (\text{outlet } P - \text{reference } P) \times \text{outlet area}$$

This equation can be rewritten to:

$$(\text{Outlet } P - \text{reference } P) = (\text{Inlet } P - \text{reference } P) \times \text{inlet area/outlet area}$$

For the case where the reference pressure is 0 psi relative or 1 atmosphere:

$$\text{Outlet } P = \text{Inlet } P \times \text{inlet area/outlet area}$$

For the case where the reference pressure is not 0 psi relative, both sides of the piston are influenced by the reference pressure relative to their respective areas. During operation of the regulator the inlet area changes. Before the outlet pressure rises enough to shut off the inlet, the inlet area is equal to the upper surface of the piston. After the outlet pressure rises enough to shut off the inlet the inlet area shrinks to the small inlet opening. This feature will reduce piston oscillation with slight outlet pressure drops.

When the outlet force is less then the inlet force, the inlet hydrogen pressure forces first membrane downward to open a flow path from inlet channel 178 to inner circular channel 184, which is connected to top lateral channel 186, which is connected to outer circular channel 188 and to connecting channel 190, which is connected to lower lateral channel 192 and to outlet channel 180. Advantageously, outlet channel 180 is enlarged at 194 to allow the hydrogen gas to expand and to lose some additional pressure before exiting. Outlet channel 180 is also enlarged so that regulator 164 can be fitted to the other component(s) of the fuel cell system. Lateral channels 186 and 192 are sealed by a ball as shown in FIG. 18A.

Figure 18C:
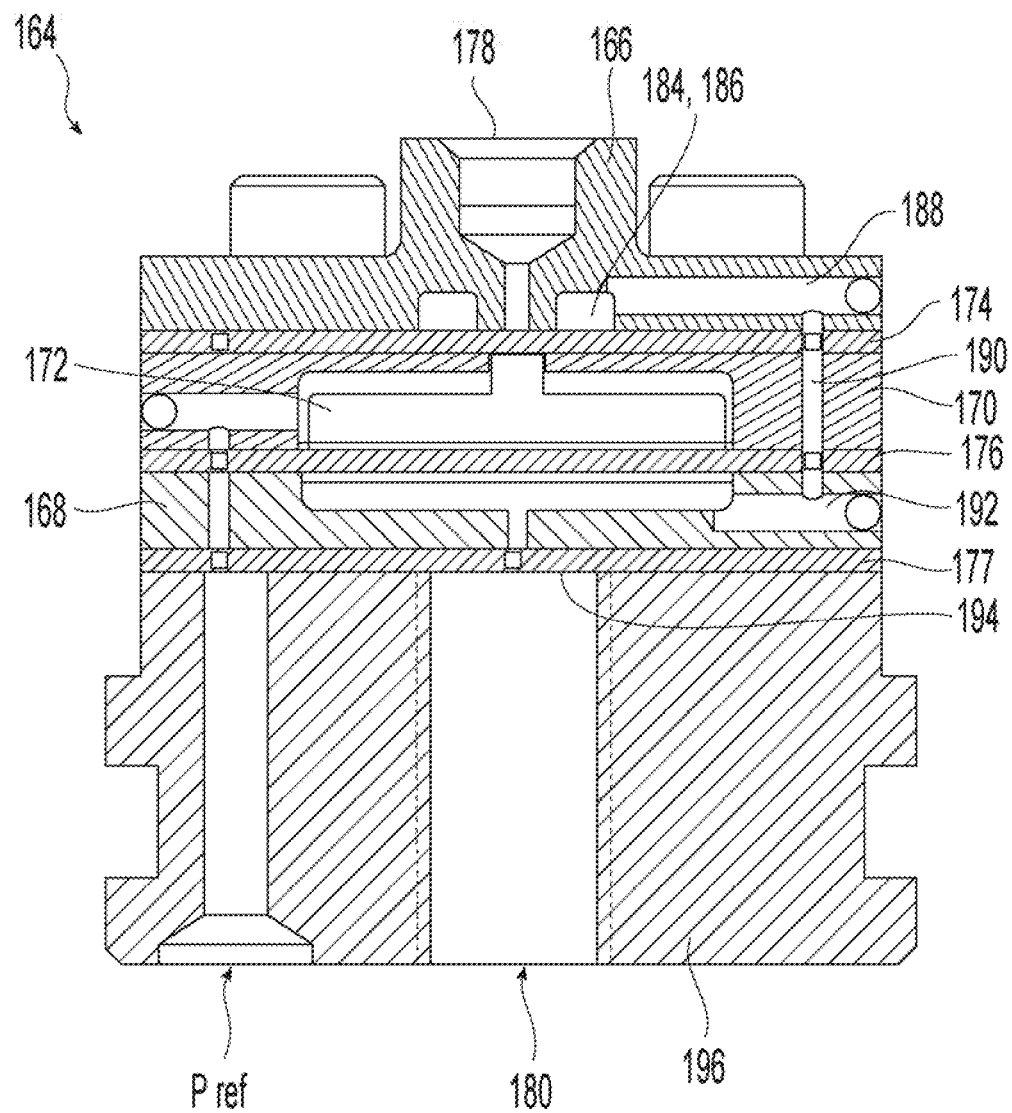
FIG. 18C is a cross-sectional view of a variation of the regulator shown in FIGS. 18A-8B.

Another embodiment of pressure regulator 164 is shown in FIG. 18C, which operates in the same manner as the embodiment of FIGS. 18A-18B. As illustrated in FIG. 18C, regulator 164 can also have an outlet diaphragm/gasket 177 and end cap 196 attached to the bottom of outlet housing 168. End cap 196 can have a channel to communicate the reference pressure to piston 172, and a more enlarged outlet channel 180 for the exiting hydrogen to take a larger pressure drop before exiting. Diaphragm/gasket 177 can be replaced by an O-ring.

Figure 19A:
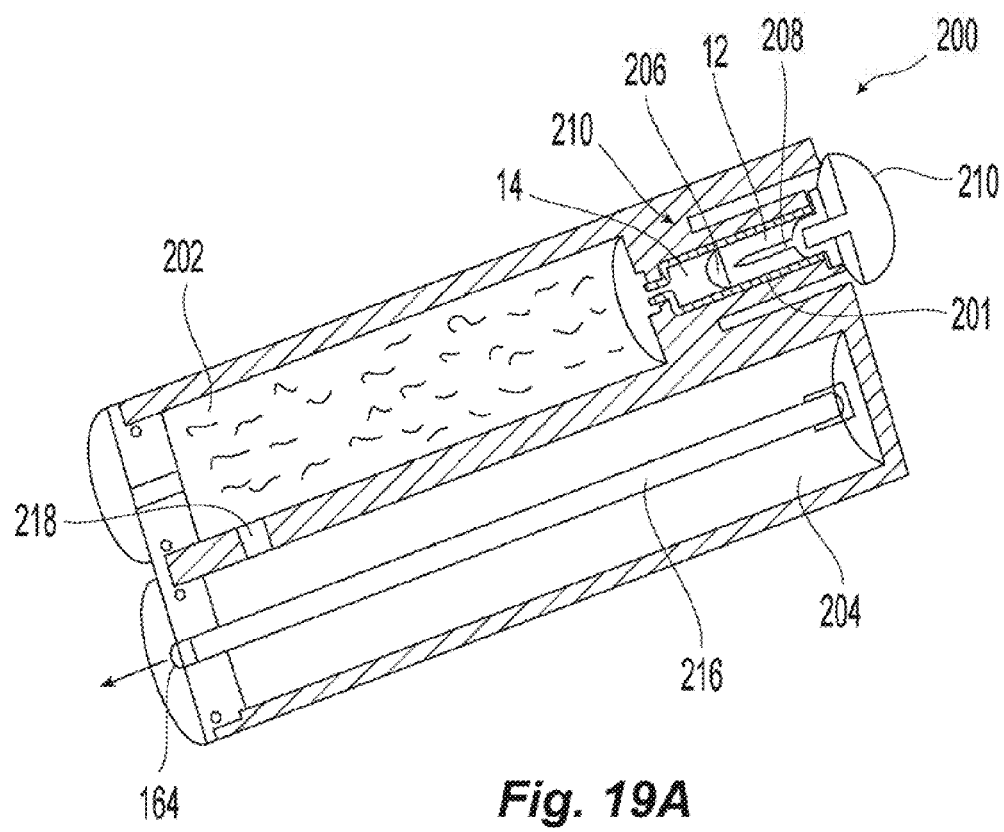
FIG. 19A is a cross-sectional view of a single dose fuel generator in accordance with the present invention.
Figure 19B:
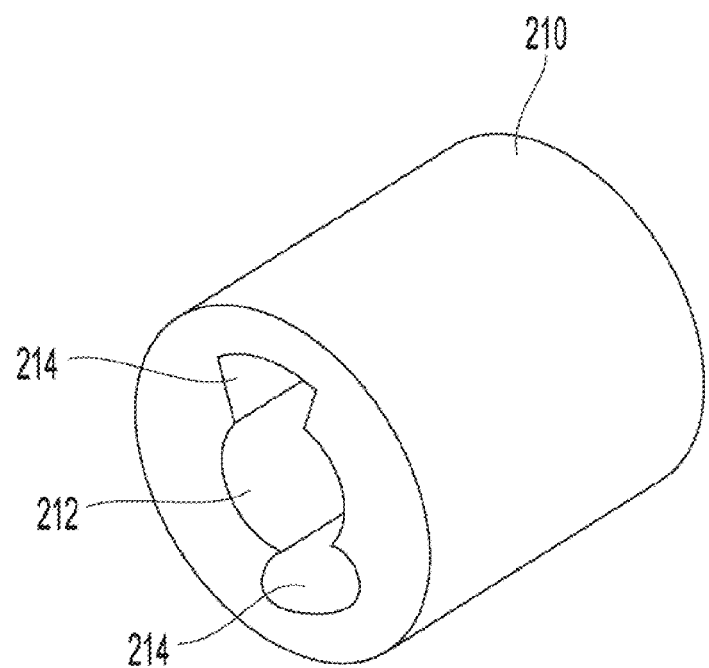
FIG. 19B is a perspective view of a component thereof.
Figure 19C:
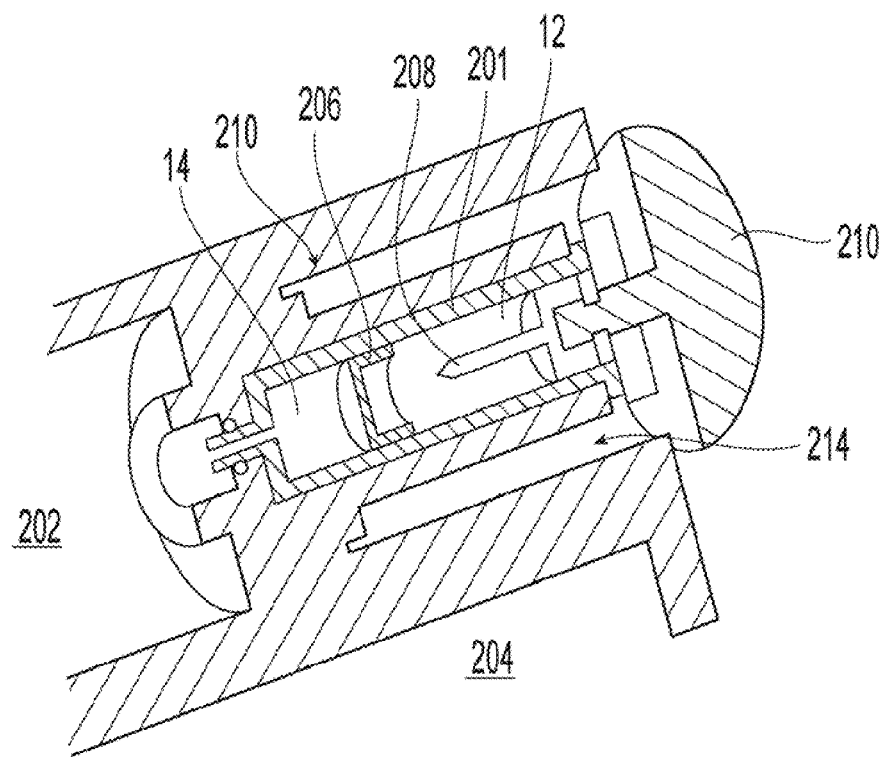
FIG. 19C is a partial enlarged version of FIG. 19A for clarity.

Pressure regulator 164 is also suitable for use with hydrogen generator 200, shown in FIGS. 19A-19C. This generator has two main chambers: first pressure chamber 202 and second pressure chamber 204 with pressure regulator 164 controlling the hydrogen flow from second pressure chamber 204 to the fuel cell. First pressure chamber 202 is connected to second chamber 204 through aperture 218. Hydrogen generator 200 comprises a single dose cartridge 201, which has liquid fuel chamber 12 separated from solid fuel chamber 14 by membrane 206, which can be made from a polymer or copolymer, such as polypropylene, polyethylene, polystyrene, frangible glass, metal foil or any material that can be broken or pierced. Cartridge 201 also has firing pin 208 attached to activator button 210. Firing pin 208 is adapted to pierce membrane 206 to allow the liquid fuel to mix with the solid fuel to produce hydrogen. Hydrogen gas and the byproduct are passed into first pressure chamber 202. Preferably, first pressure chamber 202 has thick sidewalls to withstand the high pressure and contains a filter bed to react with any unreacted fuel leftover from single dose cartridge 201. Preferably, the filter bed comprises an acid, such as acetic acid or other types of acids that react with a hydride fuel, an alcohol, such as methanol or other types of alcohols that react with a hydride fuel, or water. Preferably, the acid, alcohol or water is absorbed in an absorbent medium, such as paper, non-woven or woven material.

To minimize the chance for unintended mixing of the two fuels, generator 200 can have an interlocking cap 210, which defines a central aperture 212 to receive cartridge 201. Aperture 212 also has a number of wings 214 connected thereto. Activator button 210 has corresponding ledges (not shown) adapted to be received by wings 214. To depress activator button 210, these ledges should be aligned with wings 214. Additionally, activator button 210 can be biased by a spring or the like to a non-aligning position, so that the user needs to twist or rotate activator 210 before depressing same. Wings 214 may have different shapes, as shown, and there can be any number of wings.

The hydrogen from first pressure chamber 202 passes through aperture 218 before entering second pressure chamber 204. A hydrogen feed tube 216 is provided as a pathway for hydrogen to leave generator 200. Hydrogen feed tube 216 can be made out of a porous material, such as ceramic, textiles, foam and the like. Hydrogen feed tube 216 can further filter out any byproduct that may have passed through regulator 164. Alternatively, a shut-off valve similar to valve 18 can be positioned proximate to regulator 164, and second pressure chamber 204 may also have a filter bed similar to that in first pressure chamber 202.

After cartridge 201 is exhausted or when the hydrogen is used up, the spent cartridge can be removed and another single shot cartridge 201 can be inserted.

Figure 20:
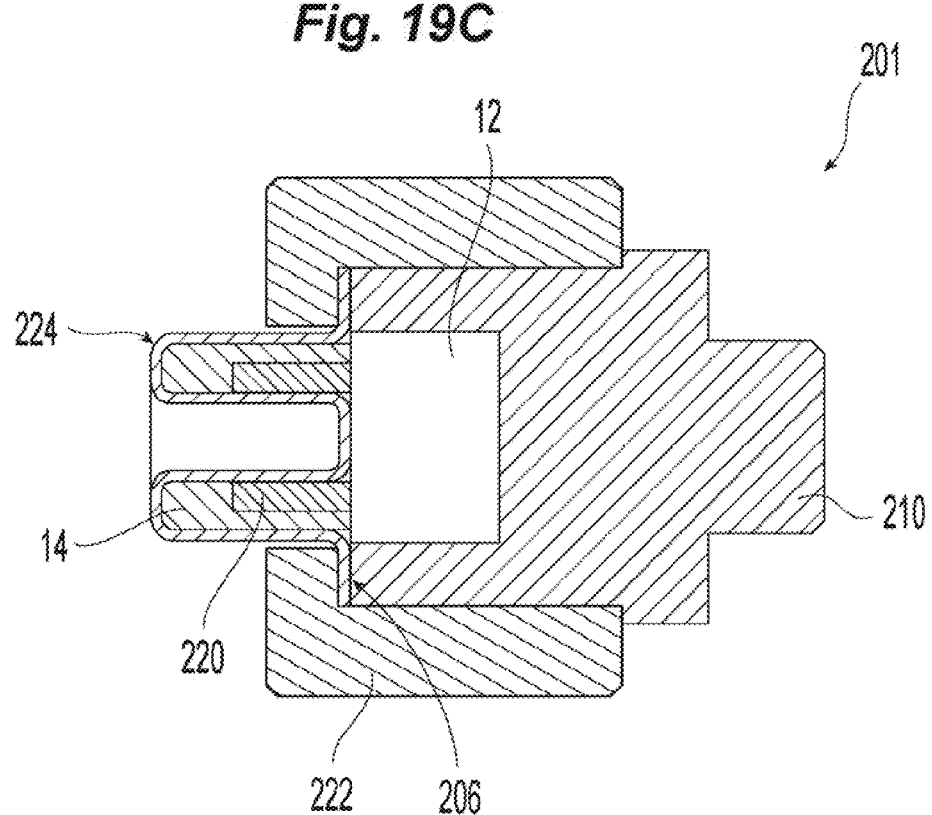
FIG. 20 is another embodiment of the single dose fuel generator.

Another suitable single dose cartridge 201 is shown in FIG. 20. Activator button 210 of this cartridge contains liquid fuel chamber 12. The solid fuel, designated by reference number 220, is stored in holder/solid fuel chamber 14. The solid fuel and the liquid fuel are separated by membrane/foil 206. Activator button 210 and solid fuel chamber 14 are held together by cartridge housing 222. To activate, solid fuel 220 and solid fuel chamber 14 are pushed into liquid fuel chamber 12, puncturing membrane 206 and reacting the fuels. Solid fuel chamber 14 is covered by an elastomeric skin 224, which has a serpentine profile so that skin 224 can expand outward to take up the expected movement of the liquid fuel after solid fuel chamber 14 is pushed into liquid fuel chamber 12. Skin 224 is held or clamped between cartridge housing 222 and activator cap 210 to keep it in place. Skin 224 is preferably made from a material that is permeable to hydrogen but impermeable to the fuels and the byproducts. Suitable materials include elastomers, such as silicon. The single dose of liquid fuel is kept in contact with the single dose of solid fuel within cartridge 201, until all the fuel is reacted. The solid fuel can be in a powder or granular form to promote mixing. As shown, solid fuel 220 is in the form of an open cylinder to maximize the surface area available to react with the liquid fuel.

The single dose hydrogen generator 10 of the present invention can be modified to react two single doses of liquid fuels. In one example, two single dose pumps/valves 76 are used. One pump/valve 76 is used to meter a first liquid fuel, such as water or methanol. The other pump/valve 76 is used to meter the solid fuel that has been changed to an aqueous or liquid form, i.e., a second liquid fuel. For example, solid sodium borohydride can be converted into a liquid form by dissolving the sodium borohydride in solvents, such as tetraethyleneglycoldimethylether or triethyleneglycoldimethylether. Liquid or aqueous forms of sodium borohydride are available from Sigma-Aldrich in various molar concentrations, e.g., 3 molar solution with tetraethyleneglycoldimethylether, 2 molar solution with triethyleneglycoldimethylether, and 12% wt. aqueous solution. As stated above, liquid fuels can be in a gel form.

An example of applying two single dose pumps/valves 76 is illustrated in FIGS. 21A-21B, where two exit channels 130a and 130b transport two single doses of liquid fuel from pumps/valves 76a and 76b, respectively. Each exit channel 130a, 130b is connected to an inlet adapter 226a, 226b, respectively. The inlet adapters are adapted to hold and position valves 228a and 228b within housings 230a and 230b, respectively. Valves 228a and 228b can be duckbill valves (as shown), flapper valves or check valves. Clamped between housings 230a and 230b is chamber 232, which preferably is filled with a closed cell foam material. When the two single doses of liquid fuels are reacted in chamber 232, the hydrogen pressure compresses the foam and the hydrogen and the byproduct flow out from chamber 232. The pressure from the hydrogen also clears the byproduct away from chamber 232, thereby leaving chamber 232 clear for subsequent reactions. Additionally, flow channels 234 can be cut out from housing 230a and 230b to assist the movement of byproduct and hydrogen away from chamber 232. Flow channels 234 can have any configurations, such as spiral, concentric circles, line segments emanating from a center, etc. Furthermore, chamber 232 may also have spiral, circular, emanating segment flow channels defined therein to assist in the removal of hydrogen and byproducts. Alternatively, chamber 232 may comprise two or more elastomeric disks being compressed or held together between housings 230a and 230b. The surfaces of these disks can be smooth, textured or grooved to aid in the mixing of the different fuel components. Chamber 232 may also comprise a plurality of concentric O-rings instead of disks.

Chamber 232 generally separates before hydrogen gas leaves the chamber, and preferably the clamping force applied on chamber 232 is capable of resisting this tendency to separate for a duration of time so that the fuels have more time to react. This clamping force may be applied with springs, pressurized gas or fasteners, and the clamping force can be set or predetermined to allow hydrogen to exit at a predetermined pressure. Furthermore, more than two liquid fuels can be introduced into chamber 232, and each fuel can be introduced via a separate pump/valve 76. Also, when the flow is continuous instead of intermittent (i.e., single doses) valves 228a and 228b can be replaced by flow restrictors, such as fixed or variable orifices. It is noted that valves 228a and 228b are also a type of flow restrictor.

The embodiment of FIGS. 21A-21B can also be used to wet a solid. The foam can be placed on the surface of the solid and one or more liquids can be introduced into chamber 232. Alternatively, the reaction between a liquid fuel and a liquid sodium borohydride can be contained in a nitrogen rich environment to improve the reaction between the two fuels. For example, adapter 226b and valve 228b are replaced by a solid fuel rod, which is spring-loaded to seal against reaction chamber 232. As portion of the solid fuel is reacted or consumed, the byproduct is blown away or removed from the reaction chamber and the remaining solid fuel rod is continually biased against the reaction chamber.

The pistons, bellows and diaphragms, discussed above, can further be utilized as automatic shut-off valves when an outlet pressure exceeds an inlet pressure, or vice versa. as shown in FIGS. 22A-22B. Referring to FIG. 22A, shut-off valve 240 has inlet 242 and outlet 244, and has three internal chambers. Chamber 246 is formed between bellow 248 and the inside walls of the valve. Chamber 246 is in fluid communication with and has the same pressure as the pressure of outlet 244 via channel 250 defined in valve stem 252. Middle chamber 254 is formed between bellow 248 and bellow 256 and is a sealed chamber. Sealed chamber 254 has a predetermined pressure to counter-balance the pressure of chamber 246/outlet 244. The third chamber 258 has inlet 242 and outlet 244. Shut-off valve 240 is designed to shut when the pressure of outlet 244/chamber 246 exceeds the predetermined pressure of sealed chamber 254 and pushes valve stem 252 downward to close outlet 244.

A variation of shut-off valve 240 is shown in FIG. 22B. In this embodiment, sealed chamber 254, with the preset or predetermined pressure, is located on top, and chamber 246, which has the same pressure as outlet 244, is located immediately below. When the outlet pressure exceeds the predetermined pressure of sealed chamber 254, valve stem 252 moves upward to seal the valve.

Another shut-off valve 260 is shown in FIG. 22C. Valve 260 has piston 262 balanced between first diaphragm 264 and second diaphragm 266. First diaphragm 264 is exposed to chamber 268, which has a pilot pressure. Second diaphragm 266 is exposed to circular channel 124, which has the supply pressure from inlet 242. The chamber surrounding piston 262 has a reference pressure which enters through a port in the side. When the force from the supply pressure from inlet area 242 exceeds the force from the pilot pressure from chamber 268, a portion of second diaphragm 266 bows below inlet 242 and circular channel 124, or flexes downward, allowing hydrogen to flow to outlet 244. When the force from the supply pressure at circular channel 124 and the outlet pressure at 244 is less than the force from the pilot pressure in chamber 268, piston 262 is pushed against outlet 244 and/or circular channel 124 to seal or close valve 260. The pilot pressure can be any pressure; however, preferably the pilot pressure is substantially the same as the outlet pressure. A portion of the outlet gas can be connected to chamber 268 to make the pilot pressure substantially the same as the outlet pressure. Outlet 244 is sized and dimensioned to be smaller than ring-like inlet 242, so that if the pressure at outlet 244 goes higher than the pressure at inlet 242 valve 260 remains closed, until $$(P_{244} \times Area_{244}) + (P_{242} \times Area_{242}) - (P_{ref} \times Area_{226}*) > (P_{268} \times Area_{268}) - (P_{ref} \times Area_{264}*)$$

{* the area on the piston 262 side of the diaphragm.}

A variation of shut-off valve 260 is shown in FIG. 22D, where the locations of inlet 242 and outlet 244 have been switched. Here, outlet area 244 is larger than inlet area 242.

Figure 23A:
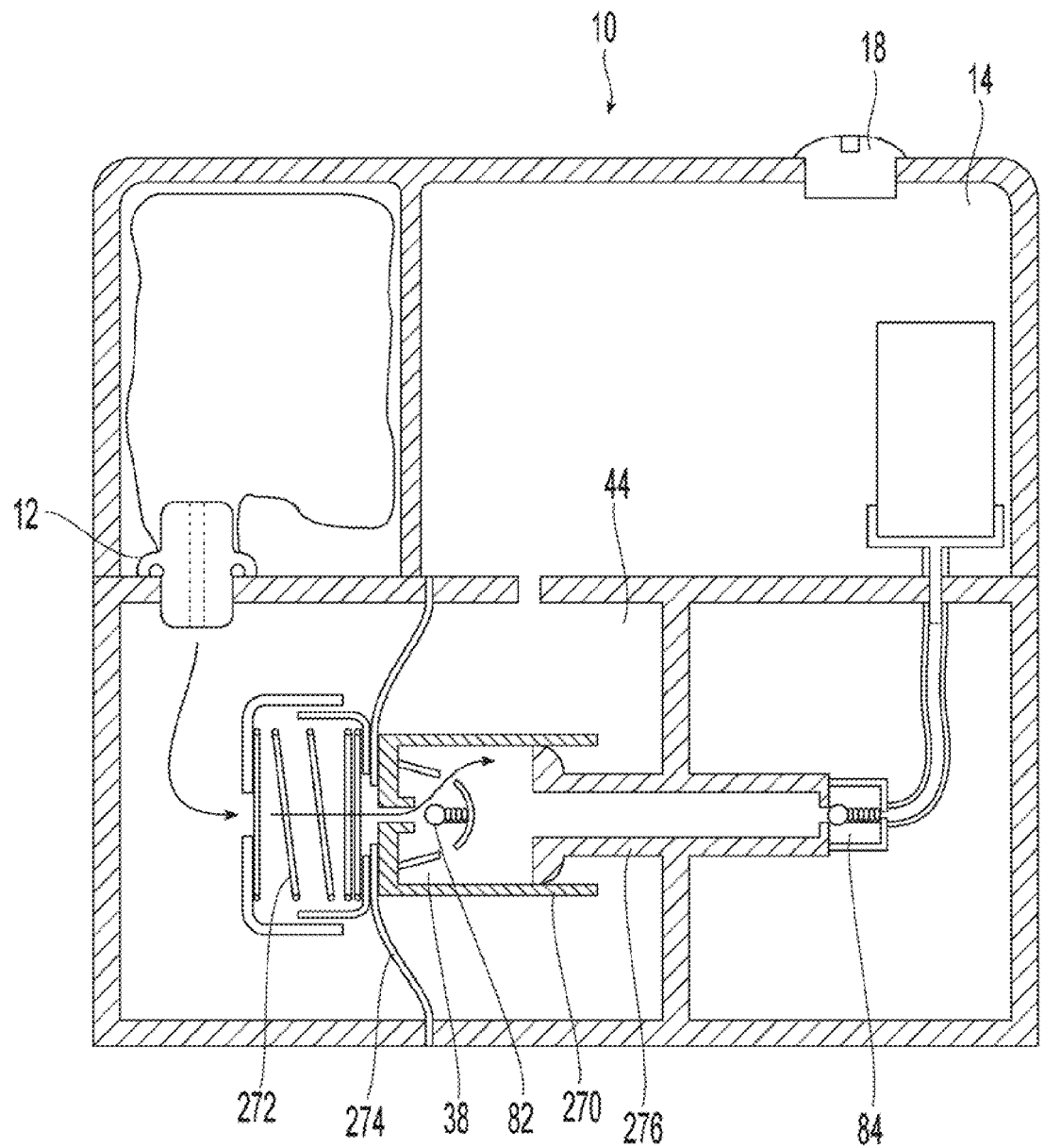
FIGS. 23A-23B show cross-sectional views of another fuel supply/hydrogen generator with a single dose pump/valve.
Figure 23B:
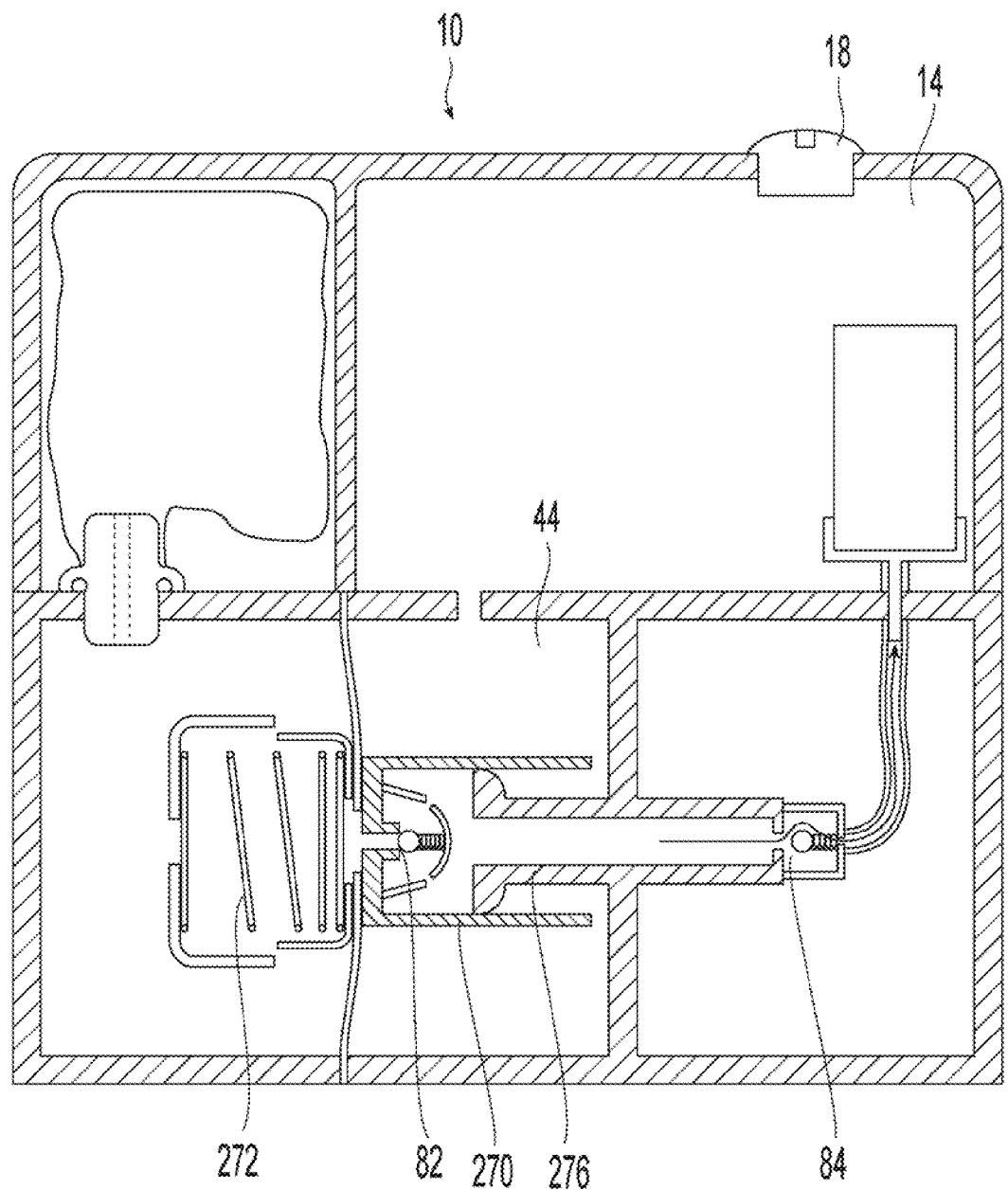
Figure 24A:
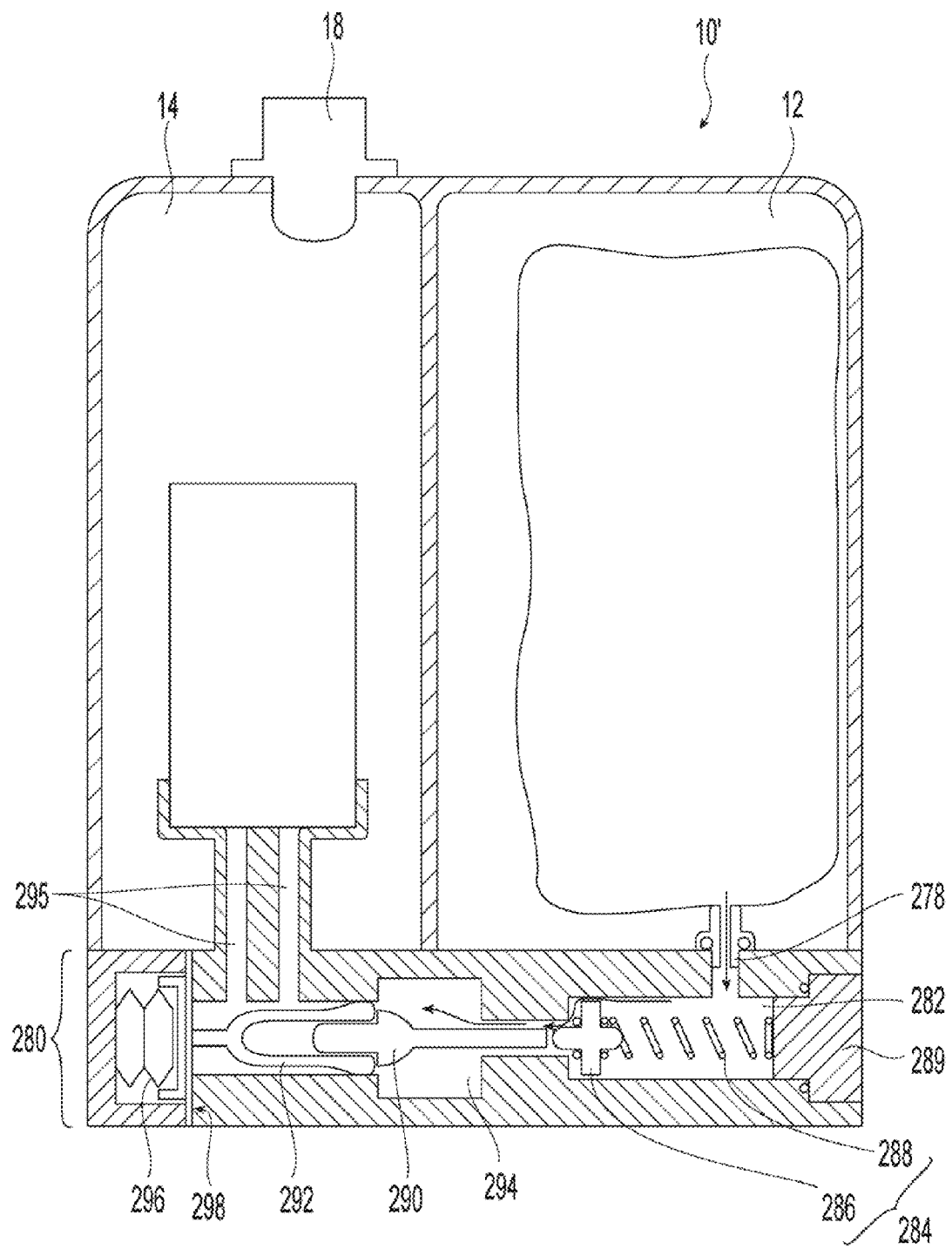

Another fuel supply/hydrogen generator 10 is shown in FIGS. 23A-23B. Hydrogen generator 10 has liquid fuel chamber 12, which in this embodiment is preferably pressurized, and solid fuel chamber 14, which has a shut-off valve 18 connected thereto as shown. Valve 82 connects liquid fuel chamber 12 to liquid storage area 38 and valve 84 connects liquid storage area 38 to solid fuel chamber 14. In this embodiment, disposed within hydrogen storage area 44 is movable piston 270 biased by spring 272. Piston 270 cooperates with stationary hollow post 276 to enclose liquid storage area 38, piston 270 and post 276 also form a seal to contain liquid fuel. A diaphragm 274 separates hydrogen storage area 44 from the liquid fuel and is movable with piston 270. FIG. 23A illustrates the situation where the hydrogen pressure caused by a reaction between the liquid fuel and the solid fuel is high. This high hydrogen pressure pushes diaphragm 274 to the left, as shown, against biasing spring 272. This action opens valve 82, allowing liquid fuel to flow into liquid storage area 38 and closes valve 84 to retain a single dose of the liquid fuel. Referring to FIG. 23B, when the hydrogen pressure is low, e.g., when hydrogen gas in solid fuel chamber 14 has been transported to the fuel cell through valve 18, piston 270 is moved to the right by spring 272. This action closes valve 82 and opens valve 84, and pushes the stored single dose of liquid fuel past opened valve 84 to solid fuel chamber 14, as shown.

A variation of the hydrogen generator described herein is shown in FIGS. 24A-24D. Similar to the other embodiments disclosed herein, hydrogen generator 10' has liquid fuel chamber 12, which in this embodiment is preferably pressurized, and solid fuel chamber 14, which has a shut-off valve 18 connected thereto, as shown. A difference between hydrogen generator 10' and the other hydrogen generators discussed herein is that the single dose storage is measured by how much liquid fuel flows past a flow restrictor 278 connecting liquid fuel chamber 12 to the timing mechanism 280 when the hydrogen pressure is low. Suitable flow restrictors include, but are not limited to, micro-orifice, pressure snubbers, porous metal or any device that reduces the liquid flow rate therethrough. Timing mechanism 280 is also connected to solid fuel chamber 14 to transport the liquid fuel to the solid fuel chamber.

Timing mechanism 280 comprises a liquid holding area 282, which is closed by valve 284, which has slidable body 286 biased by spring 288. Spring 288 abuts stopper 289, which is movable into and out of liquid holding area 282, for example, by rotation to set the biasing force of spring 288. Slidable body 286 is pushed from the closed position to the open position by plunger pin 290, which in turn is engageable by flexible actuator 292, as better shown in FIG. 24B. Both plunger pin 290 and flexible actuator 292 are housed in chamber 294, and flexible actuator 292 is biased by washer spring 296. Channel(s) 295 transport the liquid fuel from chamber 294 to solid fuel chamber 14, as shown. A diaphragm 298 separates washer spring 296 from chamber 294. In use, chamber 294 and channel 295 are filled with water. The hydrogen pressure is communicated to the water in chamber 294 via channel 295. Due to the surface tension of the liquid fuel channel 295 and/or the meniscus effect, hydrogen gas does not enter chamber 294 through channel 295. When the hydrogen pressure in solid fuel chamber 14 is high, as shown in FIG. 24C, the transmitted pressure compresses washer spring 296. This action pulls flexible actuator 292 to the left and the forked end of actuator 292 engages plunger pin 290 keeping it from opening valve 284.

When hydrogen pressure is low, for example when the produced hydrogen has been transported through shut-off valve 18 to a fuel cell, washer spring 296 pushes flexible actuator 292 to the right until plunger pin 290 contacts slidable body 286 to open valve 284. Once valve 284 is opened, liquid fuel flows from liquid fuel chamber 12 or from liquid fuel storage 282 through valve 284 into chamber 294. Since the liquid fuel is pressurized, it flows from chamber 294 through channel 295 into solid fuel chamber 14. Flow restrictor 278 determines the flow rate of liquid fuel from liquid fuel chamber 12. The duration that valve 284 remains open determines how much liquid fuel flows into solid fuel chamber 14. The timing of the opening and closing of valve 284 is controlled in part by the fact that plunger pin 290 is separate from flexible actuator 292. As best shown in the sequence from FIG. 24C to FIG. 24D, soon after plunger pin 290 opens valve 284, flexible actuator 292 opens up and releases plunger pin 290. As plunger pin 290 is released, valve 284 is closed due to the biasing action of spring 288 on slidable body 286, thereby stopping the flow of liquid fuel. If plunger pin 290 were made integral to flexible actuator 292, the flow of liquid fuel would not stop until the hydrogen pressure is sufficiently high to bring the flexible actuator and plunger pin back to the configuration of FIG. 24C.

Under certain instances, the flow of the liquid fuel component through pump/valve 76 may stop even though liquid fuel remains in liquid fuel chamber 12. In one example, flow may stop when a gas bubble is present in the liquid fuel, and liquid storage area 38 stores such gas. When hydrogen pressure is low, the gas stored in liquid storage area 38 is transported to the solid fuel component. No additional reaction would occur and hydrogen pressure would not increase to pump, store, measure or transport the next single dose of liquid fuel, thereby causing the flow of liquid fuel to stop. In accordance with another aspect of the present invention, a priming mechanism is provided to restart the cycle when there is a disruption in the flow of liquid fuel or when hydrogen generator 10 is used for the first time.

Figure 25A:
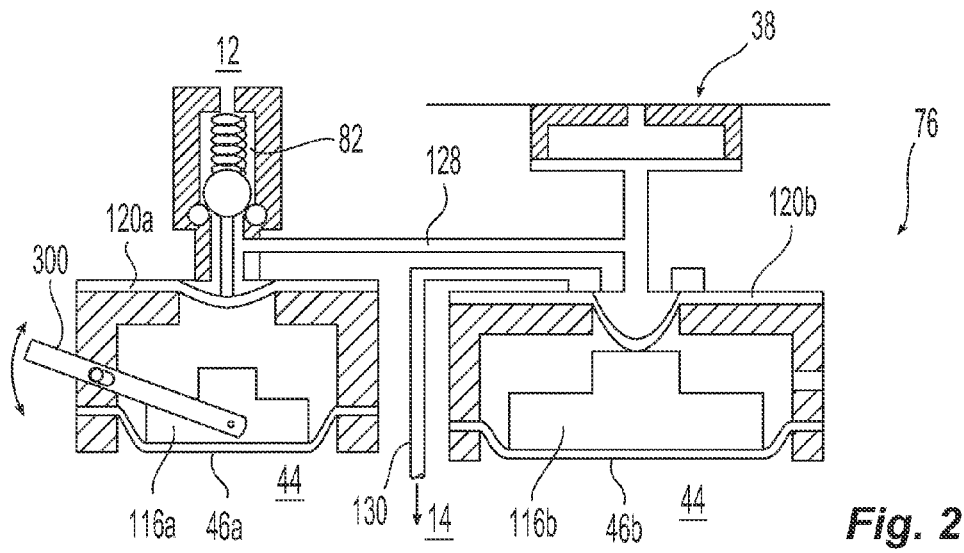
FIGS. 25A-25B are cross-sectional views of the embodiment of FIGS. 10A-10C with a priming mechanism.
Figure 25B:
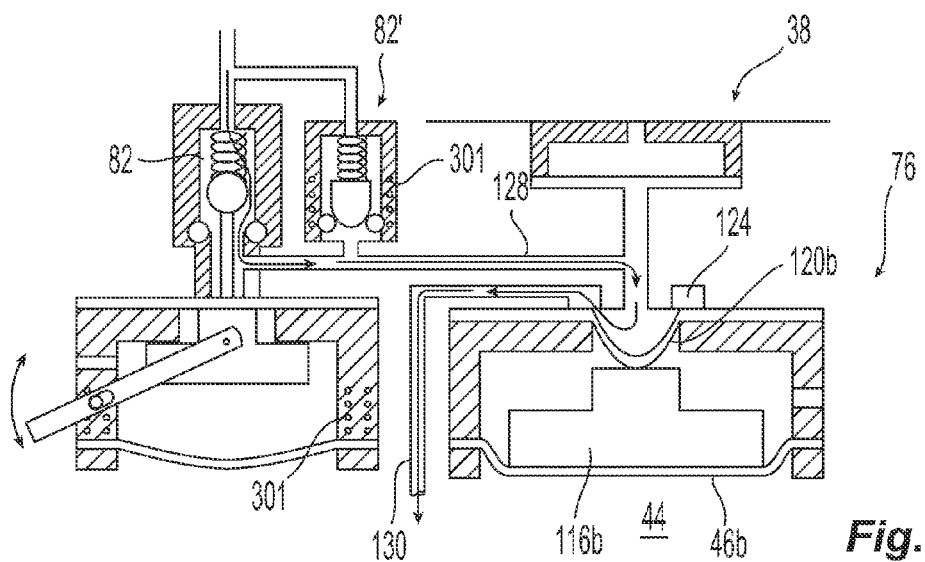

Referring to FIGS. 25A-25B, priming lever 300 is provided in the embodiment shown above in FIGS. 10A-10C. When the flow of liquid fuel is interrupted, the hydrogen pressure in hydrogen storage area 44 is low and diaphragms 46a and 46b are in the same configuration as that shown in FIG. 10C. Also, since the hydrogen pressure is low, piston 116a does not push diaphragm 120a upward to open valve 82. The user or a CPU-controlled motor may push priming lever 300 down to open valve 82. As shown in FIG. 25B, after valve 82 is opened the flow of liquid fuel is resumed, but instead of being initially stored in liquid storage area 38 the liquid fuel flow to exit channel 130 through the bowed diaphragm 120b and circular channel 124. The fresh liquid fuel reacts with the solid fuel and increases hydrogen pressure until diaphragm 46b and piston 116b move upward, pushing diaphragm 120b upward. When diaphragm 120b is moved up, it isolates circular channel 124 and stops flow therethrough. At this point, liquid storage area 38 again stores a single dose of liquid fuel and the cycle starts again.

Priming lever 300 can also be operated by compressible foam/gel, by compressible gas/liquid, by spring, pneumatically or hydraulically by actuator 324, as shown in FIGS. 29A-29B. Actuator 324 has spring-biased piston 326 and gas or liquid medium 328, and piston 326 is in contact with priming lever 300, as shown. When activated by the CPU, the user or other sources, medium 328 is pressurized and pushes priming lever downward to push piston 116l and diaphragm 120b. When deactivated, under the force of spring 327, piston 326 returns to its original position, as shown in FIG. 29A.

Priming lever 300 can also be actuated by single pulse actuator 330, as shown in FIGS. 29C-29D. In this configuration, priming lever has post 332, which in the unactivated position shown in FIG. 29C is in contact with spring-biased piston 334. When activated by the CPU, the user or other sources, piston 334 pushes post 332 and priming lever 300 downward. The distance between post 332 and pivot 336 is sized, such that after a predetermined downward distance post 332 is no longer in contact with piston 334, and the downward motion of priming lever 300 stops. Hence, actuator 330 only engages the priming lever for a predetermined duration and as a result only a single dose of liquid fuel is primed through pump/valve 76. Priming lever 300 is optionally biased, for example by torsional spring 338, to return the priming lever to the unactivated position. Piston 334 may have cam surfaces 340 at its tip to allow post 332 to slip past the tip of piston 334 to return to the configuration of FIG. 29C. Cam surfaces 340 can be formed by a truncated cone attached to the end of piston 334. Also, as shown in FIG. 29E, post 332 can be spring-biased to assist in the return to the configuration of FIG. 29C. Spring-biased piston 334 can also be activated pneumatically or hydraulically, similar to the embodiment of FIGS. 29A-29B.

Alternatively, instead of priming lever 300, piston 116a may contain a solenoid core and piston 116a's housing may have electrical coils 301 similar to those shown in FIG. 25B, which is controlled by the CPU of the device or the fuel cell. When the CPU senses that hydrogen pressure is too low, i.e., lower than a predetermined level, the CPU sends an electrical current through coils 301 to move the solenoid core and piston 116a upward to open valve 82. Additionally, bypass valve 82' can be provided in parallel relation to valve 82. Bypass valve 82', which contains coils 301, is controlled by the CPU and when this valve is opened the liquid fuel flows through it instead of valve 82 to transport liquid fuel.

Figure 26:
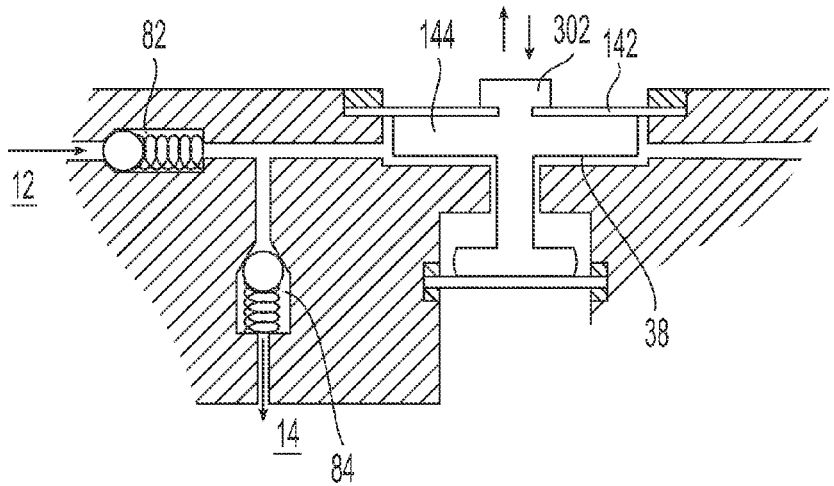
FIG. 26 is a cross-sectional view of another priming mechanism suitable for the embodiments shown in FIGS. 14A-14C and 15A-15B.

Referring to FIG. 26, priming knob 302 is provided for the embodiment shown above in FIGS. 14A-14C and FIGS. 15A-15D. Priming knob 302 is connected to piston 144, as shown. When the flow of liquid fuel is interrupted, a user may pull priming knob 302 upward to open valve 82 to let liquid fuel flow in liquid storage area 38. The user may push priming knob 302 downward to pump the liquid fuel through valve 84. This action may be repeated several times to ensure that the flow of fuel is resumed.

Figure 27A:
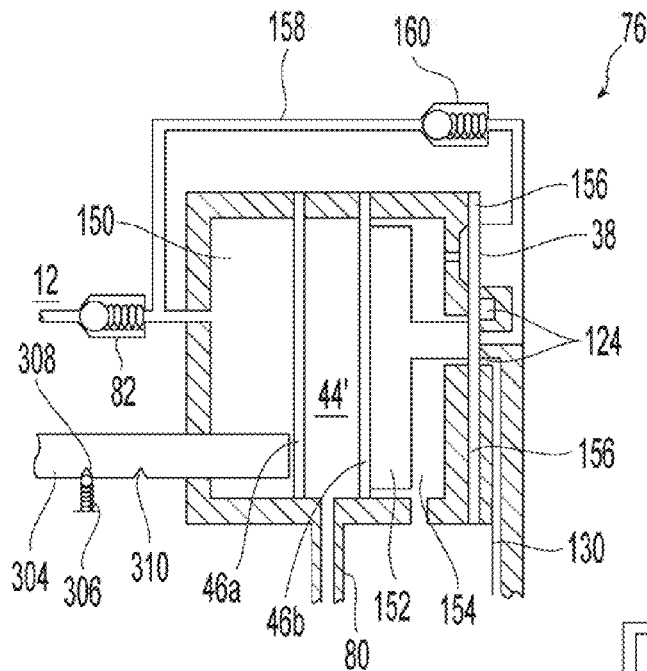
FIGS. 27A-27C are cross-sectional views of the embodiment shown in FIGS. 16A-16C with another priming mechanism.
Figure 27B:
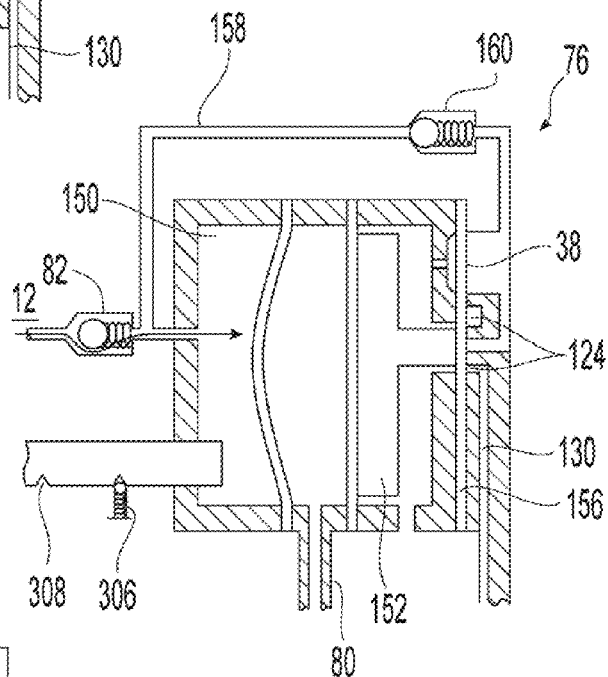
Figure 27C:
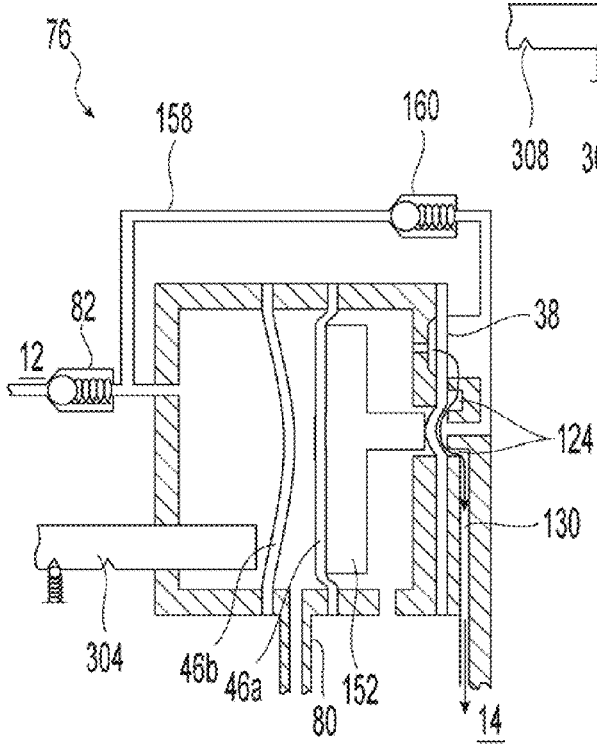

Referring to FIGS. 27A-27C, priming lever 304 is provided for the embodiment shown in FIGS. 16A-16C. As best shown in FIG. 27A, when the flow of liquid fuel is interrupted, both valves 82 and 160 are closed. Initially, priming lever 304 is held by biased arm 306 in outer notch 308. To restart the flow, a user pulls priming lever 304 outward, as shown in FIG. 27B. This action increases the volume of pumping chamber 150 forming a partial suction therein to open valve 82. Liquid fuel then flows into pumping chamber 150. The user would then push priming lever 304 inward. This action decreases the volume of pumping chamber 150. As best shown in FIG. 27C, valve 82 is closed and valve 160 is opened to allow fresh liquid fuel to flow out of pumping chamber 150 through channel 158, valve 160, circular channel 124 and exit channel 130 to react with the solid fuel. Similar to the embodiment shown in FIGS. 25A-25B, as the hydrogen pressure increases circular channel 124 is isolated and liquid fuel is again stored in liquid storage area 38 to restart the cycle. Priming lever 304 may also have inner notch 310 to mate with biased arm 306 when the lever is pulled, as shown in FIG. 27B.

Figure 28A:
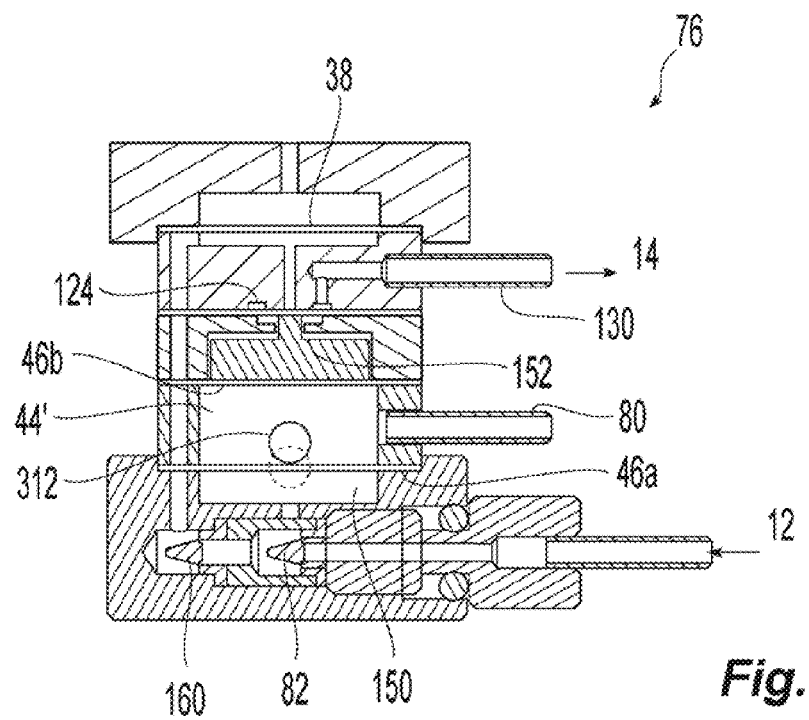
FIGS. 28A-28B are cross-sectional views of priming mechanisms suitable for the embodiment shown in FIG. 17.

Referring to FIG. 28A, a rotating priming knob 312 is provided for the embodiment shown above in FIG. 17. Knob 312 is mounted eccentrically so that in the down position (shown in phantom), knob 312 bends diaphragm 46a downward to reduce the volume of pumping chamber 150 and when knob 312 is in the up position (shown in solid) it increases the volume of pumping chamber 150, similar to the preceding paragraph. Rotating priming knob 312 can be used instead of priming lever 304, discussed in the preceding paragraph.

Figure 28B:
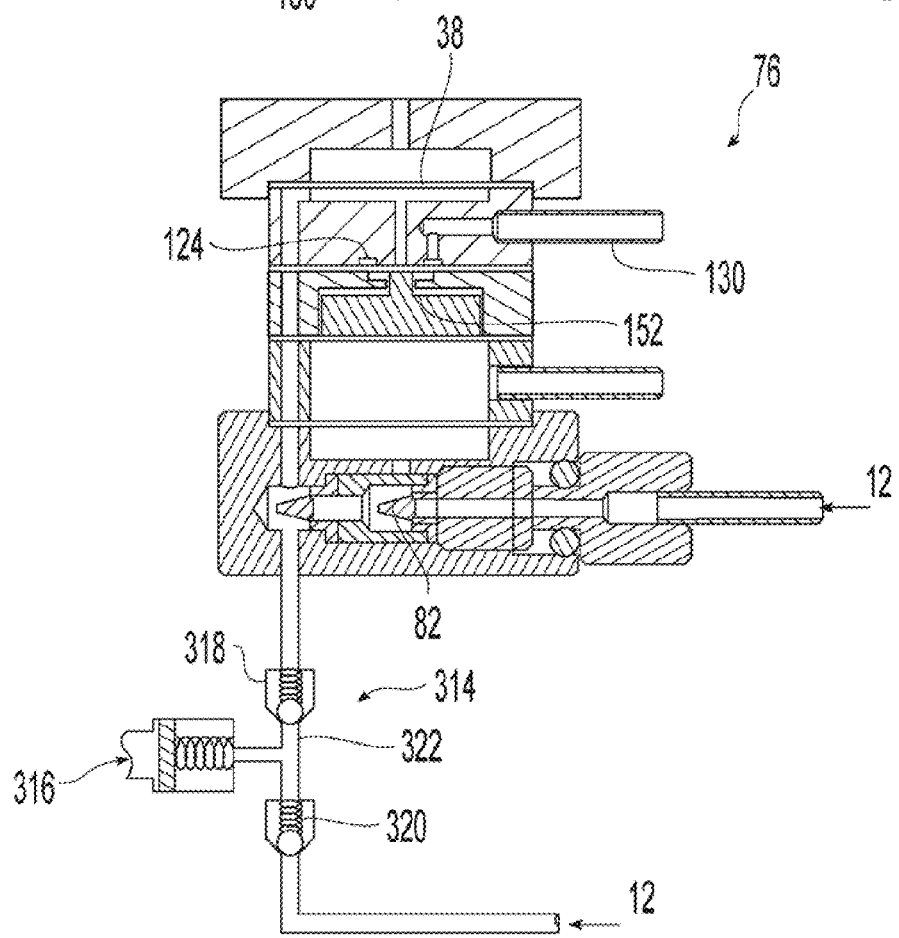

Referring to FIG. 28B, a priming pump 314 is provided for the embodiment shown in FIG. 17. Pump 314 has biased actuator 316 connected to valve 318 and valve 320. When actuator 316 is pushed inward it opens valve 318 and closes valve 320, which is connected to liquid fuel chamber 12. When actuator 316 is allowed to return to the outward position, valve 320 is open to allow liquid fuel to enter section 322. When actuator 314 is pushed inward again, it pumps the liquid in section 322 through opened valve 318 into valve 76. Pump 314 can be activated as many times as necessary to prime pump 76 or to restart pump 76. Alternatively, solenoid coils can be placed around actuator 316. Energizing and de-energizing the coil would pump liquid fuel from liquid fuel chamber 12 through valve 314.

Figure 30A:
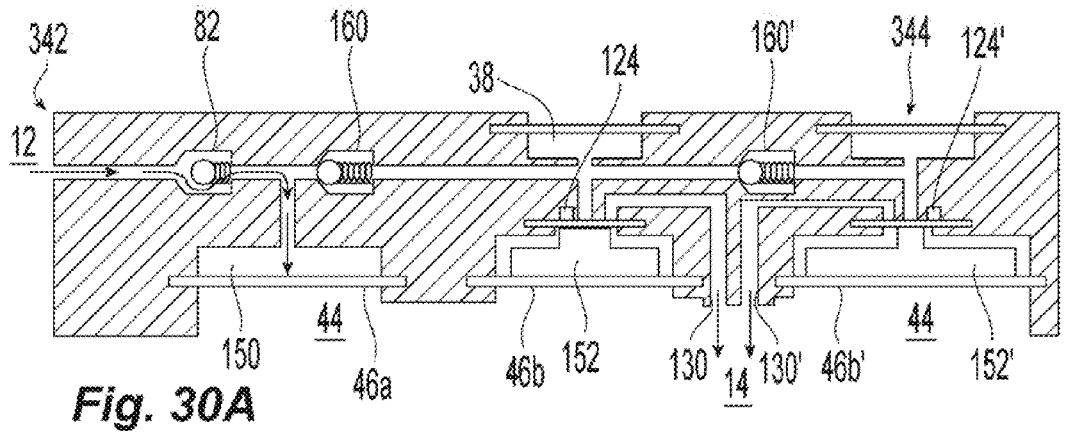
Figure 30B:
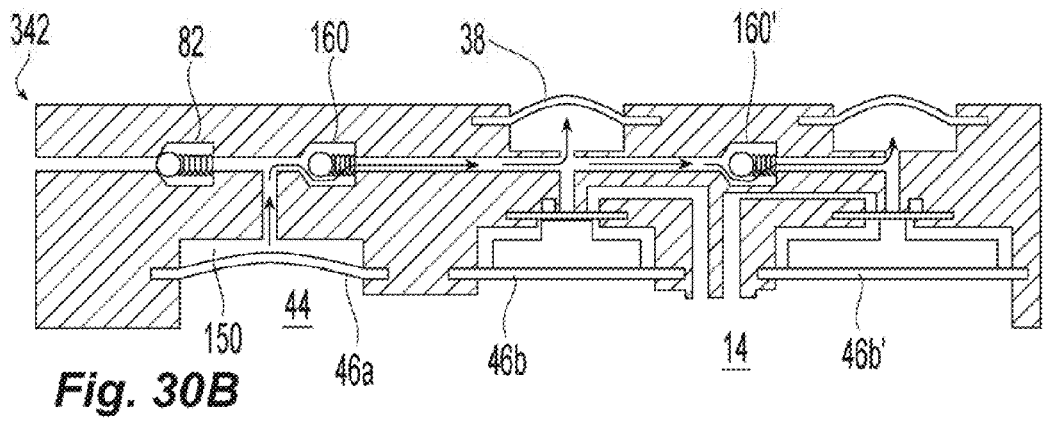
Figure 30C:
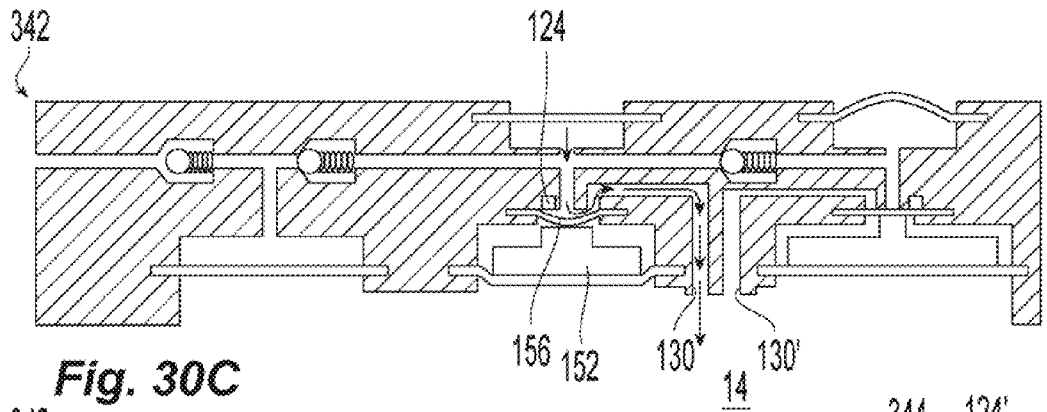
Figure 30D:
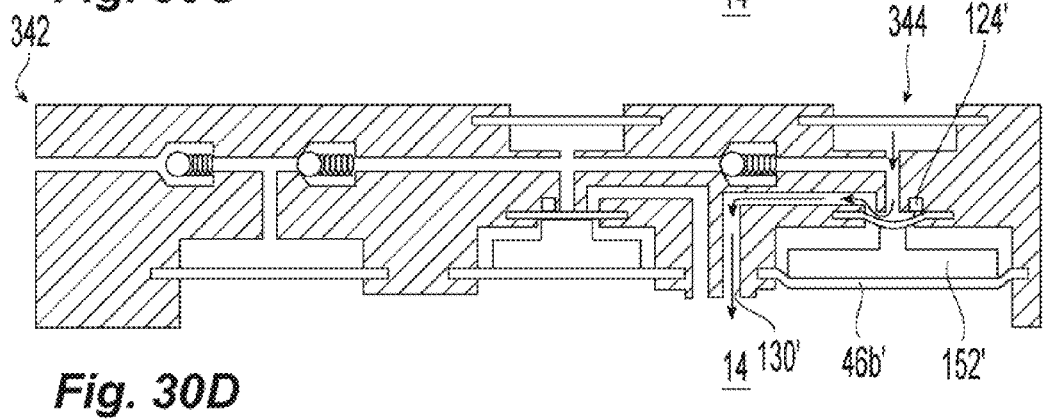

In accordance with another aspect of the present invention, a self-activated priming valve or pump 342 is shown in FIGS. 30A-30D. Self-activated priming valve 342 shares a number of pans as valve/pump 76 discussed above, and similar components may share similar reference numbers. Referring to FIG. 30A, valve 342 is connected to liquid chamber 12 at its inlet and to solid chamber 14 at its two outlets, which can merge into a single outlet. Similar to valve/pump 76 shown above, and more similar to the ones shown in FIGS. 16A-16C and FIG. 17, valve 342 has valve 82 connected to liquid fuel chamber 12, and when pressure in pumping chamber 150 is low an amount of liquid fuel is pumped into chamber 150. Pumping chamber 150 is separated by diaphragm 46a from hydrogen storage area 44. Valve 160 separates pumping chamber 150 from liquid storage area 38, and valve 160 is closed when hydrogen pressure is low. When hydrogen pressure from hydrogen pressure storage area 44 is high, valve 82 closes and valve 160 opens to store a single dose of liquid fuel in liquid storage area 38, as shown in FIG. 30B. When hydrogen pressure is low, piston 152 drops, allowing diaphragm 156 to also drop, letting the stored single dose of liquid fuel to go through circular channel 124 and into exit channel 130 and into solid fuel chamber 14 to react with the solid fuel, as shown in FIG. 30C.

Self-activated priming valve 342 has a second liquid storage area 344, as shown. Second liquid storage area 344 is substantially similar to first liquid storage area 38, except that second liquid storage area 344 discharges its stored single dose at a lower hydrogen pressure than liquid storage area 38, hereinafter the "second low hydrogen pressure." In a non-limiting example, for a PEM fuel cell, this second low hydrogen pressure can be about 0 psi to about 2 psi. Referring again to FIG. 30A, second liquid storage area 344 is in fluid communication with liquid fuel chamber 12. Although shown as being connected to liquid storage area 344, first through valve 160' and then to liquid fuel chamber 12, second liquid storage area 344 may be connected directly to liquid fuel chamber 12, e.g., a T-shaped connector connecting liquid fuel chamber 12 directly to both liquid storage areas 38 and 344. Second liquid storage 344, as shown, also stores liquid via a diaphragm, but can store liquid fuel using any of the methods and structures described above, including but not limited to those shown in FIGS. 8A-8C. Second liquid storage area 344 is connected to circular channel 124' which is closed by piston 152' when the hydrogen pressure is at or lower than the second low hydrogen pressure. Piston 152' is supported by diaphragm 46b', which is exposed to the hydrogen pressure of hydrogen storage area 44 similar to diaphragm 46a and 46b, as shown.

Referring again to FIG. 30B, when the hydrogen pressure is high, the hydrogen pressure presses diaphragm 46a and pushes liquid fuel through valve 160 and stores a single dose of liquid fuel in liquid storage area 38. This action also opens valve 160' and stores another single dose (or a larger volume) in second liquid storage area 344. Referring again to FIG. 30C, when the hydrogen pressure is low in a normal operating pressure cycle, the stored single dose of liquid fuel is discharged through circular channel 124 and exit channel 130. Normally, this liquid fuel reacts with solid fuel in solid fuel chamber 14 creating more hydrogen and raising the hydrogen pressure. This would, in the normal operating cycle, store another single dose in liquid storage area 38 and the cycle continues.

However, as described above, in the event of a disturbance in the cycle, e.g., an amount of gas or air is being transported from liquid chamber 12. This gas is stored in liquid storage area 38. At the next low hydrogen pressure cycle, this stored gas is discharged, instead of liquid fuel, and no reaction or no significant reaction occurs in solid fuel chamber 14 and hydrogen pressure would not rise. In this event, as additional hydrogen is being consumed or transported from solid fuel chamber 14, the hydrogen pressure continues to drop until it reaches the second low hydrogen pressure. At this stage, diaphragm 46b' and piston 152' drop down to open circular channel 124'. Stored liquid fuel in second liquid fuel storage area 344 is discharged through circular channel 124' and exit channel 130' to react with solid fuel to restart the pressure cycle. As the hydrogen pressure increases, diaphragm 46' and piston 152' move up to close circular channel 124'.

As mentioned above, the volume of second liquid fuel storage 344 can be higher than the volume of liquid fuel storage 38, so that if the volume of trapped gas is larger than a single dose, then the remaining liquid fuel in second liquid fuel storage 344 after circular channel 124' closes can be discharged in subsequent steps to restart the cycle.

As discussed above, there are a number of ways to calibrate diaphragms 46b and 46b' so that diaphragm 46b lowers when the low pressure is reached and diaphragm 46b' lowers when the second low hydrogen pressure is reached. In one method, each diaphragm can be supported by a spring, such as spring 86, with different spring constant. In another method, each diaphragm can have different flexing properties or thickness. Additionally, the surface area of pistons 152 and 152' supported by these diaphragms can be different, as illustrated, so that the diaphragm and piston combinations are designed to move at different exposed hydrogen pressure.

While various embodiments of the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entireties.

We claim:

1. A hydrogen generator (10) comprising a first fuel chamber (12) containing a viscous fuel component, a second fuel chamber (14) containing a metal hydride fuel component, and a self-regulating pump, wherein the viscous fuel component reacts with the metal hydride fuel component to produce hydrogen,
   wherein the self-regulating pump measures, or stores a single dose of the viscous fuel component in a viscous fluid storage area (38) when an internal hydrogen pressure of the hydrogen generator is higher than a first predetermined pressure, and the self-regulating pump transports said single dose to react with the metal hydride fuel component when said internal pressure is lower than a second predetermined pressure,
   wherein said single dose has a predetermined volume, and wherein the first predetermined pressure is higher than the second predetermined pressure.

2. The hydrogen generator of claim 1, wherein the viscous fuel comprises a liquid or a gel.

3. The hydrogen generator of claim 1, wherein the metal hydride fuel comprises a solid metal hydride fuel or an aqueous metal hydride fuel.

4. The hydrogen generator of claim 1, wherein the internal hydrogen pressure is the pressure of a hydrogen chamber (44) in fluid communication with the second fuel chamber (14), or the internal hydrogen pressure is the pressure of the second fuel chamber (14).

5. The hydrogen generator of claim 4, wherein the viscous fuel storage area (38) is in communication with the internal hydrogen pressure, so that when the internal hydrogen pressure is higher than the first predetermined pressure the volume of the viscous fuel storage area (38) is increased by an amount substantially the same as the predetermined volume of the single dose.

6. The hydrogen generator of claim 5, wherein the viscous fuel storage area (38) comprises
   i. a flexible diaphragm (56, 156) that flexes or bows in response to the internal hydrogen pressure,
   ii. a biased, substantially rigid member (102/104, 270/272) that moves in response to the internal hydrogen pressure,
   iii. a flexible, enclosed member (108) containing a compressible medium that expands or contracts in response to the internal hydrogen pressure, or
   iv. a space between two flexible diaphragms (132/134, 46/142) that flex or bow in response to the internal hydrogen pressure.

7. The hydrogen generator of claim 5, wherein the viscous fuel storage area is vented.

8. The hydrogen generator of claim 5, wherein the viscous fuel storage area is sealed.

9. The hydrogen generator of claim 5, wherein the first fuel chamber is connected to the viscous fuel storage area by a first valve (82) that opens when the internal hydrogen pressure is greater than about the first predetermined pressure and closes when the internal hydrogen pressure is lower than about the first predetermined pressure.

10. The hydrogen generator of claim 9, wherein the second fuel chamber is connected to the viscous fuel storage area by a second valve (84, 124) that opens when the internal hydrogen pressure is lower than about the second predetermined pressure and closes when the internal hydrogen pressure is higher than about the second predetermined pressure.

11. The hydrogen generator of claim 9 further comprising a third valve (160) disposed between the first valve (82) and the viscous fuel storage area (38).

12. The hydrogen generator of claim 9 further comprises a movable connector that moves in response to the internal hydrogen pressure to open the first fuel chamber and to store said single dose in the viscous fuel storage area when the internal hydrogen pressure is higher than the first predetermined pressure.

13. The hydrogen generator of claim 5 further comprises a movable connector that moves in response to the internal hydrogen pressure to open the first fuel chamber and to store said single dose in the viscous fuel storage area when the internal hydrogen pressure is higher than the first predetermined pressure.

14. The hydrogen generator of claim 13, wherein the movable connector comprises:
   a fork (48) that opens and closes both the first and second fuel chamber,
   a post (78) or a spool (92) connected to the viscous fuel storage area,
   a piston (78, 92, 144, 152, 270) biased by a spring-like member (86, 142/46, 147, 46b/156a, 272) and exposed to the internal hydrogen pressure, wherein the movement of the piston opens and closes the first (82) and/or second valves (84, 124),
   a first piston (116a, 140) connected to or adapted to open or close the first valve (82) and a second piston (116b, 141) connected to or adapted to open or close the second valve (84, 124),
   a first flexible diaphragm (46a, 136) adapted to open the first valve (82) and a second diaphragm (46b, 138) adapted to open the second valve (84, 124), wherein the two diaphragms defined a space (44, 44') therebetween and said space is in fluid communication with the internal pressure, or
   an expandable bellow (136) wherein the internal volume (44') of the bellow is in fluid communication with the internal hydrogen pressure.

15. The hydrogen generator of claim 14, wherein the first (116a, 140) and second (116b, 141) pistons are connected to a first (46a, 136) and second (46b, 138) diaphragm, respectively, which are exposed to the internal hydrogen pressure.

16. The hydrogen generator of claim 14, wherein the second flexible diaphragm (138, 46b) or the expandable bellow (136) is connected to a piston or extended member (141, 146b, 152) that moves to close the second valve (84, 124).

17. The hydrogen generator of claim 13, wherein the connector is biased by a spring or a diaphragm (36, 46, 86, 46a/46b, 120a/120b, 142/46).

18. The hydrogen generator of claim 13, wherein the connector is located within the viscous fuel storage area.

19. The hydrogen generator of claim 13 further comprises a priming device (20, 90, 300, 300/324, 300/334, 301, 302, 304, 312, 314, 334) to start or restart the flow of the viscous fuel component.

20. The hydrogen generator of claim 1 further comprises a starting pressurizer (20) that is added to the first fuel chamber to pressurize the first fuel chamber.

21. The hydrogen generator of claim 20 further wherein the starting pressurizer (20) comprises a metal hydride.

22. The hydrogen generator of claim 1, wherein the second fuel chamber (14) comprises a moving injection point (74), so that the single doses of viscous fuel components are deposited at different locations in the second fuel chamber.

23. The hydrogen generator of claim 1 further comprises a priming device (20, 90, 300, 300/324, 300/334, 301, 302, 304, 312, 314, 334) to start or restart the flow of the viscous fuel component.

24. The hydrogen generator of claim 23 further comprising a second viscous fuel storage area (334) wherein the second viscous fuel storage area discharges at least a portion of its storage content when the internal hydrogen pressure is lower than a third predetermined pressure, wherein the third predetermined pressure is lower than the second predetermined pressure.

25. The hydrogen generator of claim 23 wherein the priming device comprises:
  i. a priming actuator connected to the connector to move the connector to start the flow of the viscous fuel compartment,
  ii. a manually actuated pump fluidly connected to the first fuel chamber, or
  iii. an automatic pump (301) fluidly connected to the first fuel chamber.

26. The hydrogen generator of claim 1, wherein the first predetermined pressure is about 0.5 psi to about 5 psi higher than the second predetermined pressure.

27. The hydrogen generator of claim 1, wherein the first predetermined pressure is about 5 psig to about 7 psig.

28. The hydrogen generator of claim 1, wherein the second predetermined pressure is about 0.5 psig to about 2 psig.

29. The hydrogen generator of claim 1 further comprising a pressure regulator (164).

30. A hydrogen generator comprising:
  (a) a first fuel chamber containing liquid or viscous fuel, wherein the first fuel chamber is connected to a first storage area so liquid or viscous fuel is transportable to the first storage area;
  (b) a second reaction chamber;
  (c) a valve disposed between the first storage area and the second reaction chamber, wherein when liquid or viscous fuel flows from the first storage area through the valve into the second reaction chamber, the liquid or viscous fuel component reacts to produce hydrogen in the second reaction chamber; and
  (d) a pump that pumps a single dose from the first storage area to the second reaction chamber when an internal pressure of the hydrogen generator is lower than a first predetermined pressure,
  wherein the single dose of the liquid or viscous fuel is transported from the first storage area through the valve to the second reaction chamber when the internal pressure of the hydrogen generator is lower than the first predeterminded pressure, and wherein when the internal pressure of the hydrogen generator is higher than a second predetermined pressure, the single dose of the liquid or viscous fuel is transported from the first fuel chamber to the first storage area, and
  wherein the single dose has a predetermined volume and the second predetermined pressure is higher than the first predetermined pressure.

31. The hydrogen generator of claim 30, wherein the internal pressure of the hydrogen generator is an internal pressure of a hydrogen storage area, and the hydrogen storage area is connected to the second reaction chamber so that hydrogen produced in the second reaction chamber flows into the hydrogen storage area.

32. The hydrogen generator of claim 31, wherein the pump is a single dose pump exposed to pressure of the hydrogen storage area, wherein the single dose pump comprises
  i. a spring chamber;
  ii. a first diaphragm that forms a wall of the spring chamber,
  iii. a second diaphragm that flexes or bows in order to store the single dose of the liquid or viscous fuel and that pumps the single dose to the second fuel chamber when the second diaphragm returns to a relaxed state; and
  iv. a post that connects the first diaphragm and the second diaphragm together so the first diaphragm and the second diaphragm move together.

33. The hydrogen generator of claim 30, wherein the pump comprises a diaphragm that flexes or bows in order to store the single dose of the liquid or viscous fuel and that pumps the single dose to the second reaction chamber when the diaphragm returns to a relaxed state.

34. The hydrogen generator of claim 30, wherein the pump comprises a spring-biased fork or a spring-biased piston that is moveable against a spring to store the single dose of liquid or viscous fuel and that pumps the single dose to the second reaction chamber when the spring returns to a relaxed state.

35. The hydrogen generator of claim 30, wherein the pump comprises a sealed end that contains an expandable member, wherein the expandable member is compressible in order to store the single dose of liquid or viscous fuel in the sealed end, and when the expandable member returns to a relaxed state, the expandable member pumps the single dose to the second reaction chamber.

* * * * *